United States Patent
Kasichainula et al.

(10) Patent No.: US 12,301,471 B2
(45) Date of Patent: May 13, 2025

(54) TECHNOLOGIES FOR CONFIGURING AND REDUCING RESOURCE CONSUMPTION IN TIME-AWARE NETWORKS AND TIME-SENSITIVE APPLICATIONS

(71) Applicant: Intel Corporation, Santa Clara, CA (US)

(72) Inventors: Kishore Kasichainula, Phoenix, AZ (US); Hector Blanco Alcaine, Vaterstetten (DE); Frank Baehren, Pforzheim (DE)

(73) Assignee: Intel Corporation, Santa Clara, CA (US)

( * ) Notice: Subject to any disclaimer, the term of this patent is extended or adjusted under 35 U.S.C. 154(b) by 495 days.

(21) Appl. No.: 17/853,562

(22) Filed: Jun. 29, 2022

(65) Prior Publication Data
US 2022/0345417 A1    Oct. 27, 2022

(51) Int. Cl.
*H04L 47/56* (2022.01)
*H04L 47/2441* (2022.01)
*H04L 47/30* (2022.01)

(52) U.S. Cl.
CPC .......... *H04L 47/56* (2013.01); *H04L 47/2441* (2013.01); *H04L 47/30* (2013.01)

(58) Field of Classification Search
CPC ...... H04L 47/56; H04L 47/2441; H04L 47/30
See application file for complete search history.

(56) References Cited

U.S. PATENT DOCUMENTS

2021/0117353 A1*   4/2021   Kasichainula .......... G06F 13/28

OTHER PUBLICATIONS

Li et al., "A Simple and Efficient Time-Sensitive Networking Traffic Scheduling Method for Industrial Scenarios", Electronics, vol. 9, No. 12, p. 2131, 19 pages (Dec. 12, 2020), https://www.mdpi.com/2079-9292/9/12/2131.
Meyer et al., "Extending IEEE 802.1 AVB with time-triggered scheduling: A simulation study of the coexistence of synchronous and asynchronous traffic", 2013 IEEE Vehicular Networking Conference, pp. 47-54 (Dec. 16, 2013), https://core-researchgroup.de/bib/eigene/msks-eatts-13.pdf.
Nordman et al., "Energy Efficiency and Regulation", IEEE 802 Tutorial, 58 pages (Jul. 13, 2009).
Oliver et al., "IEEE 802.1Qbv Gate Control List Synthesis using Array Theory Encoding", 2018 IEEE Real-Time and Embedded Technology and Applications Symposium (RTAS), pp. 13-24 (Apr. 11, 2018), http://cs.uni-salzburg.at/~scraciunas/pdf/conferences/serna_rtas 18.pdf.
Quan et al., "OpenTSN: an open-source project for time-sensitive networking system development", CCF Transactions on Networking, vol. 3, No. 1, pp. 51-65 (Aug. 5, 2020), https://link_springer.com/article/10.1007/s42045-020-00029-8.

(Continued)

*Primary Examiner* — Kibrom T Hailu
(74) *Attorney, Agent, or Firm* — Schwabe, Williamson & Wyatt, P.C.

(57) ABSTRACT

The present disclosure provides techniques for controlling transmissions in time-sensitive networks (TSNs) and/or for time-sensitive applications (TSAs), including techniques for providing low latency and scalable gate control for TSNs and TSAs, configuring multiple TSAs to share the same physical network link, and enabling TSNs/TSAs to utilize Energy Efficient Ethernet (EEE) mechanisms.

24 Claims, 17 Drawing Sheets

(56) References Cited

OTHER PUBLICATIONS

Walrand, "A Quick Tutorial on Time-Sensitive Networks", TechRxiv Preprint, 12 pages (Jun. 6, 2022), https://doi.brg/10.36227/techrxiv.19967210.v1.

"Intel® 82599 10 GbE Controller Datasheet", Intel Corp., Order No. 331520-005, Rev. 3.4, 1064 pages (Nov. 2019).

"Intel® Ethernet Controller X710/XXV710/XL710 Datasheet", Intel Corp., Order No. 332464-025, Rev. 4.0, 1859 pages (Feb. 2022).

"Intel® Ethernet Adapters and Devices User Guide", Intel Corp., Release 27.3, 171 pages (Apr. 18, 2022).

"Intel® Ethernet Controller E810: Application Device Queues (ADQ) Configuration Guide", Intel Corp., Ethernet Products Group (EPG), Order No. 609008-005, Rev. 2.4, 80 pages (Dec. 2021).

"Intel® Ethernet Controller E810", Intel Corp., Order No. 613875-006, Rev. 2.4, 2780 pages (Mar. 2022).

"Introduction to Intel® Ethernet Flow Director and Memcached Performance", Intel Corp., 6 pages (2014).

"Intel® Ethernet Controller I210 Datasheet", Intel Corp., Order No. 333016-011, Rev. No. 3.7, 870 pages (Jan. 2021).

"Intel Atom® x6000E Series Processors: Real-Time Tuning Guide", Intel Corp., Doc. No. 640979-1.3, 54 pages (Mar. 2022).

Bar-Niv, et al., "Power Efficient Ethernet PHY Features for Camera and Display", IEEE Automotive Tech Day, 21 pages (Sep. 2019), https://standards.ieee.org/content/dam/ieee-standards/standards/web/documents/other/eipatd-presentations/2019/D1-08_BAR-NIV_Power_efficient_Ethernet_PHY_features_for_camera_and_display.pdf.

Brooks et al., "Time-Sensitive Networking: From Theory to Implementation in Industrial Automation", Intel Whitepaper, 7 pages, (Jun. 11, 2022), https://www.intel.com/content/dam/support/us/en/programmable/support-resources/bulk-container/pdfs/literature/wp/wp-01279-time-sensitive-networking-from-theory-to-implementation-in-industrial-automation.pdf.

Norman Finn, "Introduction To Time-Sensitive Networking" IEEE Communications Standards Magazine, 7 pages (Jun. 2018), https://www.ida.liu.se/~sohsa65/courses/tsn-course-2021/selected%20papers/IEEE%20ComSoc%20-%20TSN%20special%20issue%202018/1%20-%20Introduction%20to%20Time-Sensitive%20Networking.pdf.

Huang et al., "A Period-Aware Routing Method for IEEE 802.1Qbv TSN Networks", Electronics, vol. 10, No. 1, article 58, pp. 1-19 (Dec. 31, 2020), https://www.mdpi.com/2079-9292/10/1/58/pdf?version=1609407202.

Lázaro et al., "Time Sensitive Networking Protocol Implementation for Linux End Equipment", Technologies, vol. 10, No. 3, article 55, pp. 1-11 (Apr. 22, 2022), https://www.mdpi.com/2227-7080/10/3/55/pdf?version=1651224383.

Arriola et al., "D2.4—Advanced Wireless Technologies and Applications for Wireless TCMS", Safe architecture for Robust distributed Application Integration in rolling stock 2 (Safe4RAIL-2), H2020-S2RJU-OC-2018, project No. 826073, 91 pages (Jul. 29, 2021).

\* cited by examiner

TECHNOLOGIES FOR CONFIGURING AND REDUCING RESOURCE CONSUMPTION IN TIME-AWARE NETWORKS AND TIME-SENSITIVE APPLICATIONS

TECHNICAL FIELD

The present disclosure is generally related to network topologies and engineering, time-aware networks, time-sensitive applications, edge computing frameworks, data processing, network communication, and communication system implementations, and in particular, to techniques for providing low latency and scalable gate control for time-sensitive networks, configuring multiple time-sensitive applications to share the same physical network link, and providing time-aware energy efficient network communication.

BACKGROUND

Internet of Things (IoT), Industry 4.0, and various automation technologies present new challenges that require various manufacturers and industrial equipment vendors to improve existing real-time compute capabilities, time synchronization (sync) (e.g., to coordinate events), and timeliness (e.g., timely events) across various devices. For example, automation controllers and/or system orchestrators may be required to process various workloads such in parallel, provide for deep learning capabilities, and simultaneously communicate with other controllers in a timely manner. Such controllers will rely on precise time/timing information for these purposes.

Time-sensitive networking (TSN) is an emerging field for alleviating time sync and timeliness challenges in distributed systems. TSN includes a collection of IEEE standards that define the protocols for how time-sensitive data is transmitted over networks. Currently, this working group has formed a comprehensive standard system. However, there is a gap between TSN standards and TSN systems and implementations.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
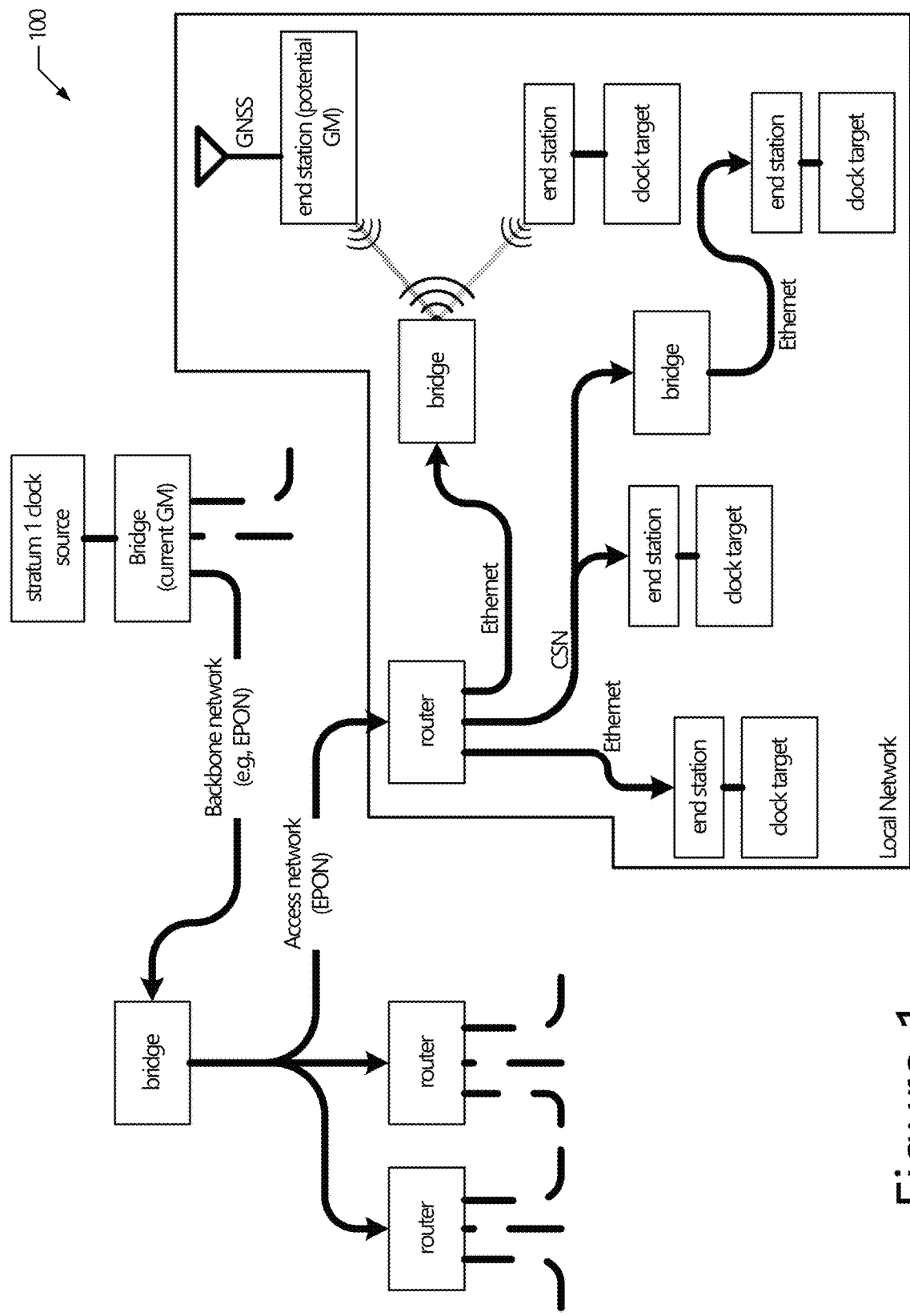
FIG. 1 depicts an example time-aware network.

The present disclosure discusses various technologies for configuring and reducing resource consumption in time-aware networks (TANs) and time-sensitive applications (TSAs), and in particular, for providing low latency and scalable gate control for TANs and TSAs, configuring multiple TSAs to share the same physical network link, and providing time-aware energy efficient network communication for TANs and TSAs.

The various examples discussed herein may be implemented in various deployment scenarios such as those that include device chains and/or other interconnections/topologies of devices, and/or deployment scenarios that involve changes in (internal and/or external) device temperatures. Additionally or alternatively, the embodiments herein may be implemented in deployment scenarios such as those that require time accuracy with respect to the length of the device chain (while subject to environmental factors) is not otherwise achievable. Example use cases/deployment scenarios may include Internet of Things (IoT) (e.g., where individual nodes are different IoT devices and/or network elements/appliances such as IoT gateways, aggregators, and/or the like), wireless sensor networks (WSNs) (e.g., where individual nodes are different sensors and/or network elements/appliances such as WSN gateways, aggregators, and/or the like), closed loop control and/or industrial automation (e.g., where individual nodes are manufacturing equipment, robots, drones, sensors, sensors, Programmable Logic Controllers (PLCs), actuators, network elements/appliances, and/or the like), telecommunications networks (e.g., where individual nodes are different network access nodes/base stations, user equipment, network functions, edge compute nodes, and/or the like), data centers (e.g., where individual nodes are different servers and/or switch fabric including interconnections between difference servers and between servers and hardware accelerators), instrumentation (e.g., where individual nodes are individual instruments and/or measuring devices), components in autonomous or semi-autonomous vehicles, interconnect (IX) technologies (such as the IX technologies discussed herein) including multi-socket processors, audio video (AV) including professional AV (pro AV) (e.g., synchronizing multiple AV devices such as WiFi speakers, Bluetooth earbuds, webcams, and the like in conference rooms, live performances (e.g., medium and large venues), and/or the like), media clock porting (e.g., satellite Rx streaming content over LAN), power grid (e.g., communication links used to selectively isolate faults on high voltage lines, transformers, reactors and other important electrical equipment where individual nodes are individual electrical equipment), robotic arms and motion controllers, and/or the like. Additionally or alternatively, the various examples discussed herein may be implemented using real-time systems/architectures such as, for example, Intel® Cache Allocation technology (CAT), PCIe Precision Time Management (PTM) technology, and the like. These implementations can optimize packet processing mechanisms, TSN defined time sync and timeliness between devices/system, as well as time sync and timeliness between devices/system within a system (e.g., between components of a device/system).

1. Time Aware Networks and Time-Sensitive Applications 1.1. Time-Aware Network Architecture The Precision Time Protocol (PTP) (see e.g., *IEEE Standard for a Precision Clock Synchronization Protocol for Networked Measurement and Control Systems*, IEEE Std 1588-2019 (16 Jun. 2020) ("IEEE1588"), the contents of which are hereby incorporated by reference in its entirety) provides precise synchronization of clocks in packet-based networked systems. Synchronization of clocks can be achieved in heterogeneous systems that include clocks of different inherent precision, resolution, and stability. PTP supports synchronization accuracy and precision in the sub-microsecond range with minimal network and local computing resources. Customization is supported by means of profiles. The protocol includes default profiles that permit simple systems to be installed and operated without the need for user management. Sub-nanosecond time transfer accuracy can be achieved in a properly designed network.

The IEEE time-sensitive networking (TSN) standards (e.g., *IEEE Standard for Local and Metropolitan Area Networks Timing and Synchronization for Time-Sensitive Applications*, IEEE Std 802.1ASTM-2020 (19 Jun. 2020) ("[IEEE802.1AS]"), the contents of which is hereby incorporated by reference in its entirety) IEEE time-sensitive networking (TSN) standards specifies protocols, procedures, and managed objects used to ensure that the synchronization requirements are met for time-sensitive applications (TSAs), such as audio, video, and time-sensitive control, across networks, for example, [IEEE802] and similar media. This includes the maintenance of synchronized time during normal operation and following addition, removal, or failure of network components and network reconfiguration. It specifies the use of [IEEE1588] where applicable in the context of [IEEE802.1Q]. Synchronization to an externally provided timing signal (e.g., a recognized timing standard such as Coordinated Universal Time (UTC) or International Atomic Time (TAI) timescales). [IEEE802.1AS] enables systems to meet respective jitter, wander, and time-synchronization requirements for TSAs, including those that involve multiple streams delivered to multiple end stations. To facilitate the widespread use of packet networks for these applications, synchronization information is one of the components needed at each network element where TSA data are mapped or de-mapped or a time-sensitive function is performed. Some features provided by TSN are oriented to resource management, reliability, access control, and time synchronization (sync). In particular, TSN access control includes utilizing a traffic shaper (or credit-based shaper) that guarantees the worst-case latency for critical data. TSN time sync uses PTP/gPTP to provide accurate time synchronization across the network.

FIG. 1 illustrates an example time-aware network (TAN) 100, which includes a single gPTP domain. The TAN 100 includes a number of interconnected time-aware systems (TASs) that support one or more timing standards such as generalized PTP (gPTP), International Atomic Time (TAI), coordinated universal time (UTC), and/or the like. These TASs can be any networking device, including, for example, bridges, routers, and end stations. A set of TASs that are interconnected by gPTP capable network elements is referred to as a gPTP network.

Each instance of gPTP that a TAS supports is in at least one gPTP domain, and the instances of gPTP are said to be part of that gPTP domain. A gPTP domain (also referred to as a "TSN domain" or simply "domain") includes one or more PTP instances and links that meet the requirements of this standard and communicate with each other as defined by the [IEEE802.1AS]. A gPTP domain defines the scope of gPTP message communication, state, operations, data sets, and timescale. Other aspects of gPTP domains are discussed in clause 8 of [IEEE802.1AS]. A TAS can support, and be part of, more than one gPTP domain. The entity of a single TAS that executes gPTP in one gPTP domain is referred to as a PTP instance. A TAS can contain multiple PTP instances, which are each associated with a different gPTP domain.

Additionally or alternatively, a TSN domain is defined as a quantity of commonly managed industrial automation devices. Here, a TSN domain comprises a set of devices, their ports, and the attached individual LANs that transmit Time-Sensitive Streams using TSN standards, which include, for example, Transmission Selection Algorithms, Preemption, Time Synchronization and Enhancements for Scheduled Traffic and that share a common management mechanism. The grouping of devices into a TSN domain may be based on administrative decision, implementation, and/or use cases involved.

There are two types of PTP instances including PTP end instances (or simply "end instances" or "end nodes") and PTP relay instances (or simply "relay instances" or "relay nodes"). An end instance, if not a PTP grandmaster (GM) instance (or simply "GM instance"), is a recipient of time information. A relay instance, if not a GM instance, receives time information from the GM instance, applies corrections to compensate for delays in the local area network (LAN) and the relay instance itself, and retransmits the corrected information. The relay instances can receive the time information directly from a GM instance, or indirectly through one or more other relay instances. Delay can be measured using standard-based procedures and/or mechanisms such as, for example, Ethernet using full-duplex point-to-point links, Ethernet Passive Optical Network (EPON) links (see e.g., IEEE *Standard for Ethernet*, IEEE Std 802.3-2018 (31 Aug. 2018) ("[IEEE802.3]"), the contents of which are hereby incorporated by reference in its entirety), [IEEE802111] wireless, generic coordinated shared networks (CSNs), for example, MoCA, G.hn, delay measurement mechanisms (see e.g., [IEEE1588] and/or [IEEE802.1AS], *IEEE Standard for Local and metropolitan area networks—Audio Video Bridging (AVB) Systems*, IEEE Std 802.1BA-2011 (30 Sep. 2011), the contents of which are hereby incorporated by reference in its entirety), and the White Rabbit (WR) link delay model (see e.g., Lipinski et al., "White Rabbit: a PTP Application for Robust Sub-nanosecond Synchronization", IEEE International Symposium on Precision Clock Synchronization for Measurement, Control and Communication (ISPCS), pgs 25-30 (12 Sep. 2011), the contents of which are hereby incorporated by reference in its entirety), and/or using any other suitable mechanism, such as those discussed herein.

In some examples, the TAN 100 may be part of, or used in various use cases such as any of the example use cases discussed herein and/or those discussed in Belliardi et al., "Use Cases IEC/IEEE 60802" version (V) 1.3 (13 Sep. 2018), the contents of which is hereby incorporated by reference in its entirety. The TAN 100 uses some or all of the aforementioned above network technologies, where end stations on several local networks are connected to a GM instance on a backbone network via an EPON access network. In the TAN 100, the bridges and routers are examples of TASs that each contain a relay instance, and the end stations are time-aware systems that contain at least one PTP end instance.

Any PTP instance with clock sourcing capabilities can be a potential GM instance, and a selection method (e.g., the best master clock algorithm (BMCA)) ensures that all of the PTP instances in a gPTP domain use the same GM instance. Additionally or alternatively, a steady state GM selection strategy may be used where GM-capable stations advertise their GM-capabilities via announce messages. When a subject GM-capable station obtains an announce message from another GM-capable station with a "better" clock entity, the subject GM-capable station does not send it's an announce message. There may be a settable priority field in the announce message that can override clock quality, and GM-capable station determine the "better" clock entity using a bitwise compare or some other suitable mechanism. Additionally, a suitable tie breaking method can be used where two GM-capable stations have the same priority (e.g., a MAC address-based tie breaker algorithm and/or the like). Bridges (and/or routers) drop all inferior announce messages, and forward only the best (e.g., highest priority) announce messages to other PTP instances. A remaining GM-capable station (i.e., a GM-capable station whose announce message is not dropped) is considered to be the GM instance for the TAN 100. The GM instance is the root of the [IEEE802.1AS] timing tree, and sends a current time (e.g., in time sync messages) for synchronizing the various nodes/instances in the TAN 100. The GM instance may send the current time on a periodic basis and/or in response to some detected event (or trigger condition). Bridges (and/or routers) in the timing tree propagate timing messages toward the leaves of the timing tree (e.g., other PTP instances/nodes in the TAN 100) taking queuing delay into account (referred to as "residence time"). Additional aspects of GM selection, synchronization, and/or other like timing aspects are discussed in [IEEE802.1AS], [IEEE1588], and Stanton, *Tutorial: The Time-Synchronization Standard from the AVB/TSN suite IEEE Std* 802.11*AS*™-2011 (*and following*), IEEE PLENARY, San Diego Calif., July 2014 (July 2014), the contents of which is hereby incorporated by reference in its entirety.

In some implementations, there can be short periods during network reconfiguration when more than one GM instance might be active while the BMCA process is taking place. BMCA may be the same or similar to that used in [IEEE1588], but can be somewhat simplified in some implementations. In FIG. 1, the BMCA process has resulted in the GM instance being on the network backbone. If, however, the access network fails, the systems on a local network automatically switch over to one of the potential GM instances on the local network that is as least as "good" as any other. For example, when an access network link fails, and a potential GM instance that has a GNSS reference source has become the active GM instance, then two gPTP domains may exist where there used to be one.

When the TAN 100 includes multiple gPTP domains that could be used, some of the gPTP domains may use the PTP timescale and one or more other domains may use another timescale such as the arbitrary (ARB) timescale. Additionally or alternatively, some or all PTP instances belonging to the same domain may have direct connections among them in their physical topology (e.g., time cannot be transported from one PTP instance in a first domain to another PTP instance that same domain via a TAS that does not have that domain active). As in the single-domain case, any of the network technologies discussed herein can be used. The GM instance of each domain is selected by BMCA where a separate, independent BMCA instance is invoked in each domain.

The timescale for a gPTP domain is established by the GM clock. There are two types of timescales supported by gPTP including a timescale PTP and a timescale arbitrary (ARB). For timescale PTP, the epoch is the PTP epoch (see e.g., 8.2.2 in [IEEE802.1AS]), and the timescale is continuous. The unit of measure of time is the second defined by International Atomic Time (TAI). For timescale ARB, the epoch is the domain startup time and can be set by an administrative procedure. Between invocations of the administrative procedure, the timescale is continuous. Additional invocations of the administrative procedure can introduce discontinuities in the overall timescale. The unit of measure of time is determined by the GM Clock. The second used in the operation of the protocol can differ from the SI second. The "epoch" at least in some examples refers to the origin of the timescale of a gPTP domain. The PTP epoch (epoch of the timescale PTP) is 1 Jan. 1970 00:00:00 TAI. See Annex C of [IEEE802.1AS]) for information on converting between common timescales.

The communications in the TAN 100 occur via PTP messages and/or media-specific messages. The PTP messages may be any suitable datagram or protocol data unit (PDU). These messages may have the following attributes: message class and message type. The message type attribute indicates a type or name of a particular message such as "sync", "announce", "time measurement frame", and/or the like (see e.g., section 3.18 of [IEEE802.1AS]). Some messages have additional attributes; these are defined in the subclauses where the respective messages are defined.

There are two message classes, the event message class and the general message class. General messages are not timestamped whereas event messages are timestamped on egress from a PTP instance and ingress to a PTP instance. The timestamp is the time, relative to the LocalClock entity (see e.g., LocalClock entity 215 of FIG. 2 and section 10.1 in [IEEE802.1AS]) at which the message timestamp point passes the reference plane marking the boundary between the PTP instance and the network media. The definition of the timestamp measurement plane (see e.g., section 3.33 of [IEEE802.1AS]), along with the corrections defined as follows, allows transmission delays to be measured in such a way (at such a low layer) that they appear fixed and symmetrical to gPTP even though the MAC client might otherwise observe substantial asymmetry and transmission variation. For example, the timestamp measurement plane is located below any retransmission and queuing performed by the MAC.

Additionally, the PTP instances in a gPTP domain interface with the network media via physical ports. gPTP defines a logical port (e.g., a PTP port) in such a way that communication between PTP instances is point-to-point even over physical ports that are attached to shared media. One logical port, consisting of one PortSync entity and one media-dependent (MD) entity, is instantiated for each PTP instance with which the PTP instance communicates. For shared media, multiple logical ports can be associated with a single physical port. Additional aspects of the PTP ports are discussed in section 8.5 of [IEEE802.1AS].

Although the TAN 100 is described as being implemented according to gPTP, the embodiments discussed herein are also applicable to PTP implementations. In gPTP there are only two types of PTP instances: PTP end instances and relay instances, while [IEEE1588] has ordinary clocks, boundary clocks, end-to-end transparent clocks, and P2P transparent clocks. A PTP end instance corresponds to an Ordinary Clock in [IEEE1588], and a relay instance is a type of [IEEE1588] Boundary Clock where its operation is very tightly defined, so much so that a relay instance with Ethernet ports can be shown to be mathematically equivalent to a P2P Transparent Clock in terms of how synchronization is performed (see e.g., [IEEE802.1AS] § 11.1.3). In addition, a relay instance can operate in a mode (e.g., the mode where the variable syncLocked is TRUE; see e.g., [IEEE802.1AS] § 10.2.5.15) where the relay instance is equivalent to a P2P Transparent Clock in terms of when time-synchronization messages are sent. A TAS measures link delay and residence time and communicates these in a correction field. In summary, a relay instance conforms to the specifications for a Boundary Clock in IEEE15881-based systems, but a relay instance does not conform to the complete specifications for a P2P Transparent Clock in [IEEE1588] because: 1) when syncLocked is FALSE, the relay instance sends Sync according to the specifications for a Boundary Clock, and 2) the relay instance invokes the BMCA and has PTP port states. Furthermore, gPTP communications between PTP instances is done using IEEE 802 MAC PDUs and addressing, while [IEEE1588] supports various layer 2 and layer 3-4 communication methods.

Figure 2:
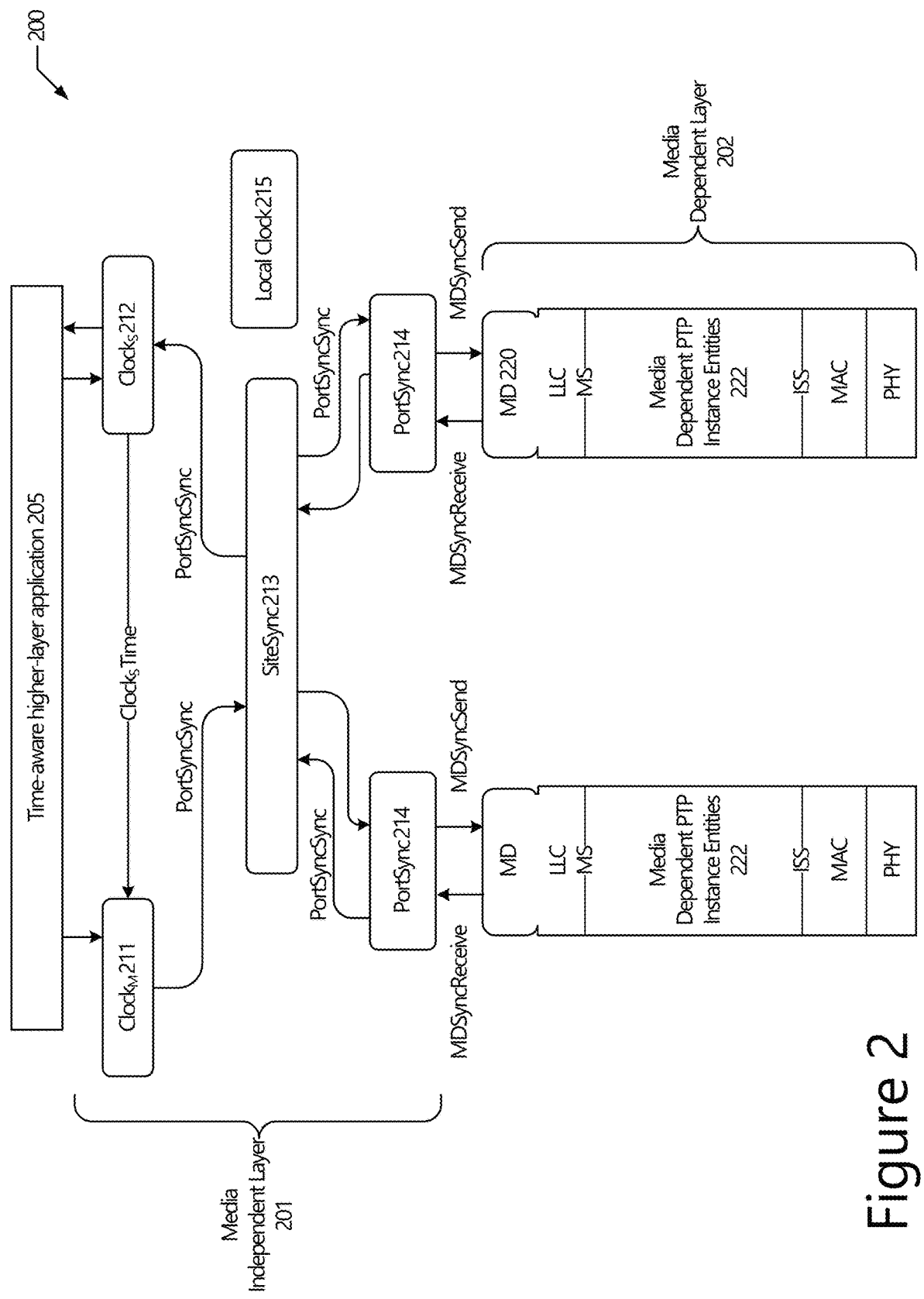
FIG. 2 depicts an example PTP instance model.

FIG. 2 depicts an example PTP instance model 200. The PTP instance model 200 includes a time-aware higher-layer application 205, a media independent layer 201 and one or more media dependent entities 222 within a media dependent layer 202. The time-aware higher-layer application (app) 205 is a TSA and/or any application that utilizes the time-aware aspects of a TAN 100 and/or the like. Examples of such apps 205 include audio, video, time-sensitive control apps, network apps, network functions, and/or other like apps.

If the PTP instance includes app(s) 205 that either use or source time information, then they interface with the gPTP information using the application interfaces specified in clause 9 of [IEEE802.1AS]. These interfaces include a ClockSourceTime interface, which provides external timing to the PTP instance, a ClockTargetEventCapture interface, which returns the synchronized time of an event signaled by a ClockTarget entity, a ClockTargetTriggerGenerate interface, which causes an event to be signaled at a synchronized time specified by a ClockTarget entity, a ClockTargetClockGenerator interface, which causes a periodic sequence of results to be generated, with a phase and rate specified by a ClockTarget entity, and a ClockTargetPhaseDiscontinuity interface, which supplies information that an application can use to determine if a discontinuity in GM Clock phase or frequency has occurred.

The single media-independent part 201 includes a main clock (Clock$_M$) 211 (sometimes referred to as a "ClockMaster"), a secondary clock (Clocks) 211 (sometimes referred to as a "ClockSlave"), and SiteSync logical entities 213, one or more PortSync entities 214, and a LocalClock entity 215. The BMCA and forwarding of time information between logical ports and the and Clock$_M$ 211 is done by the SiteSync entity 213, while the computation of PTP port-specific delays needed for time-synchronization correction is done by the PortSync entities 214.

The PTP Instance has a LocalClock entity (e.g., ClockM and/or Clocks), which can be a free-running clock circuitry (e.g., a quartz crystal) that meets the requirements of [IEEE802.3], but could also be better than those requirements. There can be a ClockSource entity (e.g., timing taken from positioning circuitry 1975 of FIG. 19), available in the local system that provides timing to the ClockSource entity. The time provided by the PTP instance, if it is the GM PTP instance, is reflected by the combination of these two entities, and the clockClass reflects this combination as specified in section 7.6.2.5 of [IEEE1588]. The clockClass attribute denotes the traceability of the synchronized time distributed by a ClockMaster when it is the GM PTP instance. For example, when the LocalClock entity uses a quartz oscillator that meets the requirements of IEEE Std 802.3-2018 and B.1 of this standard, clockClass is set to 248. But, if a GNSS receiver is present and synchronizes the PTP Instance, then the clockClass is set to the value 6, indicating traceability to a primary reference time source (see 7.6.2.5 of IEEE Std 1588-2019).

The media dependent layer 202 includes a protocol stack including media-dependent (MD) ports 220 disposed on a logical link control (LLC) layer, which is separated from the one or more media dependent entities 222 by a MAC Service (MS). The media dependent entities 222 is connected to a media access control (MAC) layer by an Internal Sublayer Service (ISS), and the MAC layer is disposed on a physical (PNY) layer. MD ports 220, which translate the abstract "MDSyncSend" and "MDSyncReceive" structures/signals received from or sent to the media-independent layer and corresponding methods used for the particular LAN attached to the port.

For full-duplex Ethernet ports, [IEEE1588] Sync and Follow_Up (or just Sync if the optional one-step processing is enabled) messages are used, with an additional TLV in the Follow_Up (or the Sync if the optional one-step processing is enabled) used for communication of the RR and information on phase and frequency change when there is a change in GM instance. The path delay (pDelay) is measured using the two-step [IEEE1588] P2P delay mechanism. This is defined in clause 11 of [IEEE802.1AS].

For IEEE802111 ports, timing information is communicated using the MAC Layer Management Entity to request a "Timing Measurement" or "Fine Timing Measurement" (as defined in [IEEE802111]), which also sends everything that would be included in the Follow_up message for full-duplex Ethernet. The Timing Measurement or Fine Timing Measurement result includes all the information to determine the path delay. This is defined in clause 12 of [IEEE802.1AS]. For EPON, timing information is communicated using a "slow protocol" as defined in clause 13 of [IEEE802.1AS]. CSNs use the same communication system used by full-duplex Ethernet, as defined in clause 16 of [IEEE802.1AS].

1.2. Transmission Selection and Scheduled Traffic Aspects

Time Sensitive Networks (TSN) has emerged as the set of (sub-)standards incorporating real-time support as an extension of standard Ethernet. In particular, *IEEE Standard for Local and Metropolitan Area Networks Bridges—Bridged Networks—Amendment 25: Enhancements for Scheduled Traffic*, IEEE Std 802.1Qbv (2015) ("[IEEE802.1Qbv]"), which is now incorporated into [IEEE802.1Q], defines a time-triggered communication paradigm with the addition of a TAN shaper governing the selection of frames at the egress queues according to a predefined schedule, encoded in gate control lists (GCL) (e.g., GCL 350 in FIG. 3).

1.2.1. Transmission Selection Aspects

Figure 3:
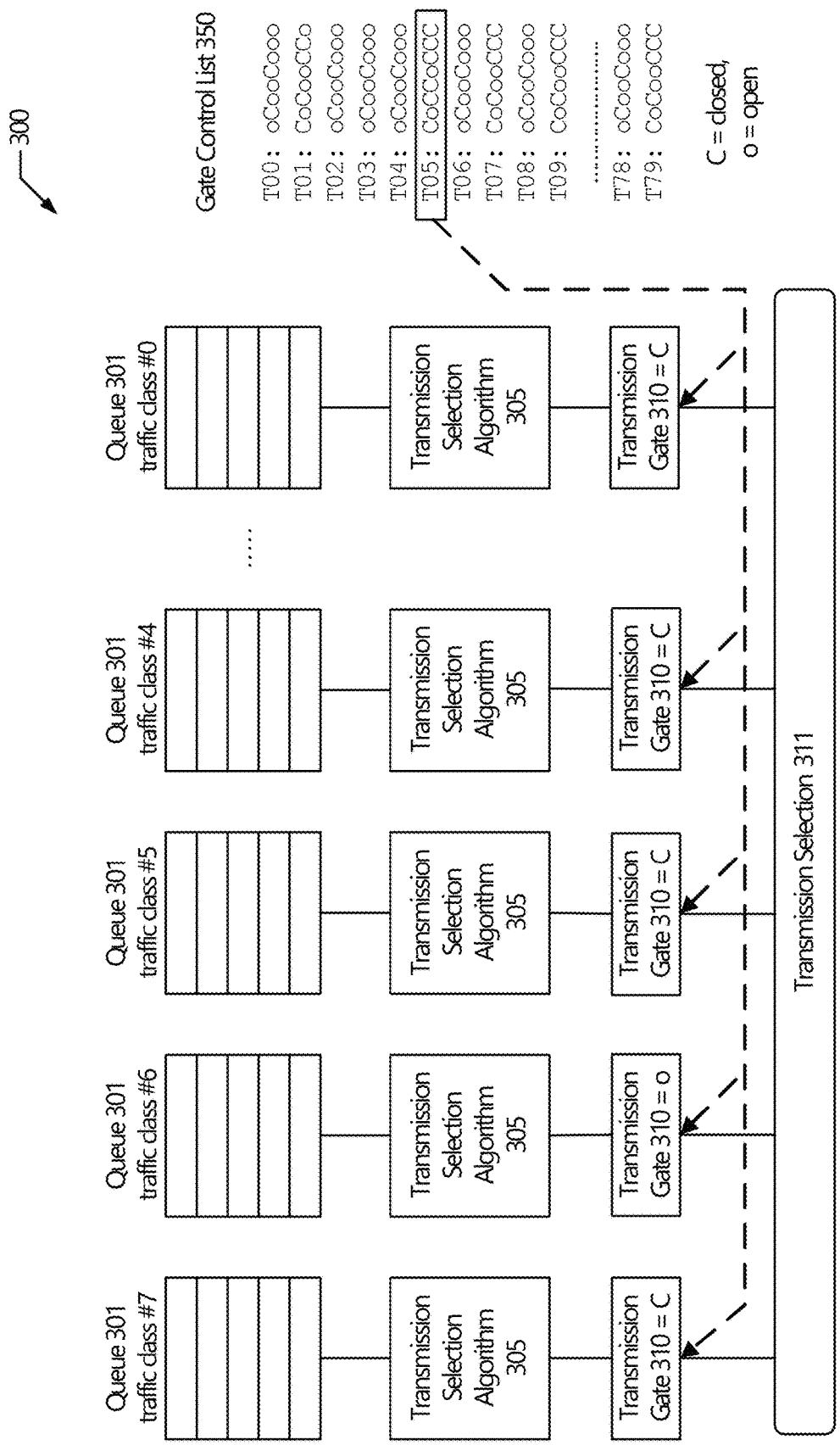
FIG. 3 depicts an example of transmission selection with gates.

For each port, frames are selected for transmission on the basis of the traffic classes (TCs) that the port supports and the operation of the transmission selection algorithms supported by the corresponding queues on that port. For example, as shown by FIG. 3, there are multiple queues 301, each of which is defined or assigned to a different TC (e.g., TCs 0-7 in the example of FIG. 3). For a given port and TC, frames are selected from the corresponding queue for transmission when (a) the operation of the transmission selection algorithm supported by that queue determines that there is a frame available for transmission; and (b) for each queue corresponding to a numerically higher value of TC supported by the Port, the operation of the transmission selection algorithm supported by that queue determines that there is no frame available for transmission.

In a port of a bridge or station that supports priority-based flow control (PFC), a frame of priority n is not available for transmission if that priority is paused (e.g., if Priority_Paused[n] is TRUE (see e.g., [IEEE802.1Q] § 36.1.3.2) on that port. When transmission selection is running above link aggregation, a frame of priority n is not available for transmission if that priority is paused on the physical port to which the frame is to be distributed. In some cases, two or more priorities can be combined in a single queue. In this case, if one or more of the priorities in the queue are paused, it is possible for frames in that queue not belonging to the paused priority to not be scheduled for transmission. Additionally or alternatively, mixing PFC and non-PFC priorities in the same queue results in non-PFC traffic being paused causing congestion spreading, and therefore is not recommended.

In a port of a bridge or station that supports frame preemption, a frame of priority n is not available for transmission if that priority is identified in the frame preemption status table (see e.g., [IEEE802.1Q] § 6.7.2) as preemptible and either the holdRequest object (see e.g., [IEEE802.1Q] § 12.30.1.5) is set to the value hold, or the transmission of a prior preemptible frame has yet to complete because it has been interrupted to allow the transmission of an express frame. The strict priority transmission selection algorithm defined in [IEEE802.1Q] § 8.6.8.1 is supported by all bridges as the default algorithm for selecting frames for transmission. The credit-based shaper transmission selection algorithm defined in [IEEE802.1Q] § 8.6.8.2, and the ETS algorithm defined in [IEEE802.1Q] § 8.6.8.3 may be supported in addition to the strict priority algorithm. Further transmission selection algorithms, selectable by management means, may be supported as an implementation option so long as the requirements of [IEEE802.1Q] § 8.6.6 are met.

The transmission selection algorithm table for a given port assigns, for each TC that the port supports, the transmission selection algorithm that is to be used to select frames for transmission from the corresponding queue. Transmission selection algorithm tables may be managed, and allow the identification of vendor-specific transmission selection algorithms. The transmission selection algorithms are identified in the transmission selection algorithm table by means of integer identifiers, as defined in Table 1.

TABLE 1

Transmission selection algorithm identifiers

| Transmission Selection Algorithm | Identifier |
| --- | --- |
| Strict priority (see e.g., [IEEE802.1Q] § 8.6.8.1) | 0 |
| Credit-based shaper (see e.g., [IEEE802.1Q] § 8.6.8.2) | 1 |
| Enhanced Transmission Selection (ETS) (see e.g., [IEEE802.1Q] §§ 8.6.8.3, 37) | 2 |
| Reserved | 3-254 |
| Vendor-specific Transmission Selection algorithm value for use with Data Center Bridging eXchange Protocol (DCBX) (see e.g., [IEEE802.1Q] §§ 38, D.2.8.8) | 255 |
| Vendor-specific | A four-octet integer, where the most significant 3 octets hold an OUI or CID value, and the least significant octet holds an integer value in the range 0-255 assigned by the owner of the OUI or CID. |

In implementations that do not support the credit-based shaper transmission selection algorithm, the recommended default configuration for the transmission selection algorithm tables is to assign the strict priority transmission selection algorithm to all supported TCs. In implementations that support the credit-based shaper transmission selection algorithm, the recommended default configuration for the transmission selection algorithm tables is defined in [IEEE802.1Q] § 34.5. When the enhancements for scheduled traffic are supported, additional requirements to determine whether a frame is available for transmission apply, as specified in [IEEE802.1Q] § 8.6.8.4.

1.2.2. Enhancements for Scheduled Traffic

FIG. 3 shows an example of gate-based transmission selection scheme 300. Here, a bridge or an end station may support enhancements that allow transmission from each queue 301 to be scheduled relative to a known timescale. In order to achieve this, a transmission gate 310 is associated with each queue 301. The state of the transmission gate 310 determines whether or not queued frames (e.g., frames stored in a corresponding queue 301) can be selected for transmission. For a given queue 301, the transmission gate 310 can be in one of two states: open or closed. In the open state, queued frames are selected for transmission in accordance with a transmission selection algorithm 305 associated with the queue 301. In the closed state, queued frames are not selected for transmission. The transmission selection algorithm 305 for an individual queue 301 can be any of those shown by Table 1 (supra) and/or some other suitable transmission selection algorithm 305. Additionally, one or more queues 301 can have a different transmission selection algorithm 305 than other queues 301. For example, a first transmission selection algorithm 305 of a first queue 301 may be strict priority, a first transmission selection algorithm 305 of a first queue 301 may be ETS, and so forth.

The gates 310 are controlled by a programmable common gate control list, which specifies individual traffic queues 301 is/are permitted to transmit at a given point in time within a cycle. The GCL 350 associated with each port contains an ordered list of gate operations (listed as T00 to T79 in the example of FIG. 3). Each gate operation changes the transmission gate state for the gate associated with each of the port's TC queues 301 and allows associated control operations to be scheduled. In an implementation that does not support enhancements for scheduled traffic, all gates are assumed to be permanently in the open state. Table 2 shows example gate operation types, their parameters, and the actions that result from their execution. The state machines that control the execution of the gate control list, along with their variables and procedures, are specified in [IEEE802.1Q] § 8.6.9.

It can be assumed that the implementation has knowledge of the transmission overheads that are involved in transmitting a frame on a given port and can therefore determine how long the transmission of a frame will take. However, there can be reasons why the frame size, and therefore the length of time needed for its transmission, is unknown; for example, where cut-through is supported, or where frame preemption is supported and there is no way of telling in advance how many times a given frame will be preempted before its transmission is complete. It is desirable that the schedule for such traffic is designed to accommodate the intended pattern of transmission without overrunning the next gate-close event for the TCs concerned.

Additionally or alternatively, it can be assumed that the implementation can determine the time at which the next gate-close event will occur from the sequence of gate events.

TABLE 2

Gate operations

| Operation name | Parameter(s) | Action |
| --- | --- | --- |
| SetGateStates | GateState, TimeInterval | The GateState parameter indicates a value, open or closed, for each of the Port's queues. The gates are immediately set to the states indicated in the GateState parameter. This causes gate-close events (see e.g., [IEEE802.1Q] § 3.97) and/or gate-open events (see e.g., [IEEE802.1Q] § 3.98) to occur for any queue where the new GateState represents a change of state relative to the current state of the gate. After TimeInterval ticks (see e.g., [IEEE802.1Q] § 8.6.9.4.16) have elapsed since the completion of the previous gate operation in the gate control list, control passes to the next gate operation. |
| Set-And-Hold-MAC | GateState, TimeInterval | Performs all of the actions defined for the SetGateStates operation; in addition, the start of this operation marks the point in the sequence of gate operations at which the MAC associated with the port is to have stopped transmitting preemptible frames. This is achieved by setting the holdRequest managed object to the value hold (1), at holdAdvance (see e.g., Table 12-30 in [IEEE802.1Q]) nanoseconds in advance of this point for the hold to have taken effect at this point. If frame preemption is not supported or not enabled (preemptionActive is FALSE), this operation behaves the same as SetGateStates. |
| Set-And-Release-MAC | GateState, TimeInterval | Performs all of the actions defined for the SetGateStates operation; in addition, the start of this operation marks the point in the sequence of gate operations at which the MAC associated with the port is permitted to resume transmitting preemptible frames; if an express frame is currently being transmitted by the MAC, the release takes effect at the end of that transmission. This is achieved by setting the holdRequest managed object to the value release (2), at releaseAdvance (see e.g., Table 12-30 in [IEEE802.1Q]) nanoseconds in advance of this point for the release to have taken effect at this point (see note a). If frame preemption is not supported or not enabled (preemptionActive is FALSE), this operation behaves the same as SetGateStates. |

Note a.
The releaseAdvance parameter allows the timing of when the release command is issued to vary depending upon the constraints of a particular implementation. Its value should be less than the minimum frame size so that release does not occur too early and interfere with transmission of the last express frame.

In addition to the other checks carried out by the transmission selection algorithm, a frame on a TC queue is not available for transmission (e.g., as required for tests (a) and (b) in [IEEE802.1Q] § 8.6.8). if the transmission gate is in the closed state or if there is insufficient time available to transmit the entirety of that frame before the next gate-close event (see e.g., [IEEE802.1Q] § 3.97) associated with that queue. A per-TC counter, TransmissionOverrun (see e.g., [IEEE802.1] § 12.29.1.1.2), is incremented if the implementation detects that a frame from a given queue is still being transmitted by the MAC when the gate-close event for that queue occurs.

In the normal case, this can be achieved by inspecting the sequence of gate operations in OperControlList (see e.g., [IEEE802.1Q] § 8.6.9.4.19) and associated variables. However, when a new configuration is about to be installed, it would be necessary to inspect the contents of both the OperControlList and the AdminControlList (see e.g., [IEEE802.1Q] § 8.6.9.4.2) and associated variables in order to determine the time of the next gate-close event, as the gating cycle for the new configuration may differ in size and phasing from the old cycle.

A per-TC queue queueMaxSDU parameter defines the maximum service data unit size for each queue; frames that exceed queueMaxSDU are discarded (see e.g., item (b8) in [IEEE802.1Q] § 6.5.2). The value of queueMaxSDU for each queue is configurable by management (see e.g., [IEEE802.1Q] § 12.29); its default value is the maximum SDU size supported by the MAC procedures employed on the LAN to which the frame is to be relayed (see e.g., item (b3) in [IEEE802.1Q] § 6.5.2).

The use of PFC is likely to interfere with a traffic schedule, because PFC is transmitted by a higher layer entity (see e.g., [IEEE802.1Q] § 36). In order for an end station to support the scheduled transmission of frames, it is necessary for its behavior to be compatible with the operation of the forwarding and queuing mechanisms employed in the Bridges to which it connects. In effect, the requirements for an end station are for its transmission selection to operate as if it is a single outbound Port of a Bridge that supports scheduled traffic. There are no particular requirements for end station support for the reception of scheduled traffic; only for the transmission of scheduled traffic.

1.3. Low Latency and Scalable Gate Control for TSN

Emerging IEEE standards for deterministic networking referred to collectively as Time Sensitive Networking (TSN) provide extremely precise data transfer across the network. As a result, embedded designs in the industrial and automotive space are increasingly integrating TSN technology. The inevitable convergence of information technology (IT) and industrial operations technology (OT), workload consolidation and demand for seamless communication across many connected devices necessitates not only transmission of various types of data traffic through the NIC, but also precise scheduling of the packets without sacrificing the latencies for hard real-time applications.

To address these different types of traffic, the [IEEE802.1Q] standard defined eight TCs with priorities and to address the precise scheduling of real-time traffic, the [IEEE802.1Qbv] standard (now incorporated into [IEEE802.1Q]) defined gate control based scheduling (see e.g., section 1.2.2, supra). Based on these standards, the current TSN capable NICs implemented 8 transmission (Tx) hardware (HW) queues and 8 reception (Rx) HW queues with each Tx and Rx queue pair dedicated to individual TCs. The data flowing through these queues is controlled by a GCL 350, which is programmed by an application (e.g., gate control logic, which can include a TSN configuration service 815 by itself or the TSN configuration service 815 that operates in conjunction with a GCE 850, each of which is discussed infra with respect to FIGS. 8-9). The length or amount of time a particular traffic queue is open or close, and how many such gate control operations are needed in a streaming cycle, is based on user application requirements and/or implementation.

Some NIC implementations support 512 gate control operations per a gating cycle. In each gate control operation, one or more queues is/are open or closed for a particular duration. For a precise control of gate operation, each gate duration is specified in 24-bits with nanosecond accuracy. Hence, this requires memory of 32 bits×512×2=4 KB, which is implemented within the NIC HW.

These implementations suffer from some drawbacks. First, implementing such a large memory takes considerable amount of silicon area, leading to high costs in terms of the size of the chip itself and the physical resources required to produce such chips. As the list grows bigger due to more gate control operations per cycle, and due to sub-nanosecond precise scheduling as required at higher NIC speeds such as 10 Gbps, the silicon area grows exponentially. Second, there is considerable impact on power consumption because the gate operations are read at high clock rates. In current implementations, the entire memory operates at 250 MHz clock, which leads to considerable power consumption. Third, programming such a large list can be quite complex. The programming complexity has become a bottleneck for many users, as the amount of time required to program such a large list is exceeding milliseconds. In some existing implementations, each downstream write operation takes about 2 microseconds (µs), which means that, to program 512 operations, it takes about 1 millisecond (ms). However, many industrial applications need cycle time of 250 µs or less, and existing applications are not able to program the list within one cycle requiring the current programming to span across several cycles. Setting up the GCL is eventually split over multiple cycles making the programming harder and more complex.

Figure 4:
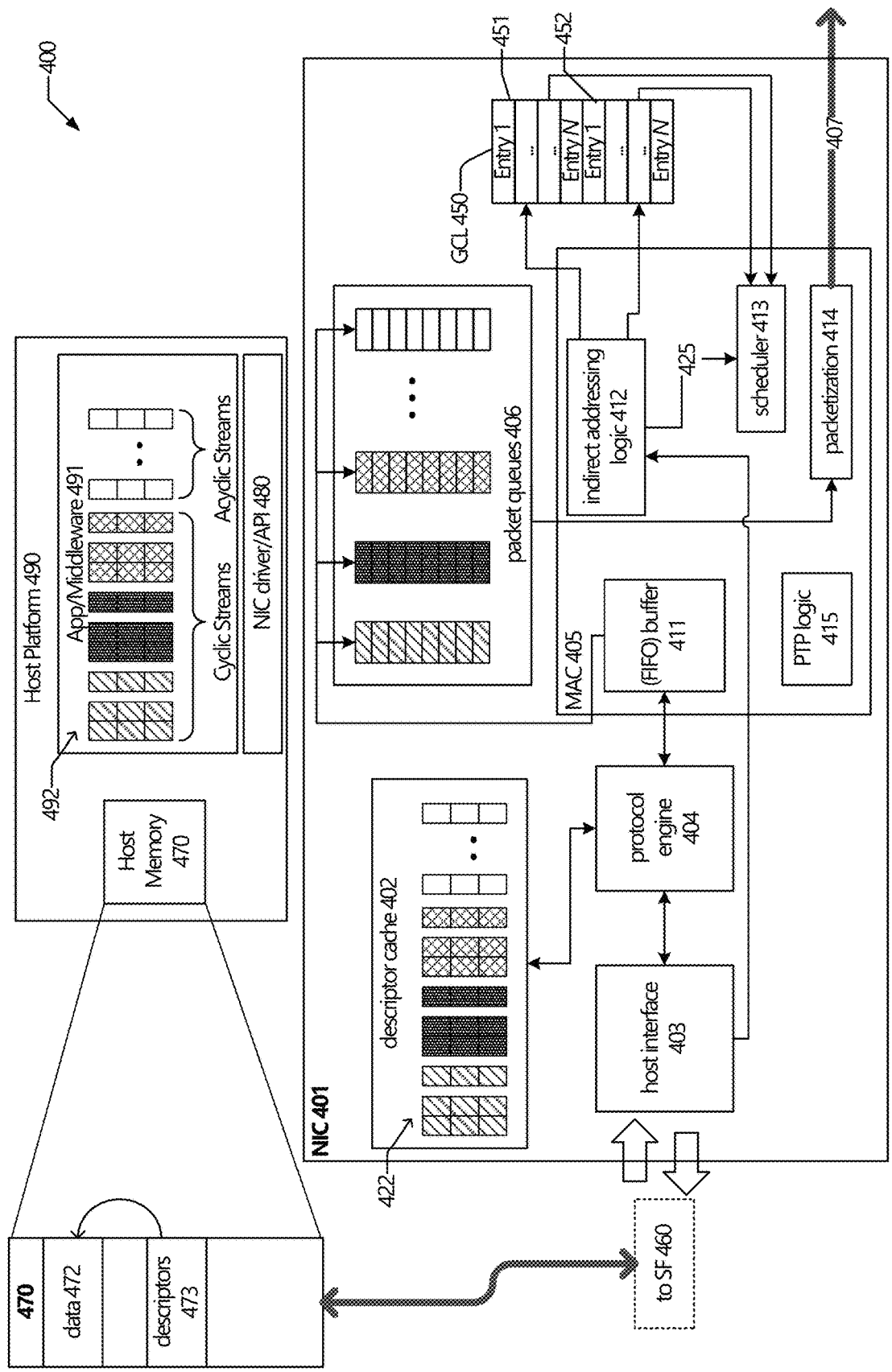
FIGS. 4 and 5 depict example TSN network interface circuitry (NIC) architectures.

FIG. 4 illustrates an example hardware implementation of an TSN Ethernet network interface controller (NIC) architecture 400, where a TSN Ethernet NIC 401 interacts with applications (apps) and/or middleware 491 operating in/on a host platform 490 via TSN Ethernet driver/API 480. The TSN Ethernet NIC 401 also interacts with memory 470 via system fabric (SF) 460 such as for example a primary system fabric (PSF) and/or any suitable IX technology (see e.g., IX 1956 of FIG. 19).

The host platform 490 may be a motherboard, a Multi-Chip Package (MCP), a System-on-Chip (SoC), a System-in-Package (SiP), or other like collection of hardware elements included in a complete computing system such as a server (e.g., blade, rack-mount, and/or the like), edge compute node, workstation, desktop computer, laptop or notebook computer, a network switch, a network access node (e.g., access point, base station, router, modem, bridge, gateway, and/or the like), a smartphone, a wearable device, an IoT device, a smart appliance, and/or the like. The host platform 490 includes a collection of chips/circuitry that includes processor circuitry (e.g., which may be the same or similar as processor circuitry 1952 of FIG. 19) and host memory circuitry 470 (e.g., which may be the same or similar as system memory 1954 of FIG. 19), which act in concert to execute program code to carry out various tasks, such as executing apps/middleware 491, NIC driver/API 480, and the like. In some examples, the host platform 490 can be a data processing unit (DPU) and/or an infrastructure processing unit (IPU) that handles one or multiple NICs 401. The apps/middleware 491 include, inter alia, various data buffers 492 that store data to be transmitted via the NIC 401 (e.g., data of a Tx data path), or store received data destined for one or more applications (e.g., data of an Tx data path). The various data buffers 492 correspond to different TCs, where each TC is represented by a different fill-pattern. Some of the buffers 492 store packets associated with cyclic streams (e.g., streams with higher TCs) and other buffers 492 store packets associated with acyclic streams or non-cyclic streams (e.g., streams with lower TCs). The buffers 492 may also be referred to as "streams 492" or the like.

The host memory 470 may be embodied as any suitable memory device such as random access memory (RAM) including double data rate (DDR) (e.g., DDR1, DDR2, DDR3, DDR4, and future DDR implementations) RAM (e.g., SRAM, DRAM, SDRAM, and the like) and/or some other suitable memory circuit(s). Although DDR is used as an example for the host memory throughout the present disclosure, the example implementations discussed herein should not be construed as limited to using such technologies and the implementations discussed herein may be applicable to any type or combination of memory technologies. In some implementations, the drivers/APIs 480 can set up a wide variety of host memory objects that are comprehended and manipulated by the NIC 401 for security and reliability purposes. Examples of such memory objects include queues 492, which may be referred to as transmit (Tx) queues 492 when transmitting data over the Tx data path and referred to as receive (Rx) queues 492 when receiving data over the Rx data path. The queues 492 can be implemented as ring buffers for submitting commands to a LAN engine (not shown) or protocol engine (PE) engine 404 or posting packets that arrive from the network. Commands take the form of packets/data 472 to be transmitted, descriptors 473 for empty host memory buffers to be filled with received packets/data 472, and the like. Queues 492 are typically mapped into OS or kernel space (or user space for dataplane switch-mode interface (DSI) drivers). In a virtualized server, they can be assigned either to a VMM or to VMs using SR-IOV. The Tx and Rx queues 492 can be assigned to PFs or VFs as needed. The queues 492 assigned to a particular interface function (e.g., PF or VF) can be used for distributing packet processing work to the different processors in a multi-processor system. On the Tx side, this is done by simply dedicating an independent Tx queue 492 for each processor or processor core to use. On the Rx side, packets are classified by the NIC 401 under OS or VMM control into groups of conversations. Each group of conversations is assigned its own Rx queue 492 and Rx processor or processor core according to, for example, hash-based classification (e.g., receive side scaling (RSS) or the like), flow director (e.g., Intel® Ethernet Flow Director) in an application targeting routing (ATR) mode or an externally programmed (EP) mode, protocol engine quad-hash classification, and/or the like (see e.g., Introduction to Intel® Ethernet Flow Director and Memcached Performance, Intel® White Paper (2014), the contents of which is hereby incorporated by reference in its entirety). Additionally or alternatively, the queues 492 assigned to a particular interface function (e.g., PF or VF) can be used for assigning traffic classes (TC). Tx queue 492 assigned to different TCs are serviced at different rates by the Tx scheduler 413, and Rx queue 492 assigned to different TCs can be serviced at different rates by an Rx scheduler 413 and/or a Quality of Service (QoS)-enabled OS and its software device drivers/APIs 480. Additionally or alternatively, the queues 492 assigned to a particular interface function (e.g., PF or VF) can be used to associate queues with VMs in VMDq1 or VMDq2 modes, saving packet processing and copying by the VMM. Additionally or alternatively, the queues 492 assigned to a particular interface function (e.g., PF or VF) can be used to associated DSI queues 492 with different wireless operators, providing a degree of separation between the operators.

Other memory objects include other types of queues including, for example, LAN Auxiliary structures (e.g., Tx completion queues, Tx doorbell (DB) queues, Tx quanta descriptor (QD) queues, and/or the like), LAN queue pairs (LQPs), protocol engine queue pairs (QPs), RDMA queues, control queue (or admin queue (AQ)) pairs, and/or the like (see e.g., *Intel® Ethernet Controller X710/XXV710/XL710 Datasheet*, INTEL® ETHERNET PRODUCTS GROUP (EPG), Order No.: 332464-025, revision 4.0 (February 2022) ("[X710]"), and *Intel® Ethernet Controller E810 Datasheet*, INTEL® ETHERNET PRODUCTS GROUP (EPG), document no.: 613875-006, revision 2.4 (March 2022) ("[E8101]"), the contents of each of which are hereby incorporated by reference in their entireties).

The host memory 470 stores data 472 and descriptors 473. The descriptors 473 are software constructs that describe packets such as, for example, where the packet is stored, the length of the packet, and the like. In some examples, the descriptors 473 are 16 byte structures, although other size descriptors 473 can be used depending on the implementation of the compute system 400. Examples of the descriptors 473, for both the Tx data path and the Rx data path, include LAN descriptors, filter program descriptors, Fibre Channel over Ethernet (FCoE) descriptors, and/or the like. In some examples, the descriptors 473 may be one quadword in length (e.g., 64 bits in x86 implementations, 128 bits in ARM implementations, and so forth) or two quadwords in length. In some implementations, the memory 470, or at least a portion of the memory 470 used to store the descriptors 473, can be arranged or implemented as a ring or circular buffer such as a LAN Tx/Rx queue (ring) (see e.g., [X710], [E8101]).

For the Tx data path, transmit packets are made up of data buffers 492 in host memory 470 indicated to the hardware by descriptors 473. The descriptors 473 include pointer and length pairs to the data buffers 492 as well as control fields for Tx data processing. In some cases, additional control parameters that cannot fit within the data descriptors 473 are needed to process the packet(s). In this case, additional context descriptor(s) are used in-front of the data descriptors 473. Examples of such context descriptors includes transmit segmentation (TSO), flow director (FD) filter programming, and FCoE context programming. For the Rx data path, receive packets are posted to system (host) memory buffers 492 indicated to the hardware by descriptors 473. The descriptors 473 include pointers to the data buffers 492 and status indications of the received packets. The Rx descriptors 473 are fetched on demand to/from descriptor cache 402. The Rx descriptors 473 and the Rx data buffers 492 are stored in the host memory 470 and are similar to the Tx descriptors 473 and Tx data buffers 492. However, it should be noted that the Rx descriptors 473 and the Rx data buffers 492 are different and/or separate from the Tx descriptors 473 and Tx data buffers 492. The NIC driver 480 copies data from the application memory buffers 492 into driver space memory buffers 472 for the Tx data path. Similarly, the driver 480 copies the Rx data from Rx data buffer 472 to host memory 492.

The TSN Ethernet NIC 401 includes descriptor cache 402, a host interface 403, a protocol engine (PE) 404, a MAC layer entity 405 (or simply "MAC 405"), packet queues 406 (also referred to as "data queues 406", "traffic class queues 406", or the like), and GCL 450. The MAC 405 includes a buffer (e.g., a FIFO buffer) 411, indirect addressing logic 412, a scheduler 413, a packetizer 414, and PTP logic 415. For purposes of the present disclosure, when receiving packets over the Rx data path, the queues 406 may be referred to as Rx queues 406, descriptor cache 402 may be referred to as Rx descriptor cache 402, the MAC 405 may be referred to as an Rx MAC 405, the buffer 411 may be referred to as an Rx buffer 411, and the scheduler 413 may be referred to as an Rx scheduler 413. For purposes of the present disclosure, when transmitting packets over the Tx data path, the queues 406 may be referred to as Tx queues 406, descriptor cache 402 may be referred to as Rx descriptor cache 402, the MAC 405 may be referred to as a Tx MAC 405, the buffer 411 may be referred to as a Tx buffer 411, and the scheduler 413 may be referred to as a Tx scheduler 413.

The descriptor cache 402 is used to store fetched descriptors 473 for later use (as discussed infra). The descriptor cache 402 includes multiple slots/descriptor queues 422, which store descriptor data for corresponding queues 406/492. The host interface 403 is an interface between the host platform 490 and the NIC 401, which is used to convey data between the host platform 490 (e.g., memory 470) and the NIC 401. In some implementations, the host interface 403 implements a set of physical functions (PFs) and a set of virtual functions (VFs). As examples, the host interface x103 can be an integrated on-chip system fabric (IOSF) interface, a PCIe interface, and/or the like.

The PE 404 is a hardware component that offloads protocol processing from the host platform 490, places received data payloads directly into user buffers 406 with no host processor involvement, and eliminates user-kernel context switching when performing I/O by mapping the (R)DMA programming interface directly into application address space. Additionally or alternatively, the PE 404 can directly access the host memory 470 via the host interface 403 in order to read or write data independently of and/or in parallel with host platform execution. The PE 404 can fetch descriptors 473 and store the descriptors 473 in the descriptor cache 402 for later use. Multiple descriptors 473 can be fetched at a time to minimize interface 403 and memory 470 bandwidth overhead. For the Rx data path, Rx descriptors 473 are fetched to the descriptor cache 402 when there are fewer descriptors 473 than incoming packets require, and/or when the last free Rx descriptor 473 is used for an Rx packet. As examples, the PE 404 implements a direct memory access (DMA) based protocol such as ISA, PCI (or variants thereof), advanced microcontroller bus architecture high-performance bus (AHB), multichannel DMA (MCDMA) (e.g., AXI MCDMA, PCIe MCDMA, and/or the like), and/or the like; a remote DMA (RDMA) protocol such as iSCSI Extensions for RDMA (iSER) protocol, RDMA over Converged Ethernet (RoCE), RoCEv2 (or variants thereof), InfiniBand™ over Ethernet (IBoE), Internet Protocol over InfiniBand™ (IPoIB), internet wide area RDMA protocol (iWARP), and/or the like (for purposes of the present disclosure, the term "(R)DMA" may refer to DMA, RDMA, or both protocols); Intel® Omni-Path Architecture; Open Fabric Interface (OFI); Portals 4.0 Network Programming Interface; a message passing protocol such as Message Passing Interface (MPI), Intel® Performance Scaled Messaging (PSM), and/or the like. In various implementations, the PE 404 can include multiple channels to access the data 472. In one example, the PE 404 has one channel for each queue 492 or one channel per TC.

The packet queues/buffers 406 store data for transmission to external devices, or data received from external devices and destined for one or more apps/middleware 491. The packet queues/buffers 406 may be the same or similar as the queues 301 of FIG. 3, and may be arranged in a same or similar manner as the gate-based transmission selection scheme 300 of FIG. 3. The PE 404 fetches data 472 from the memory 470 and stores the data 472 in the appropriate queues 406. Additionally, the PE 404 fetches descriptors 473 and are stores the descriptors 473 in the appropriate slots 422 in the descriptor cache 402.

As mentioned previously, the descriptors 473 contain the address to the data 472 that is to be transmitted, or locations where data from received packets is/are to be stored. Once the pointers are known to the NIC 401 (or the MAC 405 or the PE 404), the NIC 401 (or the MAC 405 or the PE 404) will fetch the descriptors 473 from the memory 470, parses the descriptors 473 to obtain the pointers to where the data 472 resides, and stores those pointers (or the descriptors 473 themselves) in corresponding slots 422 in the descriptor cache 402. Each slot 422 (also referred to as "descriptor queues 422") belongs to a specific TC and a specific data queue 406. Based on the pointers in the descriptor cache 402, the PE 404 will fetch the data 472 at the relevant location, and store that data 472 in a corresponding queue 406.

The MAC (FIFO) buffer 411 stores data obtained from the data buffers 492, which are then forwarded to, or otherwise stored in, a corresponding packet queue 406. The scheduler 413 coordinates transmission or reception of packets. For example, the Tx scheduler 413 determines the order and timing of packets sent over the network. The Tx scheduler 413 is responsible for pacing traffic to network ports, guarantees bandwidth allocation among requesters, performs rate limiting where needed, and paces packets to avoid congestion later in the network. In some implementations, the Tx scheduler 413 receives requests (e.g., "doorbells") from LAN and/or (R)DMA queues and schedules these for transmission. A scheduling decision allows a given "quanta" of bytes or packets from a given queue 492 or set of queues 492 to be fetched from host memory 470, which are placed in Tx queues 406, packetized 414, and eventually sent over the network 407. For assigning TCs, Tx queues 406 assigned to different TCs are serviced at different rates by the Tx scheduler 413 and Rx queues assigned to different TCs can be serviced at different rates by the Rx scheduler 413 and/or a QoS-enabled operating system and its software device drivers 480.

The scheduler 413 also coordinates the flow of data/packets from the queues 406 to the packetizer 414 using the GCL 450. The GCL 450 may be implemented using in-package memory circuitry (also referred to as "on-chip memory circuitry", "on-die memory circuitry", or the like), which is memory circuitry configured to store GCL data and/or gate control logic for operating the GCL 450. The in-package memory circuitry 113 may include the same or similar memory devices discussed herein such as, for example, a DDR SRAM circuit. In some implementations, the (FIFO) buffer 411 can utilize the same memory device as used for the GCL 450, or the (FIFO) buffer 411 can be implemented using a separate on-board memory device. Although DDR is used as an example for the in-package memory circuitry throughout the present disclosure, the example implementations discussed herein should not be construed as limited to using such technologies and the implementations discussed herein may be applicable to any type or combination of memory technologies.

As discussed previously, GCL 450 controls the gates connected to each queue 406 (e.g., gates 310 of FIG. 3). When the data/packets in the queues 406 is/are released, the data/packets are then forwarded to the packetizer 414. The indirect addressing logic 412 provides indirect addressing to create an extended address space enabling access to a large number of registers within the NIC 401. The packetizer 414 performs various processing tasks/operations to generate suitable frames or packets (e.g., appending L2 CRC to the packet, encapsulation/decapsulation, and/or the like), which are then sent over the wire 407 using a preconfigured interface.

The PTP logic 415 is used to synchronize internal clocks according to a network primary clock (e.g., a PTP GM instance as discussed previously) by collecting measurements of special Tx and Rx packets close to the Ethernet link 407, which are used to measure the latency between the primary clock and an end-point clock in both link directions. The PTP logic 415 can also inform the scheduler 413 about TSN/TSA application data in one or more queues 406 and/or a queue 406 that buffers TSN/TSA application data or a corresponding TC.

As an example, a Tx data flow of the NIC 401 may operate as follows: First, a descriptor ring (e.g., represented by descriptors 473 in FIG. 4) in memory 470 and configures each of the Tx queues 492 with an address location, length, head, and tail pointers of respective locations in the descriptor ring buffer, or with an address location, length, head, and tail pointers of respective descriptor ring buffers. Next, when the host platform 490 is requested by a network protocol stack or application 491 to transmit a data, that data is placed within one or more data buffers 492. The transmission can start with a "doorbell" from software 491 and/or drivers/APIs 480, indicating data is waiting in some transmit queue 492 in host memory 470. If the queue 492 is a LAN queue, the doorbell is registered with the internal Tx scheduler 413. If the queue 492 is a (R)DMA queue, the request is registered with the PE 404 (or a PE scheduler in the PE 404). When the PE scheduler selects a request, the request goes through (R)DMA protocol processing, at the end of which an internal request is issued to the Tx scheduler 413. Then the host platform 490 initializes the descriptor(s) 473 that point to the data 472/data buffer(s) 492 and have additional control parameters that describes the needed hardware functionality. The host platform 490 places the descriptor(s) 473 in the correct location(s) at the appropriate Tx ring(s) and updates appropriate queue tail pointer(s) (TDT). The PE 404 senses or detects a change of a specific TDT and as sends a request to the host interface 404 to fetch the descriptor(s) 473 from host memory 470. The descriptor(s) 473 is/are received and is/are written to the appropriate location(s) in the descriptor queue(s)/slot(s) 422.

Once the descriptor(s) 473 have been fetched and stored in the descriptor queue(s)/slot(s) 422, the PE 404 loads those descriptor(s) 473 from the descriptor queue(s)/slot(s) 422, parses them to determine the pointers to where the data 472 is stored, and fetches the data 473 at the indicated locations based on the pointers. Here, the packet data 472 is being received and passes through the PE 404, which performs various data manipulations (e.g., various processor offloading tasks such as checksum offload, TSO offload, and/or the like) on the packet data 472 on the fly. While the packet data 472 is passing through the PE 404, it is stored into the Tx (FIFO) buffer 411. After the data 472 for an entire packet is stored in the Tx (FIFO) buffer 411, it is then forwarded to the appropriate packet queue 406. The Tx scheduler 413 controls the flow of data out of the packet queues 406 using the GCL 450. The data flowing out of the packet queues 406 is obtained by the packetization module 414, which performs various processing tasks to generate a suitable packet (e.g., appending an L2 CRC to the packet, encapsulation, and/or the like) and sends the packet over the wire 407 using a preconfigured interface.

As alluded to previously, the GCL 450 is used to schedule the transmission of different classes of data (TCs) from the queues 406. The GCL 450 includes an ordered list of gate operations, and each gate operation specifies a set of gate states that control the opening and closing of the gates connected to each queue 406 (e.g., gates 310 of FIG. 3). Each gate operation in the GCL 450 is active for a prescribed period.

The GCL 450 and corresponding gate control logic for controlling GCL execution can be implemented using registers and hardware logic. The GCL 450 is implemented using a separate memory device, such as an SRAM device or the like. The memory size for implementing the GCL 450 is different depending on the application. Additionally, the GCL 450 is duplicated into two memory banks, including an odd bank 451 and an even bank 452, where each bank 451, 452 includes 1-N entries, where N is a number (e.g., 79 or 80). In one example implementation, the GCL 450 is implemented in an SRAM memory device having a size of 4 kilobytes (KB). In this example implementation, the GCL 450 includes 512 entries, which is duplicated into the two banks 451, 452 for a total of 1024 entries. Additionally, each entry is 32 bits (or 4 Bytes) in length or width, and therefore, the GCL 450 in this example has a total of 32000 bits (or 4 KBs). In implementations with eight queues 406, the uppermost eight bits (e.g., 8 most significant bits (MSBs)) of each 32 bit entry in the GCL 450 is a pointer to a specific queue 406, and the lower 24 bits (e.g., 24 least significant bits (LSBs)) indicates a time interval for a gate open event for that queue 406 (see e.g., Table 2). This scheme does provide for up to 1 nanosecond (ns) resolution. However, since the size of the GCL 450 is application and/or implementation dependent, some applications will need a larger GCL 450 while others will require a GCL 450 with fewer entries.

The gate control logic programs entries in the GCL 450 using indirect addressing 412. In some implementations, the gate control logic may include, or be part of the scheduler 413, may include, or be part of the indirect addressing module 412, or may encompass both the scheduler 413 and the indirect addressing module 412. Additionally or alternatively, the gate control logic may be, or include, the TSN configuration service 815 and/or logic (firmware) stored and/or operated by the GCE 850 of FIGS. 8-9 and/or the like (not shown by FIG. 4). The GCL 450 includes two memory banks including an odd bank 451 and an even bank 452. The hardware and/or logic executes (e.g., by the scheduler 413) from one of the memory banks 451, 452 while the second memory bank 451, 452 is being programmed by the gate control logic. Once the execution of first bank 451, 452 is done, then the hardware/logic (e.g., the scheduler 413) will switch over to the second bank 451, 452, if it is programmed; otherwise, the hardware/logic (e.g., the scheduler 413 or gate control logic) will re-execute the same bank 451, 452 in a loop fashion until the second bank 451, 452 is ready. For example, the hardware/logic (e.g., the scheduler 413 or gate control logic) may work from the odd bank 451 while the gate control logic programs the even bank 452, and then switch to work from the even bank 452 while programming the odd bank 451. In some implementations, the indirect addressing module 412 provides the scheduler 413 with a bank pointer 425, which is used to access data from one or more entries in one of the banks 451, 452.

As mentioned earlier, programming each entry, one at a time, using indirect addressing 412 takes several microseconds, and programming the complete list takes more than a millisecond. This makes the programming difficult for shorted cycle time applications, and it is not scalable for applications that need more entries and/or shorter cycle times with high precision due to area/power limitations. There are no solutions currently available to resolve the aforementioned issues, and the existing solutions have several drawbacks including relatively large silicon area costs for implementing the GCL 450, relatively large power consumption, and complex programming.

Figure 5:
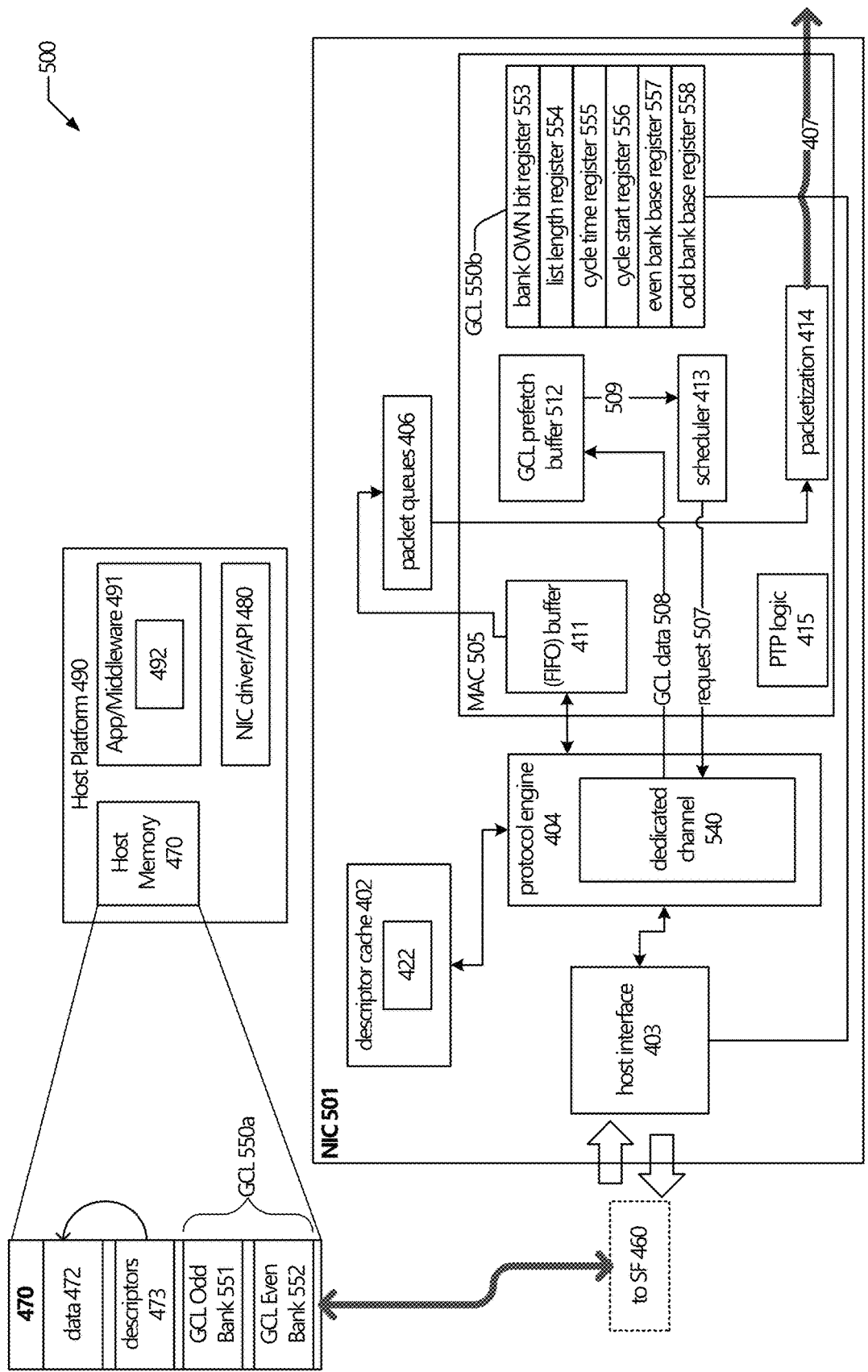

FIG. 5 shows an example TSN NIC architecture 500. The NIC architecture 500 includes some of the same elements as NIC architecture 400, where like numbered items are the same as discussed previously with respect to FIG. 4. In addition, the NIC architecture 500 includes a GCL 550, which comprises GCL 550a in host memory 470 and the GCL registers 550b within a MAC 505 of the NIC 501. The GCL 550a includes odd bank 551 and even bank 552, and the GCL registers 550b include a bank OWN bit 553, a list length register 554, a cycle time register 555, a cycle start time register 556, an even bank base register 557, and an odd bank base register 558. The GCL registers 550b can be implemented using on-die memory/registers and/or caching elements. In some implementations, memory circuitry used to implement the GCL registers 550b can also be used to implement the buffer 512 and/or the (FIFO) buffer 411, while in other implementations, different memory devices are used to implement the GCL registers 550b, the prefetch the buffer 512, and the (FIFO) buffer 411. In any of these implementations, a dedicated memory device is not used for an entire GCL (e.g., as is the case with GCL 450 in the NIC architecture 400). Instead, the GCL 550 is moved to the host memory 470, and a prefetch buffer (e.g., cache or registers) 512 (e.g., 32 bytes) is used, which is relatively smaller in comparison to existing GCL approaches, is used by the MAC 505 to buffer/store retrieved data from the GCL 550a. One advantage to using the GCL 550 is that sub-ns time resolutions, which may be required by some TSN/TSA applications, can be achieved without requiring on-board/on-chip memory to be increased. This expansion is possible because the GCL 550a is implemented in the host memory 470 instead of using on-chip memory of the NIC 501, which has a fixed memory size that usually cannot be expanded. This larger memory space allows more data to be used to specify more granular gate open time intervals and/or gate cycles. In some implementations, sub-ns time resolutions can be achieved by using additional bits in individual GCL entries to specify more granular gating time durations and the like. Using the GCL 450 to achieve sub-ns resolution would require the size/capacity of the dedicated memory chip to be increased exponentially, which is not scalable. By contrast, the GCL 550 is more scalable than the GCL 450 since the GCL 550a is implemented in the host memory 470. Moreover, lower cycle times can be achieved due to direct memory programming of the GCL 550a, which eliminates the need for indirect addressing 412 of downstream registers which can take several microseconds for each write operation. Therefore, GCL 450 is not scalable to hard real-time applications that need lower cycle times. Second, it saves considerable silicon area and power. In this example, the GCL 450 uses about 4 KB of NIC memory space whereas the GCL 550b only uses 32 bytes of NIC memory space, which is a relatively large amount of savings in terms of memory utilization and silicon die/chip area on the NIC 501 itself. This freed-up area can now be used for storing other data, can be used to provide smaller chips so that other components can be incorporated into the NIC 501, or for other purposes such as reducing the overall size of the NIC 501. The reduction in size also saves considerable amount of power as the current SRAM implementations are continuously clocked at 250 MHz. The area and power savings will be much higher for higher bandwidth NICs that run at, for example, 10 Gbps or more. Additionally, in some example implementations, the host platform 490 can be a DPU or IPU that handles one or multiple NICs 501, for example, where the GCL 550a is used by multiple NICs 501 such as those disposed in autonomous sensors, IoT devices, embedded devices, and/or the like.

Figure 8:
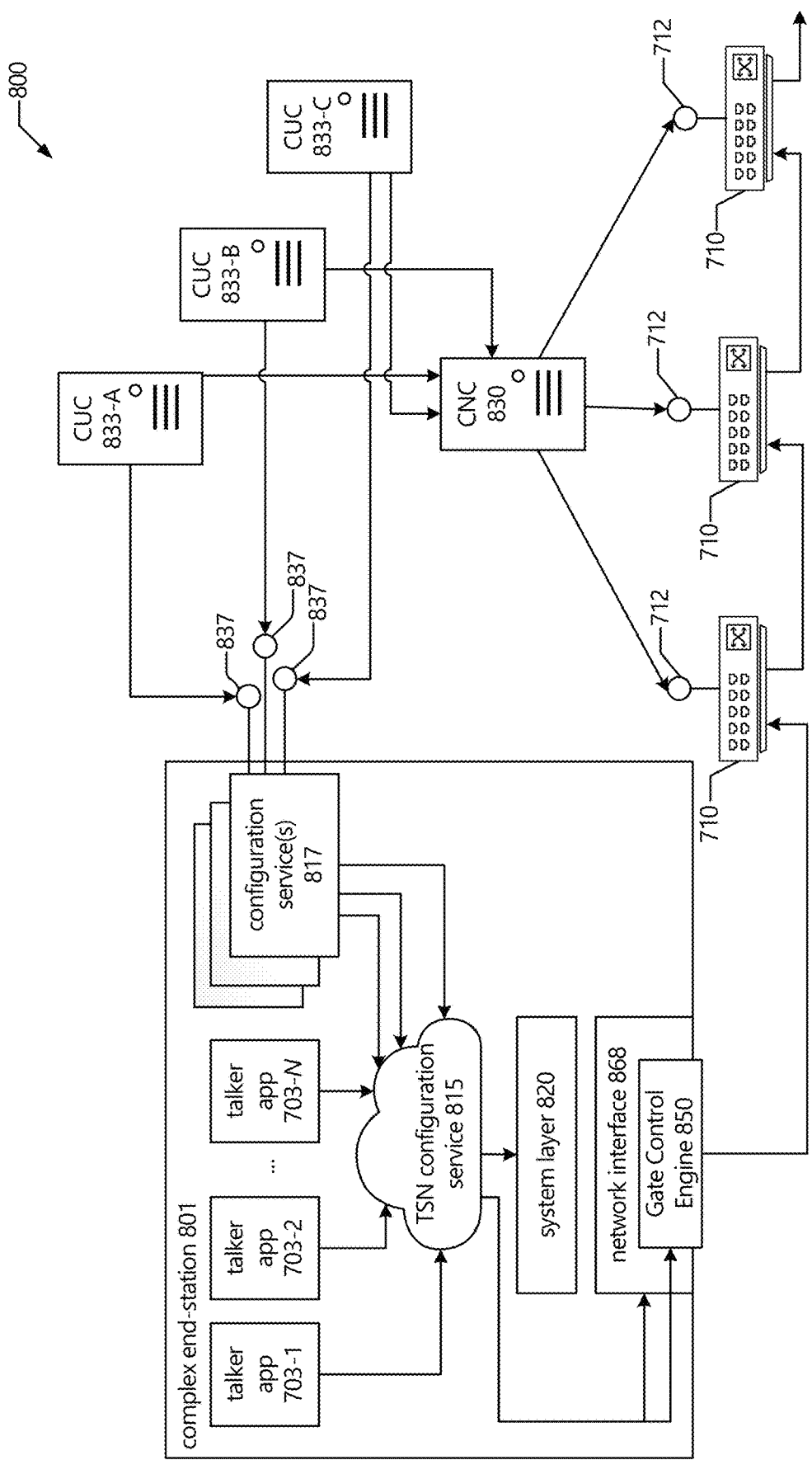
Figure 9:
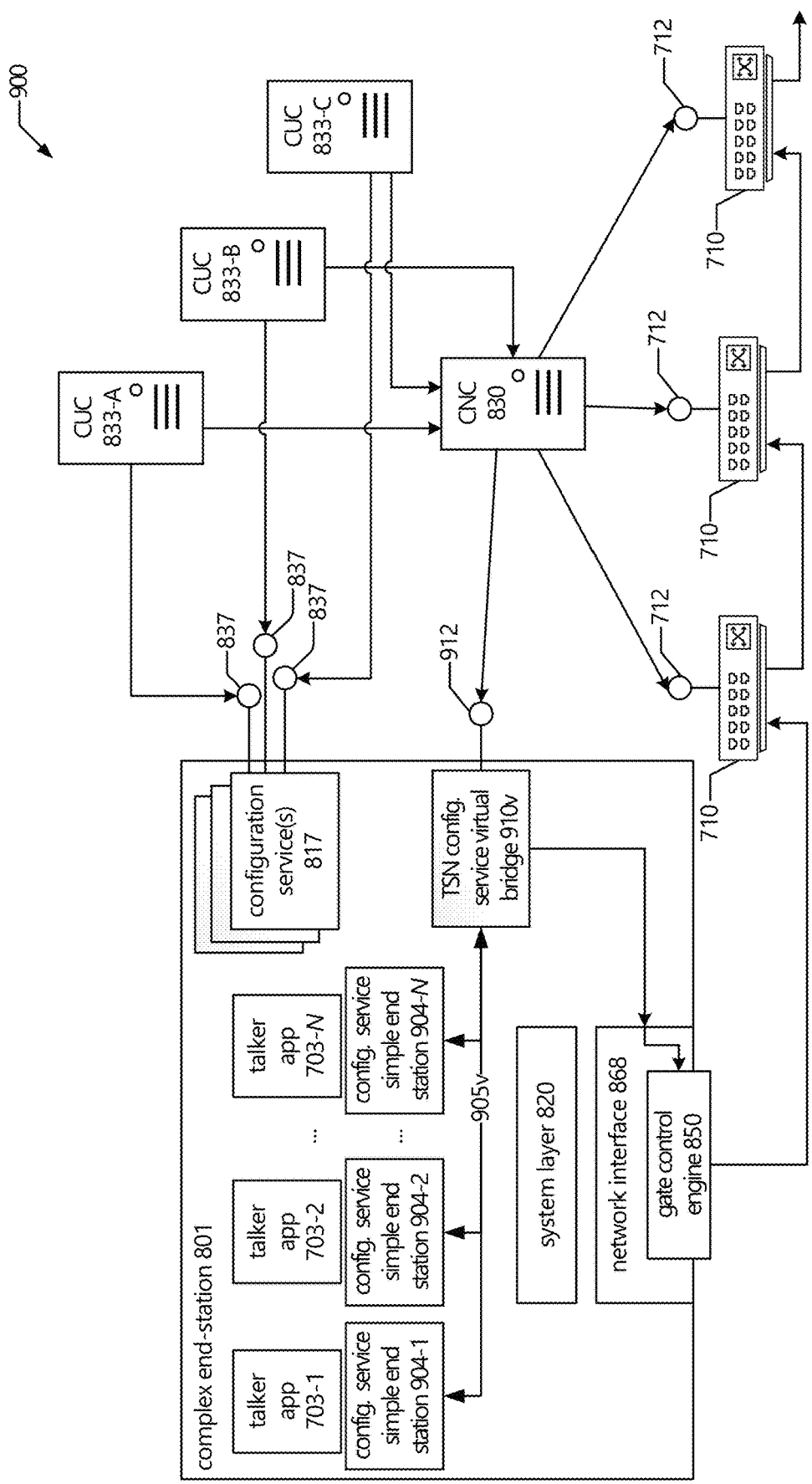

The descriptors 472, packet payloads 473, and two banks 551, 552 of GCL 550a are programmed into the host memory 470 by, for example, gate control logic (e.g., GCE 850 of FIGS. 8-9 and/or the like). Additionally, the base addresses of each of these banks 551, 552 is programmed into the bank base registers 557, 558 so the MAC 505 knows the memory locations of the GCL 550a for fetching the appropriate control operations. This programming is done once at the initialization and does not need run-time programming. Once one of the banks 551, 552 is programmed, ownership of the programmed bank 551, 552 is given over to the hardware by writing an OWN bit in the bank OWN bit register 553. The bank OWN bit register 553 can include two bits, one for each bank 551, 552 wherein an enabled bank OWN bit indicates a bank 551, 552 from which the MAC 505 executes. A list length register 555 specifies a number of entries the current bank 551, 552 of the GCL 550a. Additionally, a cycle start time is programmed into the cycle start register 556, and a cycle time period/interval is programmed into the cycle time register 555. The cycle time register 555 indicates the duration of each gating cycle and the cycle start register 556 contains the time at which the gate control operations should start executing. The registers 550b are programmed through the host interface 403 primarily during initialization.

During operation, the MAC 505 compares the cycle start time (as indicated by register 556) continuously with its PTP timer (e.g., as indicated by PTP logic 415 or some other clock mechanism). When the cycle start time matches the current PTP time value, then the MAC 505 starts executing the gating operations indicated by the GCL 550a. The MAC 505 (or MAC scheduler 413) uses a dedicated channel 540 to prefetch the gate controls operations/entries from the host memory 470 during runtime. The specific type of dedicated channel 540 can be based on the actual implementation. For example, where a (R)DMA protocol is used by PE 404, the dedicated channel 540 can be a dedicated (R)DMA channel, and so forth. As discussed previously, the PE 404 can include multiple channels to access the data 472 (e.g., one channel per queue 492 or TC), and an additional dedicated channel 540 is added to fetch control list entries from the GCL 550a. Using a dedicated channel 540 prevents or reduces the likelihood of the gate control entry fetching being delay or blocked.

Here, the MAC 505 (or MAC scheduler 413) prefetches part of the GCL 550a from the main memory 470 by sending a request 507 via the dedicated channel 540. The request 507 can include relevant information such as the bank address (from one of registers 557 or 558) of the enabled bank 551, 552 (e.g., as indicated by the bank OWN bit register 553). The requested GCL data 508 is obtained and stored in the GCL prefetch buffer 512. In one example implementation, the MAC 505 (or MAC scheduler 413) prefetches part of the GCL 550a from the main memory 470 by performing a burst (R)DMA read to fill the prefetch buffer 512 to full. The size of the burst may be based on a predefined or configurable prefill level that is programmed during initialization (e.g., as indicated by the list length register 554). The prefetch buffer 512 is read 509 by the MAC scheduler 413 as it (or the GCE) executes gate operations on the fly (for purposes of the present disclosure, the label "509" may refer to both the read operation from the prefetch buffer 512 and the entries that are read from the prefetch buffer 512). The MAC 505 (or MAC scheduler 413) initiates a next request 507 (e.g., (R)DMA burst fetch) based on the consumption of the entries and the amount of time it takes to fetch data 508 from the memory 470. Since sets of entries in the GCL 550a is prefetched, the gating operations can be done with very low latencies and scheduling precision. In one example implementation including eight Tx queues 406, each burst (R)DMA read operation 507 involves reading/requesting eight entries from the enabled bank 551, 552 of the GCL 550a at a time, and the prefill/prefetch level/threshold is four entries. Once four entries are processed (e.g., read 509 from the buffer 512), the scheduler 413 will perform a next prefetch (burst read) operation 507 for the next eight entries in the GCL 550a.

The MAC 505 (or the scheduler 413) also parses ahead at least some of the entries 509 of the GCL 550a by reading the entries 509 from the prefetch buffer 512. Here, "parsing" means decoding the GCL 550a entries, which indicate the queues 406 to be opened, the duration or time period for keeping those queues 406 open, and at what time these queues 406 will be opened. The decoding of entries will help to fetch data for those corresponding queues 406 ahead of time before those queues 406 are opened. Otherwise, the NIC 501 will miss scheduling/transmitted packets on time. This allows the MAC 505 to fetch ahead the required data payload for the queues 406 that will be open in the next gating cycle. The MAC 505 in turn issues (R)DMA burst read for the upcoming data payload. The MAC 505 executes from a first bank 551, 552 that has a set OWN bit enabled while the software (e.g., gate control logic) updates the second bank 551, 552 for the next gating cycle. The MAC 505 ping pongs between these banks 551, 552 in a same or similar manner as discussed previously. In these ways, the programming of the GCL 550a can be directly programmed in the main memory 470. Since the MAC 505 prefetches the GCL 550a using a dedicated channel 540, the gate control logic can program the entire GCL 550a within the cycle time.

Figure 6:
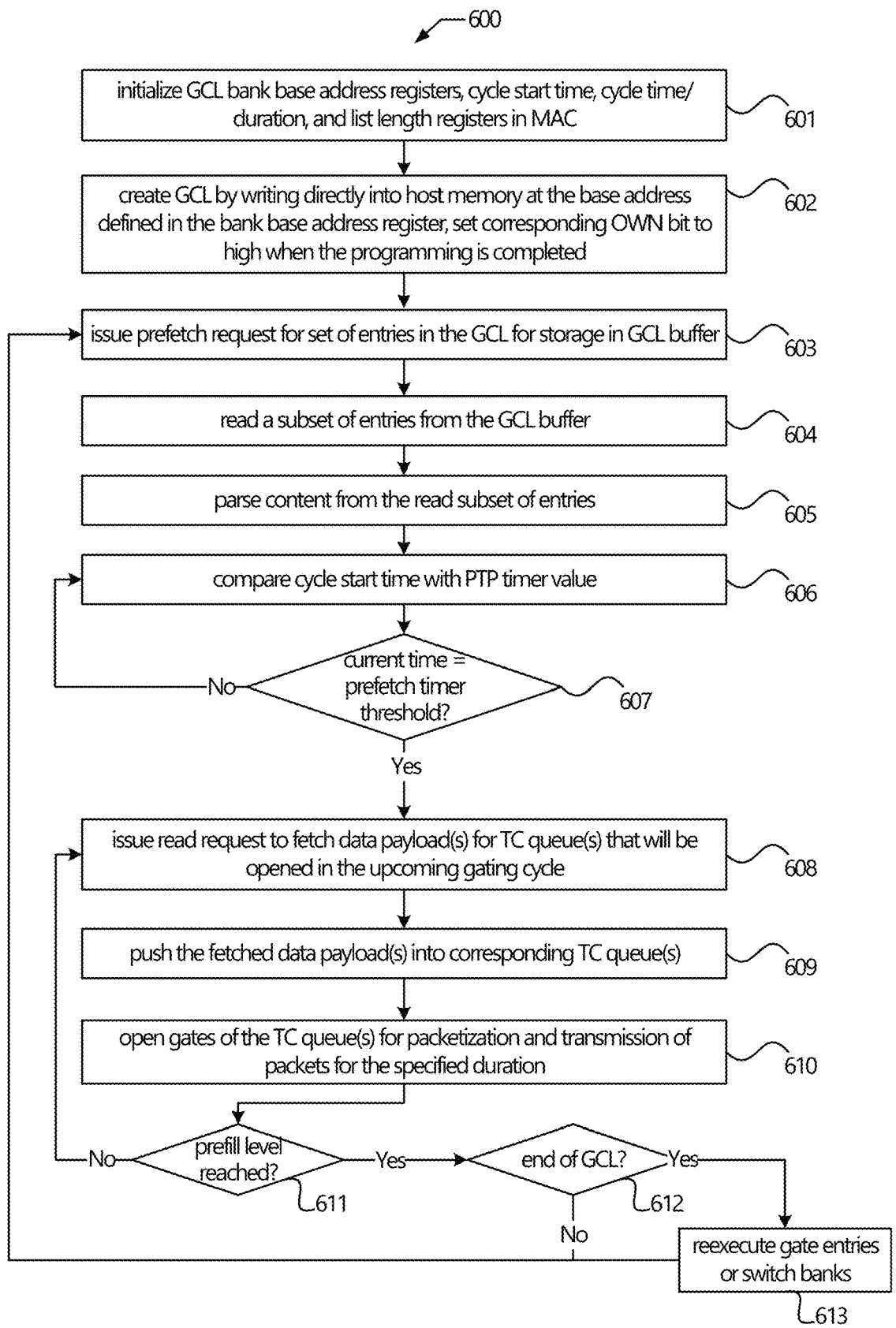
FIG. 6 depicts an example gate control process.

FIG. 6 shows an example GCL process 600 for implementing the GCL 550. The GCL process 600 is used to program the GCL 550 and prefetch control operations, but does not include the specific gate control operations. Process 600 begins at operation 601, where gate control logic (e.g., GCE 850 of FIGS. 8-9 and/or the like)) initializes GCL bank base address registers 557, 558 cycle start time register 556, cycle time register 555, and list length register 554 in the MAC 505. At operation 602, the gate control logic creates the GCL 550a by writing directly into the host memory 470 at the base address defined in a first bank base address registers (e.g., even bank base register 557), and once the programming is done, the gate control logic sets the corresponding OWN bit to high (e.g., an even bank OWN bit in register 553).

At operation 603, the MAC 505 (or the scheduler 413) issues a prefetch request 507 (e.g., (R)DMA burst) to prefetch a set of entries from the GCL 550a (e.g., from GCL even bank 552). At operation 604, the MAC 505 (or the scheduler 413) reads a subset of (e.g., first/next) entries 509 from the prefetch buffer 512. At operation 605, the MAC 505 parses the content of the read subset of entries 509 from the prefetch buffer 512. Operation 605 can include, for example, parsing (decoding) GCL entries to determine which queues 406 will be opened, how long to keep those queues 406 open, and at what time the queues 406 will be opened. Operation 605 can also include parsing the descriptors 473 of the queues 406 that will be opened. The descriptors 473 are parsed (decoded) to determine the location of the data payload, the size of the payload, and/or other parameters of the data payload.

At operation 606, the MAC 505 starts comparing the cycle start time 556 with its PTP timer 415 value. At operation 607, the MAC 505 determines whether the current time is at or lapses some preset prefetch timer threshold value. If the current time has not reached the prefetch timer threshold, the MAC 505 loops back to operation 606 to continue monitoring the current time. When the current time is at or lapses the prefetch timer threshold value, the MAC 505 (or the scheduler 413) at operation 608 issues read (e.g., DMA read) request to fetch data payload(s) for storage in the TC queue(s) 406 that will be opened in the upcoming gating cycle. At operation 609, the PE 404 pushes the requested data payloads into corresponding TC queues 406.

At operation 610, the MAC 505 fetches the data from the TC queues 406 by opening corresponding gates 310 and starts transmitting the data packets for the duration specified in the GCL time register 555. At operation 611, the MAC 505 determines whether the prefill level of the prefetch buffer 512 has been reached. If the prefill level has not been reached, the MAC 505 proceeds back to operation 608 to issue a read request 507 to fetch data from queue(s) 406 to be opened in an upcoming gating cycle. If the prefill level has been reached, the MAC 505 proceeds to operation 612 to determine whether an end of the GCL 550 (or the GCL even bank 552 in this example) has been reached. If the end of the GCL 550 has not been reached, the MAC 505 proceeds back to operation 603 to issue another prefetch request 507 (e.g., (R)DMA burst). If the end of the GCL 550 has been reached, the MAC 505 proceeds to operation 613 to re-execute the same entries in the currently enabled bank (e.g., even bank 552 in this example) of the GCL 550a from the beginning if only one bank is enabled (e.g., even bank OWN bit 553 is enabled or set to high) if the gate control logic is still programming the other bank (e.g., the odd bank 551 in this example), or the MAC 505 (or scheduler 413) can switch to other bank if (e.g., the odd bank 551 in this example) if the other bank is available or enabled (e.g., the odd bank OWN bit in register 553 is enabled or set to high). In either case, the re-execution or execution of entries in the other bank involves performing operation 603-612 in a same or similar manner as discussed previously.

1.4. TSA Configuration Aspects

[IEEE802.1Q] defines ways to implement a complex TSN-capable network to transport time-sensitive streams from sending applications (referred to as "talkers") to one or more receiving applications (referred to as "listeners"). [IEEE802.1Qcc] defines a centralized network management mechanism (e.g., centralized network configuration (CNC) station and/or the like) that computes relatively large sets of parameters that need to be programmed into the infrastructure of the network (e.g., bridges, switches, and the like) (see e.g., *IEEE Standard for Local and Metropolitan Area Networks—Bridges and Bridged Networks—Amendment 31: Stream Reservation Protocol (SRP) Enhancements and Performance Improvements*, IEEE Std 802.1Qcc-2018, pp. 1-208 (31 Oct. 2018) ("[IEEE802.1Qcc]"), the contents of which is hereby incorporated by reference in its entirety). However, the TSN standards provide only very limited definition on how to configure the end stations, in particular the talker end stations. While this limitation is not very hard to overcome for end stations hosting only one talker application, the complexity increases significantly if multiple talker applications share the same end station, and thus, the same network interface. It may be difficult to implement a mechanism on an end station that automatically configures all required parameters on and end station such that the applications do not interfere with each other in an undesired manner.

Some existing solutions involve manual configuration of the end stations through static configuration scripts. Other existing solutions might contain some dynamic aspects, but there are no known solutions that would allow for a fully dynamic configuration that not only includes network interface parameters and parameters related to local resource usage such as processor cycles, memory footprint, and/or other like parameters. Existing solutions based on static and manual configurations are error-prone because numerous parameters have to be specified in a consistent way. Additionally, frameworks managing dynamic deployment of workloads (e.g., Kubernetes® orchestrators and/or the like) lack the ability to also properly configure TSN aspects of end stations due to the complexity mentioned above. These existing solutions cannot be used in a highly dynamic environment (e.g., on a set of worker nodes controlled by a Kubernetes orchestrator) due to the necessity of configuring some parameters statically.

Figure 7:
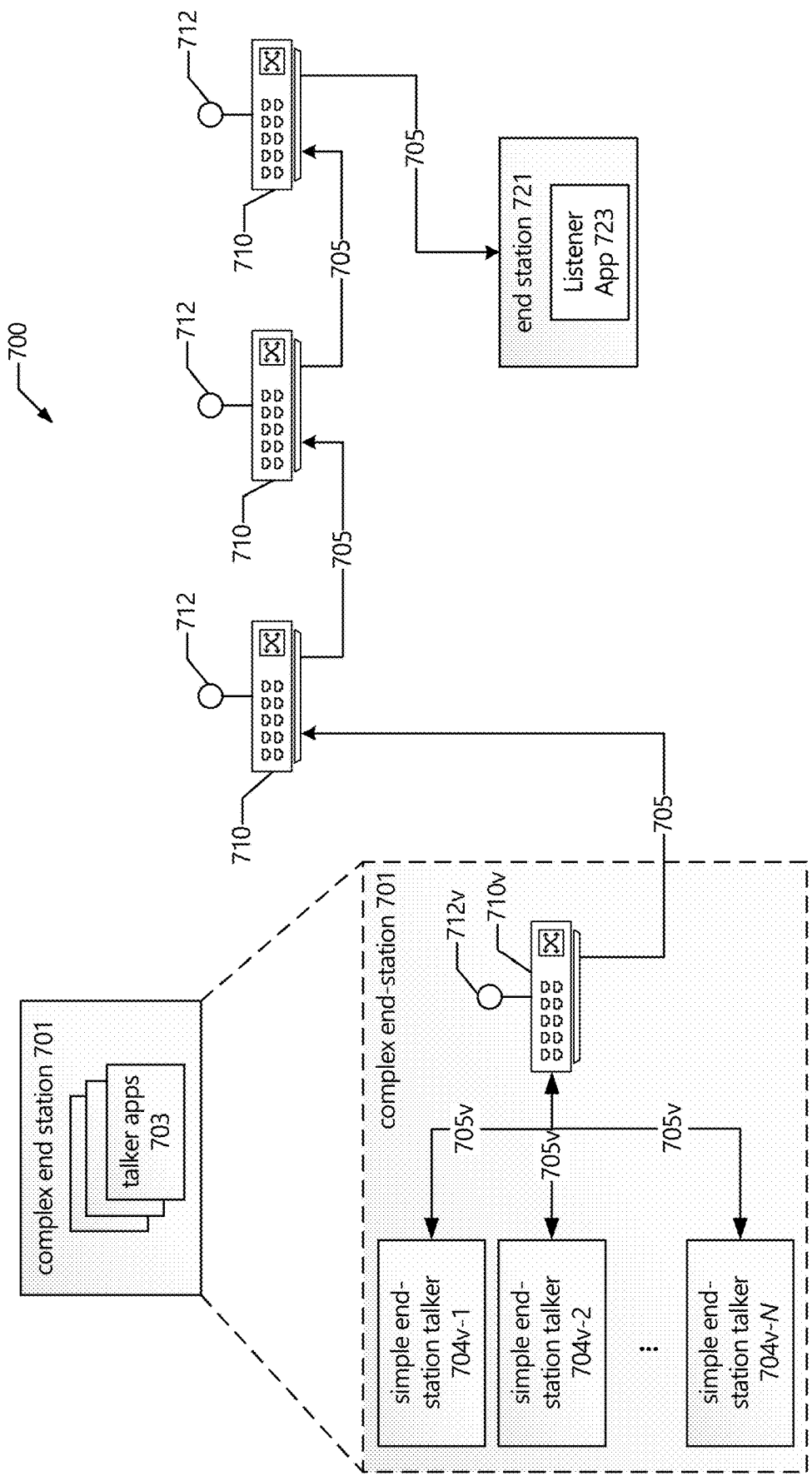
FIGS. 7, 8, and 9 depict various example complex end station configurations and arrangements.

The example implementations shown by FIG. 7-9 and discussed infra overcome these issues. In particular, the implementations discussed infra allow an end station that hosts multiple talker apps to be configured such that the multiple talker apps can share the same physical network link (e.g., an Ethernet link or the like). This reduces the configuration complexity for TSN/TAS applications and devices, including reductions in code implementation complexity and footprint at least at end stations Additionally, these solutions are agnostic of the underlying protocols and frameworks that operate on top of TSNs, which allows for relatively easy integration into existing systems. Moreover, the example implementations could be standardized in future amendments to the relevant TSN standards.

In some implementations, a device that physically a single end station (e.g., has only one network port) identifies itself as a combination of a switch or bridge and multiple end stations. In these implementations, the device can be send and/or receive commands for device discovery, and provides reports indicating that it is operating as a combination of switch/bridge and a set of end stations. Furthermore, the physical design of such devices can include bridge/switch circuitry either as discrete part or as IP block in a SoC or the like. In other implementations, the bridge/switch circuitry can be implemented as one or more software elements on a physical network interface or other like component.

FIG. 7 depicts an example complex end station configuration 700. Here, a complex end station 701 hosts multiple talker apps 703 (or "talkers 703"), and is communicatively coupled with a set of network access nodes (NANs) 710 via a link 705. Additionally, another end station 721 hosts a listener app 723 (or "listener 723"), and is also communicatively coupled to at least one NAN 710 via a link 705. The NANs 710 can be any type of networking equipment such as, for example, switches, routers, bridges, hubs, and/or the like. Each NAN 710 also includes a configuration interface 712, which may comprise APIs, web services, and/or the like for bridge discovery and configuration (e.g., link layer discovery protocol (LLDP), Yet Another Next Generation (YANG), and/or the like). The configuration interfaces 712 can operate according to the bridge management and configuration aspects discussed in [IEEE802.1Qcc].

Talkers 703 and listeners 723 are part of the stream reservation protocol (SRP), where streams are registered to reserve resources required through the entire path taken by the stream, based on bandwidth requirements and the latency which are defined by a stream reservation TC. Listeners 723 are destination(s) for time-sensitive streams and talkers 703 are sources of time-sensitive streams. The requirements for end stations that participate as talkers (e.g., complex end station 701) are different from the requirements that apply to end stations that participate as listeners (e.g., end station 721). For purposes of the present disclosure, a "complex end station", such as complex end station 701, refers to any type of end station capable of hosting multiple talkers 703.

SRP utilizes three signaling protocols, multiple MAC registration protocol (MMRP) (see e.g., [IEEE802.1Q] § 10.9), multiple VLAN registration protocol (MVRP) (see e.g., [IEEE802.1Q] § 11) and multiple SRP (MSRP) (see e.g., [IEEE802.1Q] § 35.1), to establish stream reservations across a bridged network. Within SRP, MMRP may be used to control the propagation of talker 703 registrations throughout the bridged network (see e.g., [IEEE802.1Q] § 35.2.4.3.1). MVRP can be used by end stations 701, 721 and bridges 710 to declare membership in a VLAN where a stream is being sourced, which allows the data frame priority (see e.g., [IEEE802.1Q] § 35.2.2.8.5(a)) to be propagated along the path from talker 703 to listener(s) 723 in tagged frames. MSRP supports the reservation of resources for streams, each destined for one or more listeners 723, and each from a single source, across a bridged network. MSRP provides end stations 701, 721 with the ability to reserve network resources that will guarantee the transmission and reception of data streams across a network with the requested QoS. Other aspects of SRP, MMRP, MVRP, and MSRP, as well as aspects of forwarding and queuing enhancements for time-sensitive streams (FQTSS) are discussed in [IEEE802.1Q].

Talkers 703 declare attributes that define the stream characteristics so bridges 710 have the necessary information available when they need to allocate resources for a stream. Listeners 723 declare attributes that request reception of those same streams. Bridges 710 along the path from talker 703 to listeners 723 process, possibly adjust, and then forward these MSRP attribute declarations. Bridges 710 associate talker 703 and listener 723 attributes via a stream ID (StreamID) present in each of those attributes, which result in changes to the extended filtering services and allocation of internal resources when streams are "brought up." Talker 703 declarations are propagated by MSRP such that the listeners 723 and bridges 710 are aware of the presence of talkers 703 and the Streams that are offered. Talker declarations are also used to gather QoS information along their paths. Based on the gathered QoS information, talker declarations can be classified as "talker advertise" or "talker failed". Talker advertise is an advertisement for a stream that has not encountered any bandwidth or other network constraints along the network path from the talker 703. Listeners 723 that request attachment to this stream are likely to create a reservation with the described QoS. A talker advertise will continue to be declared as long as the resources continue to be available. Talker failed is an advertisement for a stream that is not available to the listener 723 because of bandwidth constraints or other limitations somewhere along the path from the talker 703. In addition to the aforementioned talker declarations, the talker 703 can issues an MVRP VLAN membership declaration prior to issuing the talker declaration, wherein the MVRP VLAN membership contains a VLAN ID (vlan_identifier) of the DataFrameParameters (see e.g., [IEEE802.1Q] § 35.2.2.8.3, item b) so that the neighboring bridge adds the associated bridge port to the member set for the VLAN.

Listeners 723 also indicate what streams they want to receive by making listener declarations (see e.g., [IEEE802.1Q] § 35.2.1.3). The listener declarations also convey the results of the bandwidth and resource allocation along its path back to the talker 703. Based on those results, Listener declarations can be classified as "listener ready", "listener ready failed", or "listener asking failed". Listener ready indicates that one or more listeners 723 are requesting attachment to the Stream and/or that there is sufficient bandwidth and resources available along the path(s) back to the talker 703 for some or all listeners 723 to receive the stream. Listener ready failed indicates that two or more listeners 723 are requesting attachment to the stream, where at least one of those listeners 723 has sufficient bandwidth and resources along the path to receive the stream, but one or more other listeners 723 are unable to receive the stream because of network bandwidth or resource allocation problems. Listener asking failed indicates that one or more listeners 723 are requesting attachment to the Stream, where none of those listeners 723 are able to receive the stream because of network bandwidth or resource allocation problems. Additionally, a listener 723 can issue an MVRP VLAN membership declaration prior to issuing the MSRP listener ready declaration. The MVRP VLAN membership can contain the vlan_identifier of the talker advertise DataFrameParameters (see e.g., [IEEE802.1Q] § 35.2.2.8.3, item b) so that the neighboring bridge adds the associated bridge port to the member set for the VLAN.

MSRP-aware bridges 710 register and deregister talker 703 and Listener declarations on the Bridge Ports according to the procedures defined in MRP (see e.g., [IEEE802.1Q] § 10), and automatically generate deregistration of stale registrations. Any changes in the state of registration are processed by the MSRP Attribute Propagation (see e.g., [IEEE802.1Q]§ 35.2.4) function, and disseminated in the network by making or withdrawing talker declarations and listener declarations as defined in the talker 703 attribute propagation (see e.g., [IEEE802.1Q] § 35.2.4.3) and listener 723 attribute propagation (see e.g., [IEEE802.1Q] § 35.2.4.4). In general, talker declarations are propagated to all other Bridge Ports. There is a talkerPruning option (see e.g., [IEEE802.1Q] § 35.2.1.4, item b] that limits the scope of Talker declaration propagation. Listener declarations are only propagated to the Bridge Port with the associated Talker declaration (i.e., matching StreamID). If there is no associated Talker declaration registered on any Bridge Port then the listener declaration will not be propagated.

Additional aspects of talker 703, listener 723, and bridge 710 behaviors are discussed in [IEEE802.1Q]. In particular, [IEEE802.1Qcc] defines how bridges in TSNs (e.g., TAN 100 of FIG. 1) can be configured to route time-sensitive streams while maintaining the guarantees of bounded latency for each of the streams.

The dashed box in FIG. 7 shows a more detailed view of the complex end station 701. Here, the complex end station 701 is presented as a network including a virtual NAN 710v (also referred to as "virtual bridge 710v" or "virtual switch 710v") and where the talker apps 703 are presented as individual end station talkers 704-1 to 704-N (where N is a number). These virtual end station talkers 704 are considered to be "simple end stations" or "non-complex end stations", which are end stations that only include one talker app 703. The talkers 704 are connected to the virtual bridge 710v via respective virtual links 705v. The virtual links 705v are used to provide propagation delay reports based on the platform's internal data processing capabilities. Additionally, the virtual bridge 710v includes a virtual configuration interface 712v, which may be the same or similar as the configuration interfaces 712, or operate in a same or similar manner as the configuration interfaces 712.

In various implementations, during a device discovery phase, the complex end station 701 hosting multiple talkers 703 is presented to a centralized network management element as a combination of virtual end stations, each with a single talker 704 application, and a virtual switch 710v to which those virtual end stations 704 are connected. The centralized network management will then use its existing configuration mechanisms to compute a viable configuration for the virtual switch 710v and pass this configuration to the end station 701 via interface 712v. This received configuration can be used by the end station 701 as a configuration for the one existing physical network interface of the end station 701, and/or as a configuration that facilitates the scheduling of the computing of the multiple workloads on one physical platform such that the interference between them is limited.

FIG. 8 depicts another example complex end station configuration 800. In this example, a complex end station 801 includes a set of talker apps 703-1 to 703-N (where N is a number) and an "omnipotent" and/or complex TSN configuration service 815, a set of configuration service instances 817, a system layer 820, a network interface 868, and a gate control engine (GCE) 850. The system layer 820 can include containerization technology (e.g., container orchestration and/or management elements), a virtual infrastructure manager (VIM) (e.g., VMM, hypervisor, and/or the like), and/or an operating system (OS) elements. The network interface 868 may be the same or similar as the network interface 1968 of FIG. 19 and/or the NIC 868 and/or the NIC architecture 400 and/or 500 of FIGS. 4 and 5.

As mentioned previously, TSN is a suite of IEEE standards that provide multiple mechanisms to enable guaranteed delivery of packets through a network (e.g., Ethernet) within a bounded time. The mechanisms differ in complexity and achievable minimum bounded latency. The nascent mechanism in IIoT is time-aware shaping, defined in [IEEE802.1Qbv] (now incorporated into [IEEE802.1Q]). One function of time-aware shaping is to use gates (e.g., gates 310) at the head of egress queues of all ports in the network, including ports of bridges 710 as well as end stations 701, 721. As discussed previously with respect to FIGS. 3-6, these gates 310 are programmed such that they open and close in relatively short and cyclical patterns, enabling and prohibiting transmission of packets for the respective egress queues. This allows the definition of time windows on the wire that are reserved for time-critical traffic, while other time windows are reserved for the remaining best-effort traffic. The hardware mechanisms controlling the gates 310 is referred to as a "gate control engine" or "GCE" (e.g., GCE 850 in FIG. 8). Additionally, the GCE 850 manages the generation and collection of gate messages. A GCL (e.g., GCL 350, GCL 450, and/or GCL 550 of FIGS. 3-5) defines a gate operation pattern, which is the cyclical open-close pattern programmed into the GCE 850. The GCE 850 controls the operation of the transmission gates 310 connected to each queue according to the GCL. By using complex algorithms that are not specified in the TSN standards, it is possible to compute a set of GCLs for all ports in an entire network such that the end-to-end latency requirements for many time-sensitive data streams are satisfied at the same time. The computational effort for this grows exponentially with the number of streams and the size of the network.

According to [IEEE802.1Qcc], TSN configuration uses the concept of a stream that is transmitted by a talker 703 to one or more listeners 723 located within end stations 701, 721, where configuration information is exchanged over a User/Network Interface (UNI). The user side of the interface represents talkers 703 and listeners 723. The network side of the interface represents the bridges 710 that transfer frames of the stream from each talker 703 to its listeners 723. Each user specifies requirements for its data, but without detailed knowledge of the network. The network obtains requirements from users, analyzes the topology and TSN capabilities of bridges 710, and configures the bridges 710 to meet user requirements. The network returns the success or failure of each stream's configuration to the user.

The TSN configuration mechanisms include a Centralized Network Configuration (CNC) entity/station 830 (or "CNC 830") that uses managed objects to configure each bridge 710. The managed objects within a bridge 710 that can be used by the CNC 830 or any other management component include, among many others, a bridge delay object and a propagation delay object.

The bridge delay object includes attributes used to determine the delay of frames as they pass through the bridge's 710 relay. There is one bridge delay managed object per port pair per traffic class of a bridge component, and each set of bridge delay attributes is accessed using three indices: ingress port, egress port, and traffic class. For each set of bridge delay attributes, the total delay through the bridge includes the delay that is independent of frame length (referred to as "independent delay") and the delay that is dependent on frame length (referred to as "dependent delay"). Each delay is provided as a range, with both minimum attribute and maximum attribute. The delays represent a worst-case range per the design of the bridge 710, and are not measured. The independent delay attributes provide the minimum length-independent delay and the maximum length-independent delay for a frame to forward from ingress port to egress port for a corresponding traffic class. The delay begins when the message timestamp point of the ingress frame passes the reference plane marking the boundary between the network media and PHY. The delay ends when the message timestamp point of the egress frame passes the reference plane marking the boundary between the network media and PHY. The message timestamp point is specified by [IEEE802.1AS] for various media, near the start of the frame. The dependent delay attributes provide a portion of delay that is dependent on frame length, where frame length is the number of octets that transfer across the MAC service interfaces. Each length-dependent delay attribute specifies the time for a single octet of the frame to transfer from ingress to egress.

The propagation delay managed object includes attributes used to determine the delay along the network media (e.g., cable, or the like) for a frame transmitted from the specified port of a station 701, 721 to a neighboring port on a different station 701, 721. There is one propagation delay managed object per port of a station (e.g., bridge 710 or station 701, 721). The propagation delay managed object includes a txPropagationDelay attribute. The txPropagationDelay begins when the message timestamp point of an egress frame passes the reference plane marking the boundary between the network media and PHY of this station's Port. The txPropagationDelay ends when the message timestamp point of an ingress frame on the neighboring station's Port passes the reference plane marking the boundary between the network media and PHY. The message timestamp point is specified by [IEEE802.1AS] for various media, near the start of the frame.

Other managed objects that may be used include bandwidth availability parameter table object, transmission selection algorithm table object (see e.g., Table 1), priority regeneration override table object, SR class to priority mapping table object, congestion notification managed objects, SRP bridge base table object, SRP bridge port table object, SRP latency parameter table object, SRP stream table object, SRP reservations table object, static trees object, MRP external control object, among many others. Additional aspects of these managed objects, as well as other managed objects, are discussed in [IEEE802.1Qcc] § 12 and in [IEEE802.1Q] § 12.

A variety of protocols can be used for the exchange of configuration information over the TSN UNI (e.g., signaling protocols, remote network management protocols, and/or the like such as any of those protocols discussed herein). In some implementations, these protocols are used to exchange the configuration information as text or as binary fields. To enable flexible integration of TSN configuration into a variety of protocols, the TSN user/network configuration information is independent of schema, encoding, or protocol (see e.g., [IEEE802.1Qcc] § 46.2). Specific TSN-capable products list the user/network protocol that is supported as part of their conformance (see e.g., [IEEE802.1Qcc] § 5.18.3, and item c in [IEEE802.1Qcc] § 5.29).

The TSN user/network configuration information includes talker elements (e.g., elements from a user to network that specify the talker 703 for a single stream); listener elements (e.g., elements from a user to network that specify the listener 723 for a single stream); and status elements (e.g., elements from network (e.g., bridge 710) to a user that specify the status of the stream's network configuration for a talker 703 or listener 723. This group notifies the user when the stream is ready for use (or a failure occurred). Additionally, each TSN configuration protocol uses a StreamID as the unique identifier of each stream's configuration. The StreamID identifies configuration and has no formal relation to the data frame encoding for the stream. A StreamID group provides a unique identifier of the Stream's configuration and is used by protocols in the network to associate the user's stream with TSN resources. The StreamID group is used by talker, listener, and status groups. The elements of the StreamID group includes a MacAddress (e.g., a 48-bit IEEE 802 MAC address associated with the talker sourcing the stream to the bridged network), and a UniqueID (e.g., an identifier used to distinguish between multiple streams within the end station identified by the MacAddress). Furthermore, each user/network protocol specifies a specific schema and/or encoding for the configuration information in [IEEE802.1Qcc] § 46.2.

The status elements include, inter alia, an InterfaceConfiguration group, which provides configuration of interfaces in the talker 703/listener 723. This configuration assists the network in meeting the stream's requirements. The InterfaceConfiguration meets the capabilities of the interface as provided in the InterfaceCapabilities group. A distinct configuration is provided for each interface in the talker 703/listener 723 even if multiple interfaces use the same configuration. Each interface configuration includes an InterfaceID (see e.g., [IEEE802.1Qcc] § 46.2.3.3) group, followed by a list of configuration values for that interface. The list of configuration values can include zero or more of an IEEE 802 MAC address, an IEEE 802 VLAN tag, an IPv4 tuple, an IPv6 tuple, and a TimeAwareOffset. The TimeAwareOffset is included when a TSpecTimeAware group is present in the TrafficSpecification group (see e.g., [IEEE802.1Qcc] § 46.2.3.5) of the talker 703. The TimeAwareOffset specifies the offset that the talker 703 uses for transmit. The network returns a value between EarliestTransmitOffset and LatestTransmitOffset of the talker's 703 TrafficSpecification. The value is expressed as nanoseconds after the start of the talker's 703 interval.

[IEEE802.1Qcc] provides three TSN configuration models for TSN user/network configuration including a fully distributed model, a centralized network/distributed user model, and a fully centralized model.

1.4.1. Fully Distributed Model

In the fully distributed model, the end stations 701, 721 that contain users of streams (e.g., talkers 703 and listeners 723) communicate the user requirements directly over the TSN user/network protocol. The network is configured in a fully distributed manner, without a CNC 830. The distributed network configuration is performed using a protocol that propagates TSN user/network configuration information along the active topology for the stream (e.g., bridges 710 in the tree from talker 703 to listener(s) 723). As user requirements propagate through each bridge 710, management of the bridge's 710 resources is effectively performed locally. This local management is limited to the information that the bridge 710 has knowledge of and does not necessarily include knowledge of the entire network. In some implementations, the protocol that is used as the UNI for exchange of configuration information between talkers 703/listeners 723 (e.g., "users") and bridges 710 (e.g., the "network").

1.4.2. Centralized Network/Distributed User Model

Some TSN use cases are computationally complex. For example, for scheduled traffic (see e.g., [IEEE802.3] § 8.6.8.4), computation of the gate control list of each port can take a significant amount of time. Centralizing the computation in a single entity (e.g., bridge 710 or end station 701, 721), rather than perform the computation in all bridges 710. Some TSN use cases can benefit from a complete knowledge of all streams in the network. For example, if the bandwidth for multiple streams is greater than the available bandwidth along the shortest path between talkers 703 and listeners 723, it is helpful to forward a subset of those streams along a path other than the shortest. For these use cases, a centralized entity can gather information for the entire network in order to find the best configuration.

The centralized network/distributed user model is similar to the fully distributed model in that end stations 701, 721 communicate their talker/listener requirements directly over the TSN UNI. By contrast, in the centralized network/distributed user model, the configuration information is directed to/from the CNC 830. All configuration of bridges 710 for TSN streams is performed by the CNC 830 using a remote network management protocol. Additionally, the CNC 830 has a complete view of the physical topology of the network as well as the capabilities of each bridge 710. This enables the CNC 830 to centralize complex computations. In various implementations, the CNC 830 can exist in an end station 701, 721, a bridge 710, an edge compute node (e.g., edge compute node 1736 of FIG. 17), a cloud compute service (e.g., cloud 1744 of FIG. 17), a network function within a core network (CN) (e.g., CN 1742 of FIG. 17), app server(s) 1750, and/or some other entity/element. The CNC 830 knows the address of all bridges 710 at the edge of the network (e.g., those with a connected end station 701, 721). The CNC 830 configures those edge bridges 710 to act as a proxy, transferring talker/listener information directly between the edge bridge 710 and the CNC 830, rather than propagate the information to the interior of the network.

[IEEE802.1Qcc] § 46.2 discusses the protocol that is used as the UNI for exchange of configuration information between talkers 703/listeners 723 (e.g., users) and bridges 710 (e.g., network) and the protocol that transfers configuration information between edge bridges 710 and the CNC 830. For the remote network management protocol, the CNC 830 acts as the management client, and each bridge 710 acts as a management server. The CNC 830 uses remote management to discover physical topology, retrieve bridge capabilities, and configure TSN features in each bridge 710. The talkers 703 and listeners 723 are not required to participate in this remote network management protocol. The information carried by the remote network management protocol is specified in [IEEE802.3] § 12. In some implementations, the talker/listener protocol of the fully distributed model is selected to be the same as the talker/listener protocol of the centralized network/distributed user model. In these implementations, end stations 701, 721 can support both models without explicit knowledge of how the network is configured.

The following TSN features can be configured by the CNC 830 using the centralized network/distributed user model: (a) credit-based shaper algorithm (see e.g., [IEEE802.3] § 8.6.8.2) and its configuration (see e.g., [IEEE802.3] § 34); (b) frame preemption (see e.g., [IEEE802.3] § 6.7.2); (c) Scheduled traffic (see e.g., [IEEE802.3] §§ 8.6.8.4, 8.6.9); (d) frame replication and elimination for reliability (see e.g., IEEE Standard for Local and metropolitan area networks—Frame Replication and Elimination for Reliability, IEEE Std 802.1CB, pp. 1-102 (27 Oct. 2017) ("IEEE802.1"), the contents of which are hereby incorporated by reference in its entirety); (e) per-stream filtering and policing (see e.g., [IEEE802.3] § 8.6.5.1); and (f) Cyclic queuing and forwarding (see e.g., [IEEE802.3], Annex T). Additionally, SRP (see e.g., [IEEE802.3] § 35) can be used as the UNI. SRP's MRP External Control (see e.g., [IEEE802.3] § 12.32.4) feature can be used to exchange configuration information with the CNC 830 component. SRP exchanges configuration information using the TLV technique to reference configuration elements. Examples of a remote network management protocol include Simple Network Management Protocol (SNMP), NETCONF (IETF RFC 6241), and RESTCONF (IETF RFC 8040).

1.4.3. Fully Centralized Model

Many TSN use cases require significant user configuration in the end stations 701, 721 that act as talkers 703 and listeners 723. For example, in many automotive and industrial control applications, the timing of physical inputs and outputs (I/Os) is determined by the physical environment under control, and the timing requirements for TSN streams are derived from that I/O timing. In some use cases, these I/O timing requirements can be computationally complex and involve detailed knowledge of the application software/hardware within each end station. In order to accommodate this sort of TSN use case, [IEEE802.1Qcc] provides a fully centralized model that enables a Centralized User Configuration (CUC) entities/stations 833 (or "CUCs 833") to discover end stations 701, 721, retrieve end station capabilities and user requirements, and configure TSN features in the end stations 701, 721. The protocols that the CUCs 833 use for this purpose are specific to the user app and/or implementation. From a network perspective, the primary difference between the fully centralized model and the centralized network/distributed user model is that the user requirements are exchanged between the CNC 830 and CUC 833, and the TSN UNI exists between the CNC 830 and CUC 833.

In the fully centralized model, the CNC 830 acts as the management client, and each bridge 710 acts as the management server. The CNC 830 uses remote management to discover physical topology, retrieve bridge capabilities, and configure TSN features in each bridge 710, and talkers 703 and listeners 723 are not required to participate in this remote network management protocol. The information carried by the remote network management protocol is discussed in [IEEE802.3] § 12). Additionally, any suitable protocol (e.g., user-to-user protocols, and/or any other protocol such as those discussed herein) can be used between the CUC 833 and end stations 701, 721 (e.g., talkers 703 and listeners 723) to retrieve end station capabilities and requirements and to configure the end stations 701, 721.

In the fully centralized model, the CNC 830 can exist in an end station 701, 721, a bridge 710, an edge compute node (e.g., edge compute node 1736 of FIG. 17), a cloud compute service (e.g., cloud 1744 of FIG. 17), a network function within a CN (e.g., CN 1742 of FIG. 17), app server(s) 1750, and/or some other entity/element. The following TSN features can be configured by the CNC 830 using the fully centralized model: (a) credit-based shaper algorithm (see e.g., [IEEE802.3] § 8.6.8.2) and its configuration (see e.g., [IEEE802.3] § 34); (b) frame preemption (see e.g., [IEEE802.3] § 6.7.2); (c) scheduled traffic (see e.g., [IEEE802.3] §§ 8.6.8.4, 8.6.9); (d) frame replication and elimination for reliability (see e.g., [IEEE802.1CB]); (e) per-stream filtering and policing (see e.g., [IEEE802.3] § 8.6.5.1); and (f) cyclic queuing and forwarding(see e.g., [IEEE802.3], Annex T). YANG (IETF RFC 7950) is a data modeling language used to model configuration data and state data for remote network management protocols. The remote network management protocol uses a specific encoding such as XML or JSON. For a particular feature, a YANG module specifies the organization and rules for the feature's management data, and a mapping from YANG to the specific encoding enables the data to be understood correctly by both client (e.g., network manager) and server (e.g., bridge 710). Technically speaking, the TSN user/network configuration is not network management, in that information is exchanged between user and network, and not between a network manager and the network's bridges 710 (see e.g., [IEEE802.3] § 12). Nevertheless, the concepts are sufficiently similar that YANG is useful for modeling the configuration and state data for the TSN user/network configuration information.

1.4.4. TSN Configuration for Single End Station Hosting Multiple Talkers

In any of the aforementioned TSN configuration models, the CNC 830 that carries out this computation and uses existing protocols to send GCLs to all bridges 710 in a network. However, the CNC 830 does not communicate with end stations 701, 721; neither does it compute GCLs for them, although a typical talker end station will also contain a network interface with a GCE. The only thing the CNC 830 specifies for individual talker end stations 701, 704 is, for each requested stream, a transmit time offset (e.g., the TimeAwareOffset in the InterfaceConfiguration), which indicates the desired time relative to the GCL cycle start time at which the talker app 703 puts its packet on the wire. This means that if an end station 701 contains multiple talker apps 703, it would have to compute a GCL for its network interface 868 from the multitude of TimeAwareOffsets it has received.

However, according to [IEEE802.1Qcc], CNCs 830 do not communicate with end stations 701, 721 directly in the centralized model. Instead, CNCs 830 deliver the stream parameters (e.g., including TimeAwareOffset and other parameters as discussed in [IEEE802.1Qcc] and/or [IEEE802.3]) to one or more CUCs 833, which then use some non-TSN protocol to communicate to the end stations 701, 721. There could be several of these non-TSN protocols, and they can be proprietary protocols or protocols defined by interest groups. If an end station 701, 721 has to support more than one of these protocols, it can be increasingly difficult to coordinate the local generation of a GCL for the network interface 868 using the multitude of TimeAwareOffsets received through these different protocols. This is based in part on the protocol handlers being developed by different software (SW) vendors that may not coordinate their operations with competing products/developers. Additionally, the TimeAwareOffset specifies when a packet is to be sent to the physical layer, but does not account for any lead times within the end station 701, 721 that are needed to transport the packet from the application down to the networking hardware (e.g., interface 868). The internal scheduling of the software processes of the talker app(s) 703 has to consider TimeAwareOffset and these lead times. The complexity of this scheduling grows quickly as the number of talker apps 703 on the end station 801 increases.

The architecture 800 of FIG. 8 illustrates how the complex end station 801 fits into the context of the TSN network configuration. Here, domain-specific CUCs 833 (including CUCs 833-A, 833-B, and 833-C) deliver parameter to domain-specific configuration services 817 via domain-specific stream configuration protocol interfaces 837, which in turn configure the associated talker apps 703. Each of the services also interacts with a platform-wide TSN configuration service 815 that consolidates all the requests/configurations, and derives a platform-wide configuration from the consolidated requests/configurations obtained via interfaces/APIs 837. The platform-wide configuration includes, for example, scheduling configuration, container/VM/OS settings, a network interface configuration, and the calculation of a GCL (which may or may not be part of the network interface configuration). The TSN configuration service 815 has many interdependencies with other components, and its complexity scales badly with the number of applications and domains.

In various implementations, the complex end station 801 can be "transformed" into a combination of a bridge 710 and several non-complex (simple) end stations. In some implementations, a physical hardware bridge element can be added to the end station 801 for this purpose, while in other implementations the "transformation" is not physical in that a software bridge function is added to the platform. In either implementation, software reports the existence of a TSN-compliant bridge during the CNC's 830 device and topology discovery process running in the network (see e.g., *IEEE Standard for Local and metropolitan area networks—Station and Media Access Control Connectivity Discovery,"* IEEE Std 802.1AB-2016, pp. 1-146 (11 Mar. 2016) ("[IEEE802.1AB]"), the contents of which are hereby incorporated by reference in its entirety). This "virtual bridge" is connected to the rest of the physical network through a port (e.g., exactly one port in some examples), which is the physical network port of the platform. All other ports manifest purely through software and connect the individual talker apps 703 to the virtual switch 710v on a one-to-one basis.

FIG. 9 depicts another example complex end station configuration 900, where a complex end station 801 is transformed into configuration service simple end stations 904 (including simple end station 904-1 to simple end station 904-N, where N is a number) with a configuration service virtual bridge 910v. In FIG. 9, like numbered elements are the same as discussed previously. Each simple end station 904 includes one corresponding talker app 703 (including simple talker app 703-1 to talker app 703-N, where N is a number) and are connected to the TSN virtual bridge configuration service 905v.

Here, the platform-wide TSN configuration service 815 is simplified to act as the virtual bridge 910v, and exposes the required APIs 912 for discovery and configuration through the CNC 830 (which may be the same or similar as the interface/APIs 712 discussed previously) in a same or similar manner as other physical bridges 710 on the network. The bridge 910v configures the physical network interface 868 as determined by the CNC 830 (e.g., with a suitable GCL), and no local generation of a GCL is needed. The configuration service simple end stations 904 are used to query the talker apps 703 for data path latencies, which are reported to the CNC 830 as the propagation delay (or part of a propagation delay managed object) to be considered in the overall network schedule computation and/or GCL updates. The virtual bridge 910v can also provide a bridge delay managed object to be used by the CNC 830 to provide updated TSN configurations to the complex end station 701 and/or other stations in the TSN. Additional or alternative measurements/metrics and/or managed objects can be reported to the CNC 830 such as any of those discussed herein and/or in [IEEE802.1Q] and [IEEE802.1Qcc]. The domain-specific configuration services 815 still exist, however, their interaction with the TSN configuration of the platform 801, 801 has been removed, and they only interact with their associated apps 703.

It should be noted that the virtual bridges 710v, 910v in the complex end stations 701, 801 should not be confused with what is often called a "hybrid" or "multi-homed" device that contain additional external physical ports and additional internal ports to connect to applications running on a host processor. The additional external ports allow for "daisy-chaining" and typically require hardware support of the bridge functionality (e.g., forwarding pass-through data from one external port to the other).

Referring back to FIG. 7, which illustrates a logical view of the complex end station 701 from the perspective of the CNC 830. When the complex end station 701, 801 registers itself at the CNC 830 using the transformed representation, the CNC 830 considers the internal data paths from the talker apps 703 to the local network interface 868 as (virtual) network links 705v that are associated with a certain propagation delay. In various implementations, the CNC 830 will consider the network interface 868 as an egress port of a bridge 710 with a certain bridge delay (see e.g., [IEEE802.1Qcc], Annex U.2). In some implementations, an LLDP protocol handler on the complex end station 701, 801 is configured with the latency characteristics of these virtual links 705v, 905v, based on the achievable internal guaranteed communication latencies of the platform. Consequently, the CNC 830 will calculate a GCL for the network interface 868 of the complex end station 701, 801 that is harmonized with the rest of the network and will transfer the GCL to the complex end station 701, 801 just as it does with any other bridge 710 in the network. Likewise, the CNC 830 will compute *TimeAwareOffsets* for each virtual simple end station 704, describing when the associated talker apps 703 has to issue its data packets to the virtual bridge 712v. These *TimeAwareOffsets* can be used directly to control the scheduling of the workloads on the platform 701 as they represent deadlines at which the application has to be done finishing the generation of the packet data. This information can, for instance, directly be used in an earliest deadline first scheduling (EDF) scheme as offered for real-time processes by, for example, a Linux kernel. Offloading these calculations to the CNC 830 reduces implementation complexity on the end station 701, 801.

In one example implementation, the complex end station 701, 801 can include multiple virtual machines (VMs), where the multiple VMs host time-critical workloads sharing a physical TSN link without being aware of each other. In non-TSN systems, when multiple VMs share a physical TSN link, each VM is managed as an individual endpoint from a TSN configuration perspective, without the need of the VMs being aware of each other. In these non-TSN systems, it is relatively straightforward to, for example, to split 10 Gbps in 1 Gbps chunks in a TDM fashion because jitter is less of a concern than with TSN systems. With TSN, the latency and jitter requirements for each stream has to be respected, which makes partitioning a non-trivial issue.

In this example implementation, on a configuration plane, each VM is presented to the TSN management component (e.g., CNCs 830, CUCs 833, and/or the like) as an individual end station 704. The virtual end stations 704 are modeled as all being connected to a virtual bridge 710v, 910v that forwards the packets from each VM 704 over a single link 705 between the end station 701, 801 and a physically separate bridge 710. This link 705 is the actual physical TSN link of the VMs' 704 host (e.g., complex end station 701, 801). By using existing mechanisms, the TSN management component will determine if there is a viable configuration that satisfies the collective demand of all the VMs' 704 streams and calculates a GCL for the shared link 705 and GCLs for the individual virtual links 705v, 905v from each VM 704 to the virtual bridge 710v. The results are transferred from the TSN management component to the VMs 704 and host 701, 801 using existing protocols, and the host 701, 801 will program the GCL for the shared link into the physical NIC 868. The GCLs for each virtual end station 704 are converted into scheduling parameters for the internal transfer of packets from respective VMs 704 to the NIC 868. In these ways, existing logical model for network configuration can be used to solve problems that are internal to a single, consolidated end station, thereby does not require changes to current implementations of existing TSN configuration mechanisms and protocols. This transforms the collective resource requirements into network representations and vice versa. While this approach can be completely implemented in SW, in other implementations, hardware support can provide support for the mapping including mapping of single root I/O virtualization (SR-IOVs) ports and/or scalable I/O virtualization (S-IOVs) ports.

While the present disclosure has discussed the aforementioned implementations with respect to talker apps 703 for the sake of brevity, the aforementioned implementations could also be applied to listener apps 723. For listeners apps 723, no GCL computation is needed, but other configuration aspects such as, for example, configuring the Rx flow steering (e.g., MAC address matches, queue-to-CPU mappings, and/or the like) could be facilitated in a similar manner as discussed previously.

1.5. Time-Aware Energy Efficient Ethernet (EEE)

Various implementations discussed herein can use energy efficient Ethernet (EEE) and TSN, simultaneously. EEE reduces power consumption for networking by turning off or inactivating non-essential circuits and/or hardware elements when there is little or no network activity (see e.g., Assert LPI 1121 discussed infra). Waking up from the off or low power state introduces latencies since these circuits/hardware elements need to be turned on again. Waking up takes some time before operation can be resumed (see e.g., Deassert LPI 1122 and system wake time ($T_{w\_sys}$) discussed infra). However, EEE degrades determinism. For example, at 1 Gbps, the wake up may take tens of microseconds. Additionally, LPI may be asserted at the wrong point in time, triggering another sleep/wake up cycle. Furthermore, TSN is very sensitive to the jitter introduced by EEE wake-up. Current practice for TSN applications is to completely disable the use of EEE, which also removes any power saving advantages related to EEE.

As discussed in more detail infra, the jitter associated with the usage of EEE can be reduced and/or removed for TSN scheduled traffic, which allows TSN applications to take advantage of networking power saving. In particular, waking up from network power saving state is based on the knowledge about when data is expected to be sent. For example, by the time that time-critical traffic must be transmitted, the device is ready, that is, in an Idle state, and TSN scheduled traffic is used to prevent the device from transmitting non-time critical traffic at that time. To prevent the device from being in a low power state, the device is inhibited to sleep and/or forced to wake up at the appropriate points in time so that the state transitions are not likely to impact the time critical transmission windows. That is done in close alignment with the TSN scheduled traffic schedule. Furthermore, a new LPI guard band timer is introduced to prevent the link from going into sleep from an idle state or to wake from a LPI state if the link is already in LPI state and when the next gate control traffic is express traffic. This LPI guard band time is checked by the MAC scheduler with respect to express gate open commands/operations.

In some implementations, if discrete PHYs are used, the LPI signal can be used for cyclical assertion/deassertion in sync with TSN cycles. Additionally the use of EEE can be negotiated between link partners, a EEE-TSN device may advertise EEE despite running in TSN mode. Moreover, a device can be configured to support scheduled traffic that does not require disabling EEE in its operating instructions.

1.5.1. TSN Scheduled Traffic

As discussed in [IEEE802.1Qbv] (which is now incorporated into [IEEE802.1Q]) and in section 1.2 supra, provides for the reservation of specific timeslots for specific traffic types on a recurring basis. As mentioned previously, a GCE (e.g., GCE 850) provides synchronized timing of gate-open events and gate-close events of individual transmission gates (e.g., gates 310) for each TC of a bridge, router, or station according to a GCL (e.g., GCL 350, GCL 450, and/or GCL 550 of FIGS. 3-5). This prevents lower-priority traffic (e.g., best-effort traffic) from interfering with time-critical traffic (e.g., TSN traffic). As with scheduling of application code, scheduled traffic provides the lowest latency bound, but when latency requirements are not tight, alternative TSN traffic standards can be used. When scheduled traffic is used, the TSN standards for traffic policing (see e.g., *IEEE Standard for Local and metropolitan area networks—Bridges and Bridged Networks Amendment 28: Per-Stream Filtering and Policing*, IEEE Std 802.1Qci-2017, pp. 1-65 (28 Sep. 2017) ("[IEEE802.1Qci]"), the contents of which is hereby incorporated by reference in its entirety) provides features to police the scheduled traffic to help detect faulty or malicious equipment.

Figure 10:
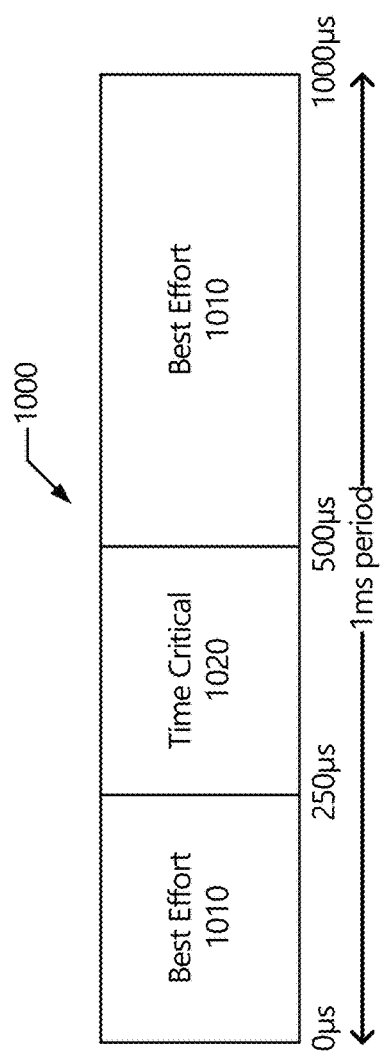
FIG. 10 depicts an example resource allocation for TSN traffic.

FIG. 10 depicts an example resource allocation 1000 for TSN traffic, which is a 1 millisecond (ms) time slot including first and second best-effort slots 1010 during which best-effort traffic can be communicated and a time-critical slot 1020 during which to time-critical traffic can be communicated. The first best-effort slot 1010 takes place from 0p to 250 µs, the time-critical slot 1020 takes place from 250 µs to 500 µs, and the second best-effort slot 1010 takes place from 500 µs to 1 ms.

As alluded to previously, each traffic type (e.g., time-critical traffic and best-effort traffic) may have corresponding TC queues (e.g., queues 301, queue(s) 406, 492, and/or the like). The gating mechanisms discussed previously (e.g., gates 310) are used to control the flow of data from these TC queues. In the example of FIG. 10, a gate connected to the queue associated with time-critical traffic is open from during the time-critical slot 1020 (e.g., from 250 µs to 500 µs each 1 ms cycle) with reference to the start of each 1 ms cycle, and the gate is closed for the remained of the 1 ms cycle. Furthermore, the gate connected to the queue associated with best-effort traffic is open during the best-effort time slots 1010. For example, the best-effort gate is open from 0 µs to 250 µs, closed from 250 µs to 500 µs, and open from 500 µs to 1000 µs, with reference to the start of each 1 ms cycle. This pattern can be defined by a suitable GCL (e.g., GCL 350, GCL 450, and/or GCL 550 of FIGS. 3-5). As discussed in more detail infra, a GCL can be used to coordinate the EEE sleep and wakeup cycles with GCLs involving time-critical traffic so that devices are always ready-to-transmit when at the moment a time-critical slot 1020 begins.

1.5.2. Energy Efficient Ethernet (EEE) and LPI Mode Aspects

The EEE capability combines the [IEEE802.3] MAC sublayer with a family of physical layers (PHY) defined to support operation in a low power idle (LPI) mode. When the LPI mode is enabled, systems on both sides of a link can save power during periods of low link utilization. EEE also provides a protocol to coordinate transitions to or from a lower level of power consumption and does this without changing the link status and without dropping or corrupting frames. The transition time into and out of the lower level of power consumption is kept small enough to be transparent to upper layer protocols and applications. Additionally, EEE specifies means to exchange capabilities between link partners to determine whether EEE is supported and to select the best set of parameters common to both devices. Additional aspects of EEE are discussed in [IEEE802.3].

Figure 11:
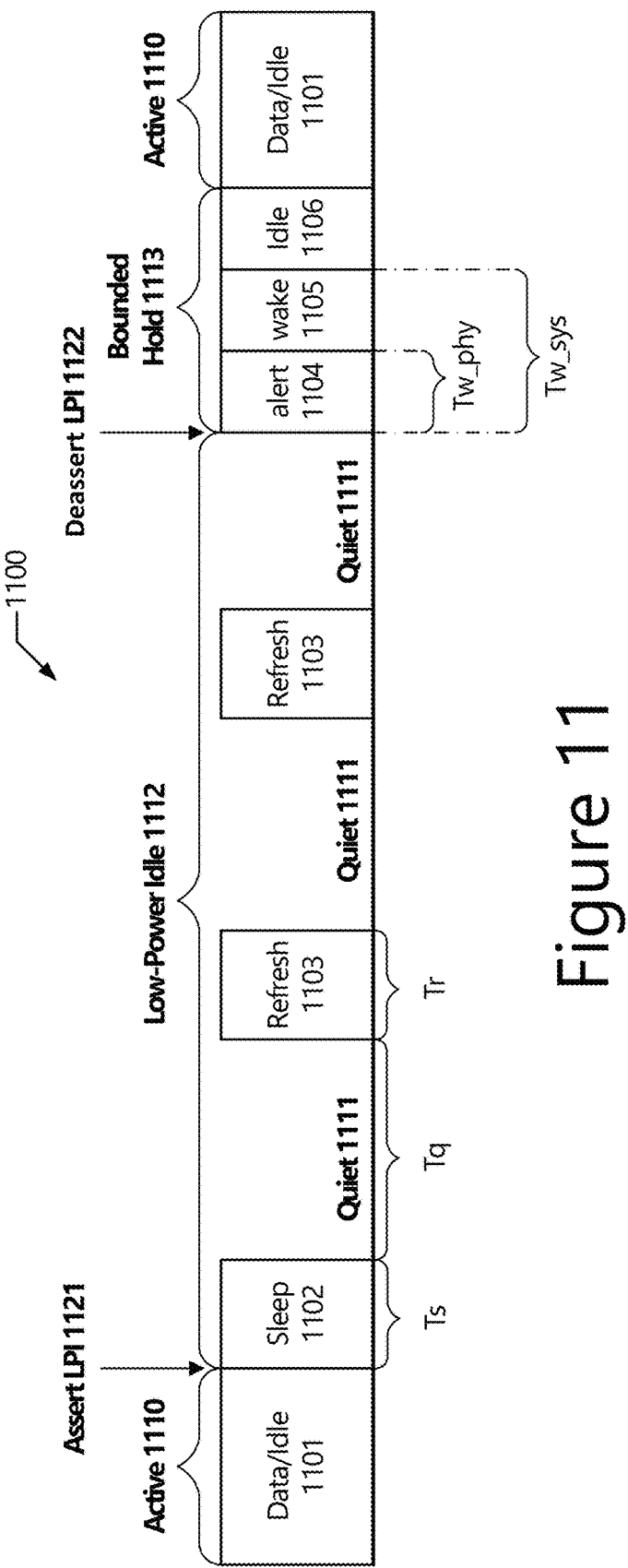
FIG. 11 depicts an example EEE scheduled traffic timing diagram.

FIG. 11 depicts an example EEE scheduled traffic timing diagram 1100. Here, the device (e.g., the PHY and/or transmitter (Tx) circuitry of a station) is in an active mode 1110 during a data/idle period 1101, and then enters a sleep state 1102 when an Assert LPI signal 1121 is issued. When the start of the Assert LPI 1121 encoding on the xMII is detected, the PHY signals sleep (e.g., sends a sleep signal 1102) to its link partner (e.g., another station) to indicate that the local Tx is entering LPI mode 1112. The Assert LPI signal 1121 causes the device to enter an LPI mode 1112 during which the device enters a sleep state 1102 followed by quiet periods 1111 with intermittent refreshes 1103. The sleep time ($T_s$) is followed by a quiet duration ($T_q$), and then a refresh state 1103 for a refresh duration ($T_r$). This is followed by another quiet period 1111, another refresh state 1103, and another quiet period 1111. When a Deassert LPI signal 1122 is issued, the device enters a bounded hold mode 1113, which includes an alert state 1104, a wake state 1105, and an idle state 1106. During the bounded hold mode 1113, the device enters the alert state 1104 during the PHY wake time ($T_{w\_phy}$) bound within a system wake time ($T_{w\_sys}$). After the alert state 1104, the device enters a wake state 1105 for a remainder of the system wake time ($T_{w\_sys}$) and then enters the idle state 1106. After the bounded hold mode 1113, the device re-enters the data/idle state 1101. The various timing parameters of FIG. 11 are also shown by Table 3 infra. The $T_{w\_sys}$ in FIG. 11 may correspond to the $T_{w\_sys\_tx}$ parameter or the $T_{w\_sys\_rx}$ parameter in Table 3.

The EEE capability in most PHYs requires the local PHY Tx to go quiet 1111 after sleep 1102 is signaled. In LPI mode 1112, the local PHY Tx goes quiet 1111 only after the local PHY signals sleep 1102 and receives a sleep signal 1102 from the remote PHY. If the remote PHY chooses not to signal LPI, then neither PHY can go into the low power mode. However, LPI requests 1121 are passed from one end of the link to the other regardless and system energy savings can be achieved even if the PHY link does not go into a low power mode. The transmit function of the local PHY is enabled periodically to transmit refresh signals 1103 that are used by the link partner to update adaptive filters and timing circuits in order to maintain link integrity. This quiet-refresh cycle (e.g., quiet 1111—refresh 1103 cycle) continues until the reception of the normal interframe encoding on the xMII. The transmit function in the PHY communicates this to the link partner by sending an alert signal 1104 for a predefined period of time (e.g., $T_{w\_phy}$) and/or a wake signal 1105 for a predefined period of time (e.g., $T_{w\_sys}$). The PHY then enters the normal operating state.

In some implementations (e.g., for EEE capable-PHYs with an operating speed of 25 Gb/s or greater), two modes of LPI operation may be supported including deep sleep and fast wake. Deep sleep refers to a mode in which the Tx ceases transmission during the LPI mode 1112 as shown in FIG. 11 and is equivalent to a mechanism defined for PHYs with a lower operating speed (e.g., 10 Gb/s or below). Fast wake refers to the mode for which the Tx continues to transmit signals during the LPI mode 1112 as shown in FIG. 11 so that the receiver (Rx) can resume operation with a shorter wake time 1105. For transmit, other than the PCS encoding LPI, there is no difference between fast wake and normal operation.

In the Rx direction, entering the LPI mode 1112 is triggered by the reception of a sleep signal 1102 from the link partner (e.g., the Tx PHY), which indicates that the link partner is about to enter the LPI mode 1112. After sending the sleep signal 1102, the link partner ceases transmission if not in fast wake mode. When the Rx detects the sleep signal 1102, the local PHY indicates Assert LPI 1121 on the xMII and the local Rx can disable some functionality to reduce power consumption. If not in fast wake mode, the link partner periodically transmits refresh signals 1103 that are used by the local PHY to update adaptive coefficients and timing circuits. This quiet-refresh cycle continues until the link partner initiates transition back to normal mode by transmitting the wake signal 1105 for a predetermined period of time controlled by the LPI assert function in the RS (e.g., RS 1230 of FIG. 12). This allows the local Rx to prepare for normal operation and transition from the Assert LPI 1121 encoding to the normal interframe encoding on the xMII. After a system specified recovery time (e.g., $T_{w\_sys}$), the link supports the nominal operational data rate.

In various implementations, TSN scheduled traffic includes the interval when time critical frames have to be sent, which is known in advance. In order to avoid EEE wake up interference to the time-critical traffic, the Deassert LPI signal 1122 is scheduled in a way that all relevant resources are ready for the time-critical traffic to be sent at the appropriate point in time (e.g., $T_{w\_sys}$ before the real-time critical slot 1020). Additionally, the Assert LPI signal 1121 can be prevented during the time critical slot 1020. In these ways, power savings can be optimized by taking advantage of the information in a traffic schedule (see e.g., [IEEE802.1Qbv] and/or [IEEE802.1Q].

Figure 12:
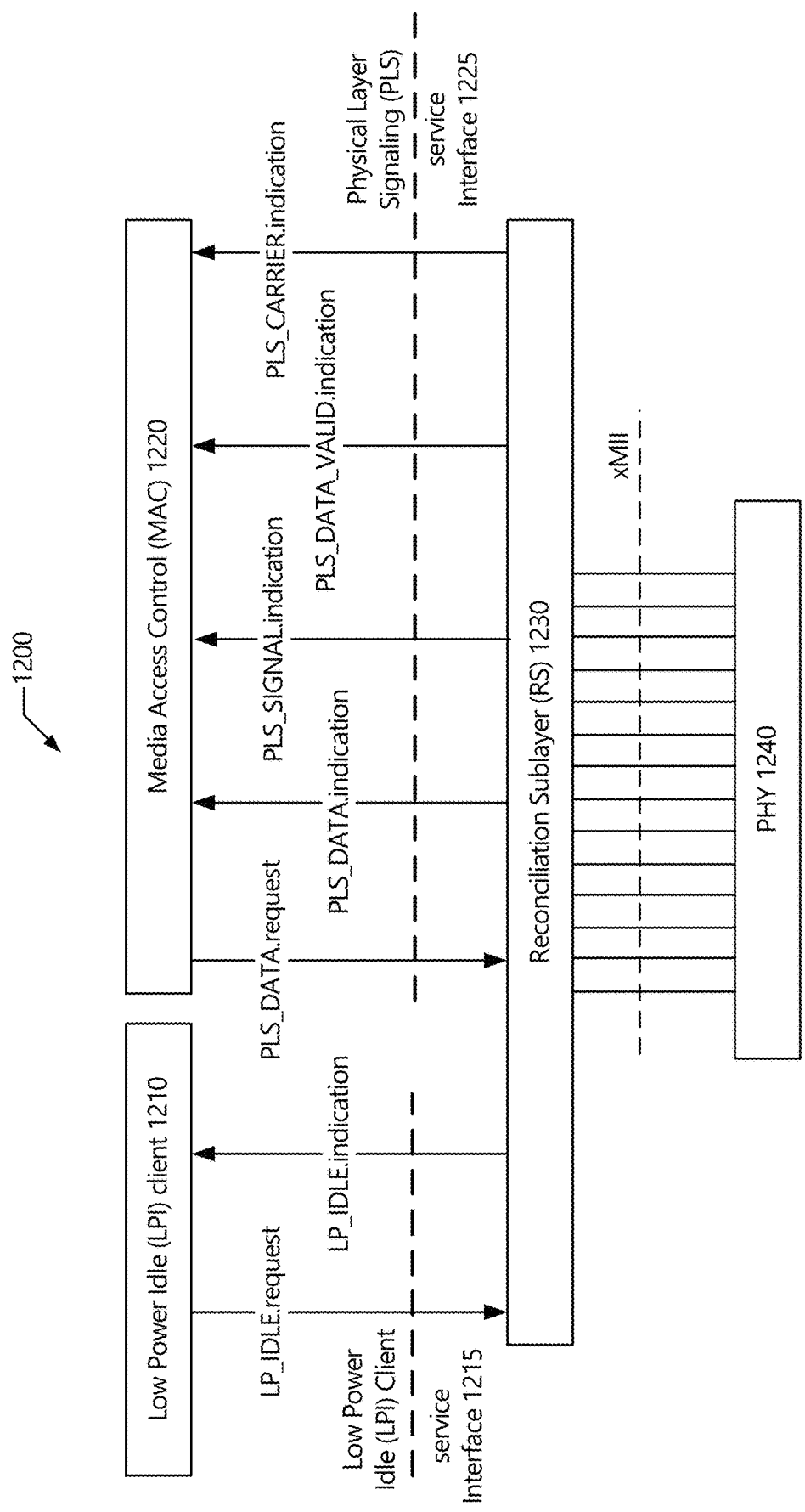
FIG. 12 depicts LPI Client and RS interlayer service interfaces.

FIG. 12 depicts an example LPI and reconciliation sublayer (RS) service architecture 1200 including an LPI client interlayer service interface 1215 and an RS interlayer service interface 1225 between an LPI client 1210 and an RS 1230. EEE is controlled by the LPI client 1210, which allows the MAC and higher layer entities to go into a sleep state. The LPI client 1210 signals and controls the transition in to, and out of, the LPI state/mode. The LPI state/mode involves asymmetric operation where each direction only wakes and sends data as needed. In some implementations, the PHY 1240 specifies the system wake up timing parameters.

The LPI mode is a mode intended to save power that may be enabled during periods of low link utilization in which either side of a link may disable portions of device or system functionality. LPI signaling allows an LPI client 1210 to indicate to the physical layer entity (PHY) 1240, and to a link partner, that a break in the data stream is expected. The LPI client 1210 can use this information to enter power-saving modes that require additional time to resume normal operation. LPI signaling also informs the LPI client 1210 when the link partner has sent such an indication. The definition of LPI signaling assumes the use of the MAC defined in Annex 4A of [IEEE802.3] for simplified full duplex operation with carrier sense deferral. This provides full duplex operation but uses the carrier sense signal to defer transmission when the PHY 1240 is in the LPI mode.

The LPI client 1210 connects to an RS service interface 1225. LPI signaling between the RS 1230 and a Physical Coding Sublayer (PCS) is performed by LPI encoding on a Media Independent Interface (MII). The RS 1230 is a mapping function that reconciles the signals at the MII to the MAC-Physical Signaling Sublayer (PLS) service definitions (see e.g., [IEEE802.31] § 22). The transmit PCS encodes LPI symbols, which are decoded by the link partner receive PCS. The receive and transmit PCS also generate service interface signals, which are passed down to the lower PHY sublayers and indicate when receive and transmit PHY functions may be powered down.

The EEE request signals from the PCS control transitions between quiescent and normal operation. The PCS (see e.g., [IEEE802.3] §§ 49, 82, 107) also requests transmit alert operation to assist the partner device PMD to detect the end of the quiescent state. Additionally, the PCS types generate the RX_LPI_ACTIVE signal, which indicates to the BASE-R FEC (see e.g., [IEEE802.31] § 74) that it can use rapid block lock because the link partner PCS has bypassed scrambling. Coding defined in [IEEE802.3] § 83.5.11 also allows the LPI transmit quiet and alert requests from the PCS to be signaled over the 25GAUI, XLAUI, and CAUI-n interfaces. The 25GAUI, XLAUI, and CAUI-n receive interfaces infer the quiet and alert requests from the data received over the interface and use that to recreate the transmit or receive direction signaling. The receive PCS checks that the link cycles out of the quiescent state at the correct time and that the received signals return to their expected state within the required time. The ENERGY DETECT indicate signal is passed up from the PMA to the PCS to allow the PCS to monitor the waking process.

The MAC layer 1220 is a data link sublayer that is responsible for transferring data to and from the PHY 1240. Within [IEEE802.3] system, the portion of the PHY 1240 between the Medium Dependent Interface (MDI) and a generic Media Independent Interface (xMII) includes a Physical Coding Sublayer (PCS), a Physical Medium Attachment (PMA), and, if present, a WAN Interface Sublayer (WIS) and Physical Medium Dependent (PMD) sublayers. The PHY 1240 contains functions that transmit, receive, and manage the encoded signals that are impressed on and recovered from the physical medium (see e.g., [IEEE802.31], clauses 23 to 26, 32, 36, 40, 48 to 54, 58 to 63, 65 to 66, 82 to 89, and 96).

The xMII is a transparent signal interface at the bottom of the RS that provides access to management parameters and services (see e.g., [IEEE802.31] § 22). The xMII is used as a generic term for the MIIs for different implementations. For example, the "x" in "xMII" is absent for 100 Mb/s implementations (e.g., "MII"); for 1 Gigabit per second (Gb/s) implementations the xMII refers to 1 Gb/s MII (GMII); for 10 Gb/s implementations the xMII refers to 10 Gb/s MII (XGMII); for 25 Gb/s implementations the xMII refers to 25 Gb/s MII (25GMII); for 40 Gb/s implementations the xMII refers to 40 Gb/s MII (XLGMII); for 100 Gb/s implementations the xMII refers to 100 Gb/s MII (CGMII); for 200 Gb/s implementations the xMII refers to 200 Gb/s MII (200GMII); and for 400 Gb/s implementations the xMII refers to 400 Gb/s MII (400GMII).

The PLS is the portion of the PHY 1240 contained within the data terminal equipment (DTE) that provides the logical and functional coupling between the Medium Attachment Unit (MAU) and the Data Link Layer. The MAU is a device containing an Attachment Unit Interface (AUI), Physical Medium Attachment (PMA), and Medium Dependent Interface (MDI) that is used to connect a repeater or data terminal equipment (DTE) to a transmission medium.

The decision on when to signal LPI to the link partner is made by the LPI client 1210 and communicated to the PHY 1240 through the RS. The LPI client 1210 is also informed when the link partner is signaling LPI by the RS. The conditions under which the LPI client 1210 decides to send LPI, and what action are taken by the LPI client 1210 when it receives LPI from the link partner, are implementation specific and beyond the scope of this standard.

The LPI client service interface 1215 is provided by the RS 1230 to the LPI client 1210. These services are described in an abstract manner and do not imply any particular implementation. The following primitives are defined for the LPI client service interface 1215: LP IDLE.request and LP_IDLE.indication. The LP_IDLE.request is a primitive used by the LPI client 1210 to start or stop the signaling of LPI to the link partner.

The semantics of the LP_IDLE.request service primitive are as follows: LP IDLE.request (LPI_REQUEST). The LPI REQUEST parameter can take one of two values: ASSERT or DEASSERT. ASSERT initiates the signaling of LPI to the link partner. DEASSERT stops the signaling of LPI to the link partner. The effect of receipt of this primitive is undefined in any of the following cases: (a) link_status is not OK (see e.g., [IEEE802.31] § 28.2.6.1.1); (b) LPI_REQUEST= ASSERT within 1 second (s) of the change of link_status to OK; (c) the PHY 1240 is indicating LOCAL FAULT; and (d) the PHY 1240 is indicating REMOTE FAULT. The time when this primitive is generated by the LPI client 1210 may be implementation specific. The receipt of this primitive causes the RS 1230 to start or stop signaling LPI to the link partner.

The LP_IDLE.indication is a primitive that is used to indicate to the LPI client 1210 that the link partner has started or stopped signaling LPI. The semantics of the LP_IDLE.indication service primitive are as follows: LP_IDLE.indication (LPI_INDICATION). The LPI_INDICATION parameter can take one of two values: ASSERT or DEASSERT. ASSERT indicates that the link partner has started signaling LPI. DEASSERT indicates that the link partner has stopped signaling LPI. This primitive is generated by the RS 1230 when it starts or stops receiving Assert LPI encoded on the receive xMII according to the rules defined in section 78.1.3.2 of [*IEEE*802.3]. The effect of receipt of this primitive by the LPI client 1210 may be implementation specific.

Figure 13:
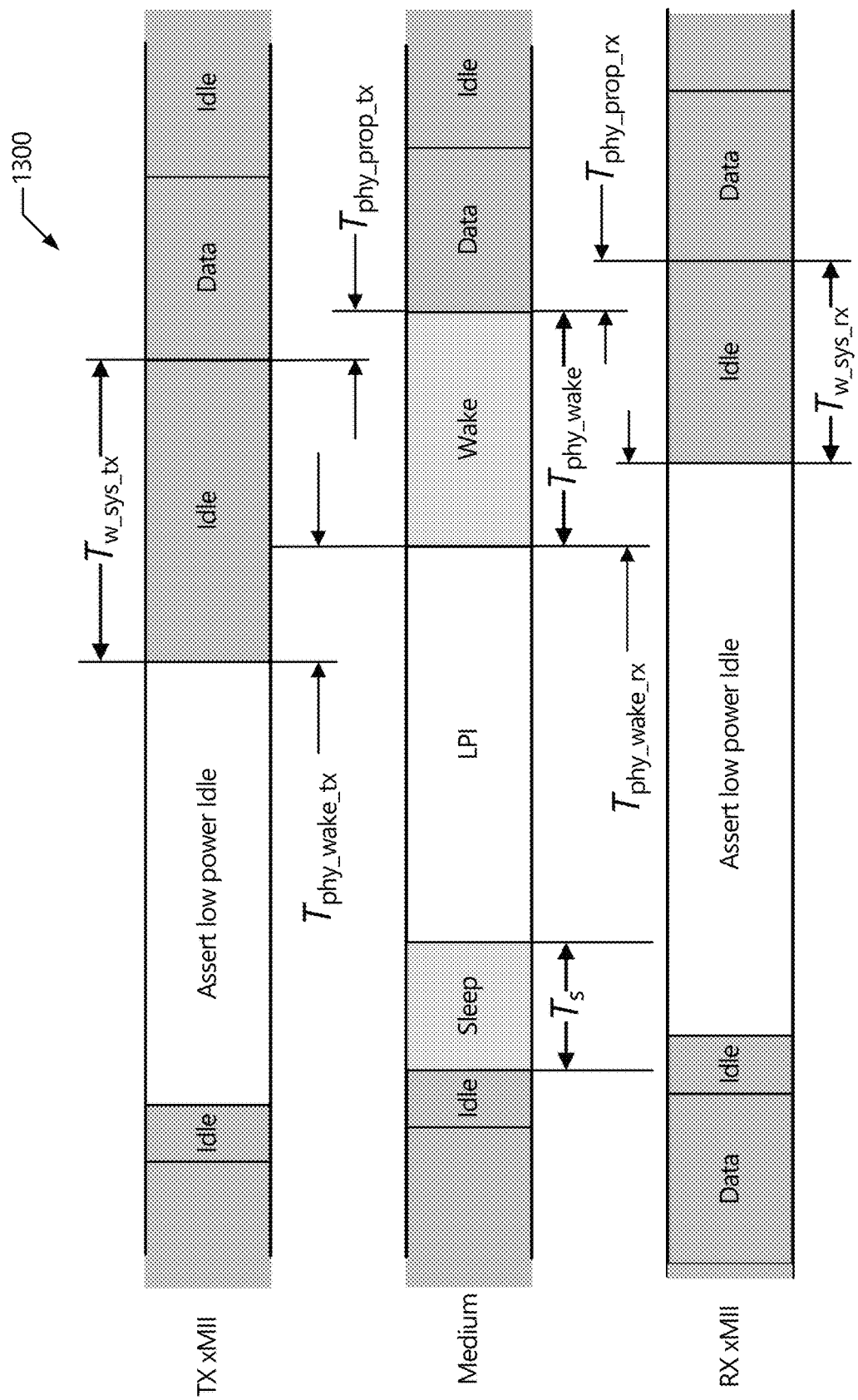
FIG. 13 depicts example low power idle (LPI) mode timing parameters and their relationship to a minimum system wake time.

FIG. 13 shows LPI mode timing diagram 1300 illustrating LPI mode timing parameters and their relationships to minimum system wake up time for a Tx's xMII, an Rx's xMII, and the transmission medium between the Tx and Rx. The parameters in FIG. 13 are summarized by Table 3.

TABLE 3

| | LPI mode timing parameters |
|---|---|
| $T_s$ | Parameter based on one or more of: the period of time that the PHY transmits the sleep signal before turning all transmitters off, the amount of time it takes to go to sleep, the amount of time it takes to enter the LPI state, and/or a minimum sleep duration required by the PHY |
| $T_q$ | The period of time that the PHY remains quiet before sending the refresh signal |
| $T_r$ | Duration of the refresh signal |
| $T_{phy\_prop\_tx}$ | The propagation delay of a given unit of data from the xMII to the MDI |
| $T_{phy\_prop\_rx}$ | The propagation delay of a given unit of data from the MDI to the xMII |
| $T_{phy\_shrink\_tx}$ | Transmitter shrinkage time, defined as the absolute time difference between the following two timing parameters: Delay between a transition from the "Assert LPI" to "Normal Idle" at the xMII and the corresponding start of the wake signal at the MDI $T_{phy\_prop\_tx}$ |
| $T_{phy\_shrink\_rx}$ | Receiver shrinkage time, defined as the absolute time difference between the following two timing parameters: Delay between start of the wake signal at the MDI and the corresponding transition from "Assert LPI" to "Normal Idle" at the xMII $T_{phy\_prop\_rx}$ |
| $T_{w\_phy}$ | Parameter employed by the system that corresponds to the behavior of the PHY. It is the period of time between reception of an IDLE signal on the xMII and when the first data codewords are permitted on the xMII. The wake time of a compliant PHY does not exceed $T_{w\_phy}(min)$. |
| $T_{w\_sys\_tx}$ | Parameter employed by the system that corresponds to its requirements. It is the longest period of time the system has to wait between a request to transmit and its readiness to transmit |

TABLE 3-continued

LPI mode timing parameters

| | |
|---|---|
| $T_{w\_sys\_rx}$ | Parameter employed by the system that corresponds to its requirements. It is the minimum time required by the system between a request to wake and its readiness to receive data. |
| $T_{phy\_wake\_tx}$ | xMII start of wake to MDI start of wake delay |
| $T_{phy\_prop\_tx}$ | xMII to MDI data propagation delay |
| $T_{phy\_wake\_rx}$ | MDI start of wake to xMII start of wake delay |
| $T_{phy\_prop\_rx}$ | MDI to xMII data propagation delay |
| $T_{phy\_wake}$ | Parameter based on one or more of: a minimum wake duration required by the PHY, the amount of time it takes to wake up, and/or the amount of time it takes to exit the LPI state. |

In FIG. 13, while the $T_{w\_phy}$ is at a minimum, $T_{w\_sys\_tx}$ can be set longer to accommodate longer PHY wake up. The relationship between the LPI mode timing parameters and the minimum system wake time can be expressed according to equations (1), (2), (3), (4), and (5).

$$T_{w\_sys\_tx}(\min)=T_{w\_sys\_rx}(\min)+T_{phy\_shrink\_tx}(\max) \\ T_{phy\_shrink\_rx}(\max) \quad (1)$$

$$T_{w\_phy}(\min)=T_{phy\_wake}(\min)+T_{phy\_shrink\_tx} \quad (2)$$

$$T_{w\_sys\_res}(\min) \text{ is the greater of } T_{w\_sys\_tx}(\min) \text{ and } \\ T_{w\_phy}(\min) \quad (3)$$

$$T_{phy\_shrink\_tx}(\max)=(T_{phy\_wake\_tx}(\max)-T_{phy\_prop\_tx}(\min)) \quad (4)$$

$$T_{phy\_shrink\_rx}(\max)=(T_{phy\_wake\_rx}(\max)-T_{phy\_prop\_rx}(\min)) \quad (5)$$

1.5.3. TSN with EEE

In various implementations, the TSN-EEE mechanisms guarantee that, by the time that time-critical traffic is to be transmitted, the device is ready (e.g. not sleeping or waking up); and/or while in a time-critical slot 1020, the device will not enter a low power state. Additionally, the scheduled traffic GCLs will ensure that the device is not in a data state when entering the time-critical sections. Any ongoing transmission will be finished before the time-critical slots are reached.

To prevent the device from being in the low power state (e.g., LPI mode 1112), entering the low power state (e.g., the sleep state 1102) or leaving the low power state (e.g., the wake state 1105). If the device was already sleeping (e.g., in the LPI mode 1112). The wake-up process will be triggered with enough headroom for the device to wake up completely and be ready to transmit in time. With reference to FIG. 13, this means that the device will start waking up at most $T_{phy-wake}$ before the transmission time. If the device was in an active mode (e.g., the Data/Idle mode 1101), the sleep process will not be initiated unless there is enough time for the device to enter and exit sleep 1102, before the next time-critical slot 1020 arrives. In terms of FIG. 13, LPI mode 1112 is inhibited at most $T_s + T_{phy\_wake}$ before the transmission time.

Figure 14:
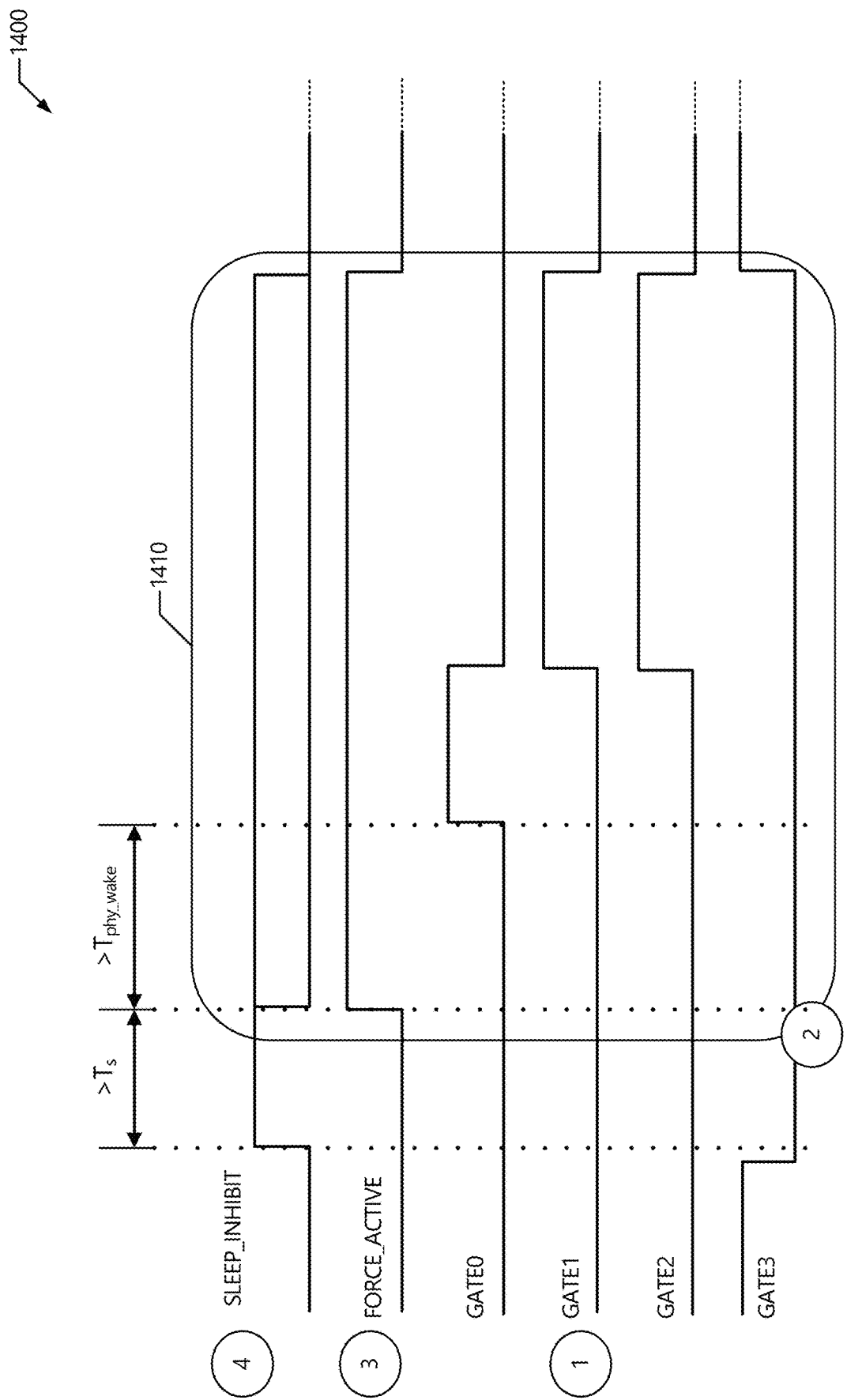
FIG. 14 depicts an example timing diagram for time-critical traffic.

FIG. 14 shows an example timing diagram 1400 for time-critical and best effort traffic. In particular, timing diagram 1400 shows the behavior of FORCE_ACTIVE, SLEEP_INHIBIT, and gate control signals for time-critical traffic (e.g., express traffic, stream reservation (SR) class traffic, and/or the like) and best effort traffic. In FIG. 14, GATE0, GATE1, GATE2, and GATE3 correspond to TC queues 0 to 3, respectively. Here, queue 0 is a queue for express traffic, queues 1 and 2 are used for SR class traffic (e.g., Audio Video Bridging (AVB) and/or the like), and queue 3 is used for best effort traffic and/or legacy traffic class(es). Additional queues can be included in other implementations. In this example, the FORCE_ACTIVE signal enforces the deassertion of LPI (e.g., Deassert LPI 1122) in a way that $T_{phy\_wake}$ is respected before the next express traffic open gate is asserted. In this way, if the device has to wake up, it should have enough time to re-enable the hardware. Additionally, the SLEEP_INHIBIT signal prevents LPI from being asserted (e.g., Assert LPI 1121), reducing or removing the introduction of additional latencies due to the transmitters being shut down and having to wake up later.

The timing diagram 1400 may operate as follows: at node 1, time-critical traffic is governed by GATE0, GATE1, and GATE2. When a gate signal (e.g., GATEx) is asserted, frames on that queue are transmitted. When a gate signal (e.g., GATEx) is deasserted, no frames on that queue are transmitted. At node 2, a time window LPI 1410 is applied to protect against LPI. Whenever one or more gates (e.g., GATEx) enclosed in the time window LPI 1410 is/are asserted, traffic flows immediately without any additional jitter. This is achieved at nodes 3 and 4. Node 3 involves triggering the FORCE_ACTIVE signal by at least $T_{phy\_wake}$ before the assertion of the first gate control signal (e.g., GATE0 in the example of FIG. 14). Node 4 involves triggering the SLEEP_INHIBIT signal by at least $T_s$ before the assertion of FORCE_ACTIVE.

In some implementations, LPI assertions can be derived from a GCE (e.g., GCE 850 or the like) according to the following rules: (1) filter the GCL for the gates related to express traffic; (2) logically OR these gates; (3) apply the relevant lead time (e.g., $T_{phy\_wake}$, which is the amount of time the link takes to wake up before the gates open); and (4) logically combine the auto-generated LPI control signal with the regular LPI control register used by other software elements.

In one example implementation, the GCE is extended to include two pseudo-gates (e.g., a first pseudo-gate for the FORCE ACTIVE signal and a second pseudo-gate for the INHIBIT_SLEEP signal) that are programmed with the gate cycle pattern resulting from the aforementioned computations. However, the pseudo-gates are only used for controlling the LPI. The computation could be done in SW (e.g. by the drivers/APIs 480). In these implementations, the only HW support would be an extra GCE column controlling the LPI line.

Figure 15:
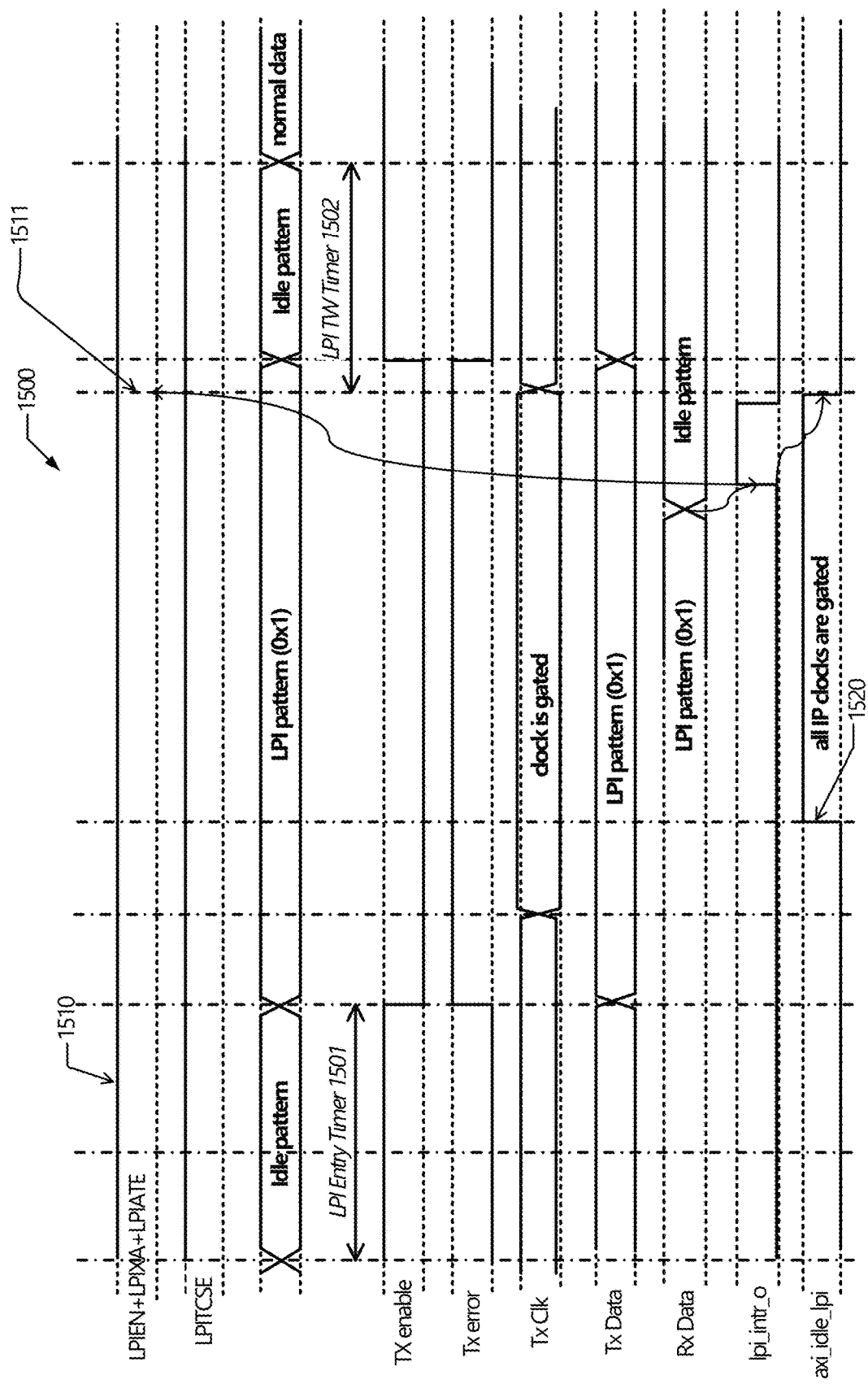
FIG. 15 depicts an example normal LPI entry/exit timing diagram without LPI guard band.

FIG. 15 depicts an example normal LPI entry/exit timing diagram 1500 including the timings of various signals (e.g., LPIEN+LPIXA+LPIATE, LPITCSE, TX enable, TX error, Tx Clk, Tx Data, Rx Data, 1pi_intr_o, and axi_idle_1pi) being enabled and/or disabled. At 1510, the LPIEN+LPIXA+LPIATE signal is initiated by the driver but one time only, or the LPIEN+LPIXA+LPIATE signal could be done by the driver on its own to initiate LPI exit at 1511. The axi_idle_1pi signal is initiated by an sbd_intr_o signal at 1520. Current MAC hardware implementations include two timers including an LPI entry timer 1501 and an LPI time wait (TW) exit timer 1502. The LPI entry timer 1501 is used to enter into LPI state when the link is idle for an amount of time specified in the LPI entry timer. In some example, the LPI entry timer counts (e.g., in ms) the time expired since the assertion of LPI. The LPI TW exit timer specifies amount of time that is needed to exit LPI state to a normal transmission state. In some examples, LPI TW timer counts (e.g., in μs) the time expired since the deassertion of LPI. However, these timers are not sufficient to prevent the link being going into LPI state just before transmission of time-critical traffic.

Figure 16:
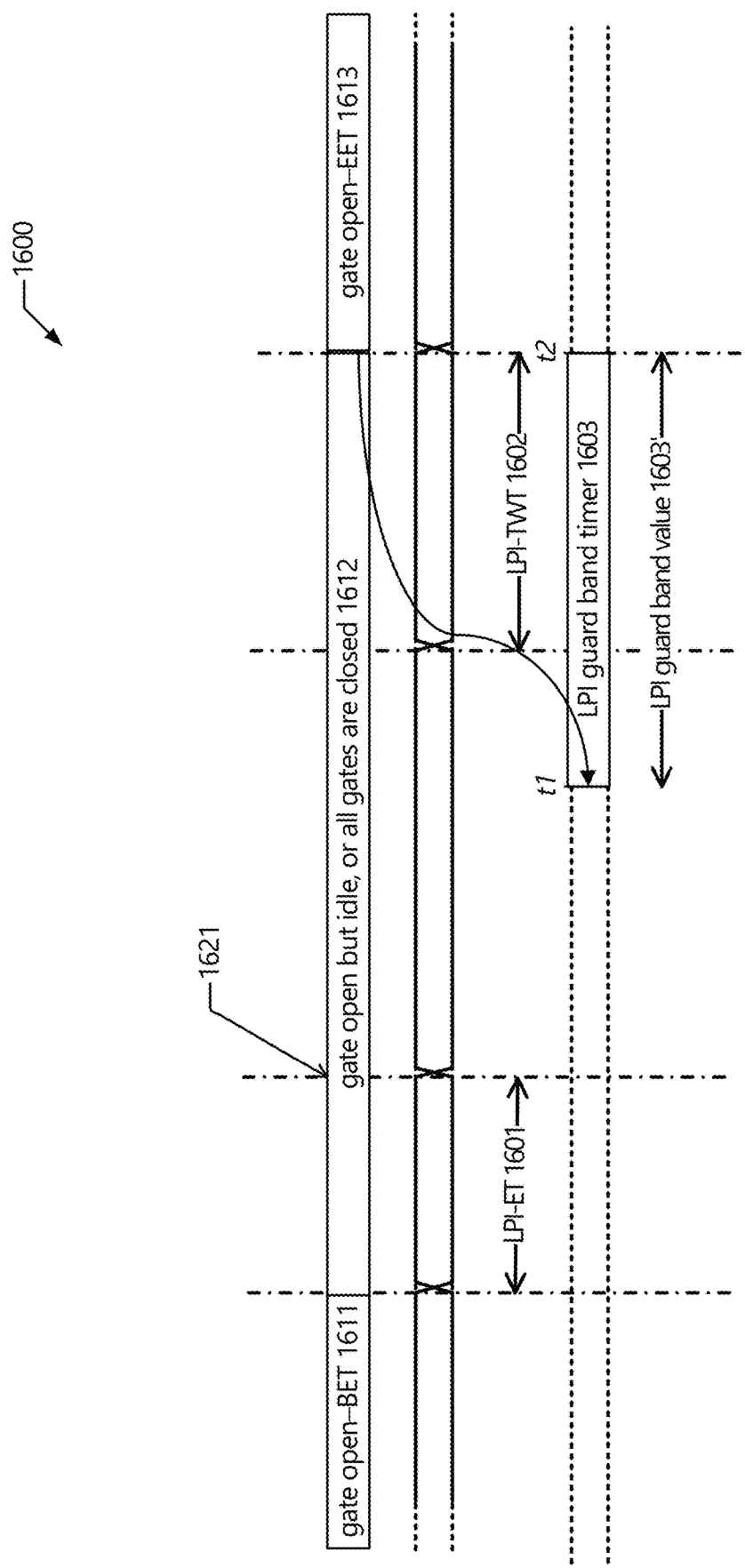
FIG. 16 depicts an example timing diagram with LPI guard band timer.

FIG. 16 depicts an example timing diagram 1600 with an LPI guard band timer with reference to MAC at xMII. The timing diagram 1600 includes an LPI entry timer (LPI-ET) 1601 and LPI TW exit timer (LPI-TWT) 1602. At period 1611 a gate is open for best effort traffic (BET); at period 1612 a gate is open due to best effort traffic, but is idle, or all gates are closed; and at period 1613 a gate is open for express effort traffic (EET) or time-critical traffic. At 1621, the device/link is already in the sleep mode or the device/link is about to go into sleep mode. Additionally, a new LPI guard band timer 1603 is included, which has a LPI guard band value 1603'. LPI guard band value 1603' is a minimum LPI prevention time, and is greater than the LPI exit time plus a predetermined or configured delta (state change) time. The LPI guard band timer 1603 is triggered at time $t1=t2-t_{guard}$ whenever there is a gate transition from best effort traffic to EET at time t2. During this $t_{guard}$ time, the link is forced to exit the LPI state if it is already in the LPI state, or is prevented from going into sleep state if the link is in the idle state. The following figures illustrate the current and proposed timings.

2. Computing System Configurations and Arrangements

Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, and/or the like) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, and/or the like) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, and/or the like). The orchestration functions may be used to deploy the isolated user-space instances, identifying and scheduling use of specific hardware, security related functions (e.g., key management, trust anchor management, and/or the like), and other tasks related to the provisioning and lifecycle of isolated user spaces.

Applications that have been adapted for edge computing include but are not limited to virtualization of traditional network functions including include, for example, Software-Defined Networking (SDN), Network Function Virtualization (NFV), distributed RAN units and/or RAN clouds, and the like. Additional example use cases for edge computing include computational offloading, Content Data Network (CDN) services (e.g., video on demand, content streaming, security surveillance, alarm system monitoring, building access, data/content caching, and/or the like), gaming services (e.g., AR/VR, and/or the like), accelerated browsing, IoT and industry applications (e.g., factory automation), media analytics, live streaming/transcoding, and V2X applications (e.g., driving assistance and/or autonomous driving applications).

The present disclosure provides various examples relevant to various edge computing technologies (ECTs) and edge network configurations provided within and various access/network implementations. Any suitable standards and network implementations are applicable to the edge computing concepts discussed herein. For example, many ECTs and networking technologies may be applicable to the present disclosure in various combinations and layouts of devices located at the edge of a network. Examples of such ECTs include [MEC]; [O-RAN]; [ISEO]; [SA6Edge]; [MAMS]; Content Delivery Networks (CDNs) (also referred to as "Content Distribution Networks" or the like); Mobility Service Provider (MSP) edge computing and/or Mobility as a Service (MAs) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes of the present disclosure. The edge computing systems and arrangements discussed herein may be applicable in various solutions, services, and/or use cases involving mobility. Examples of such scenarios are shown and described with respect to FIGS. 17-19.

Figure 17:
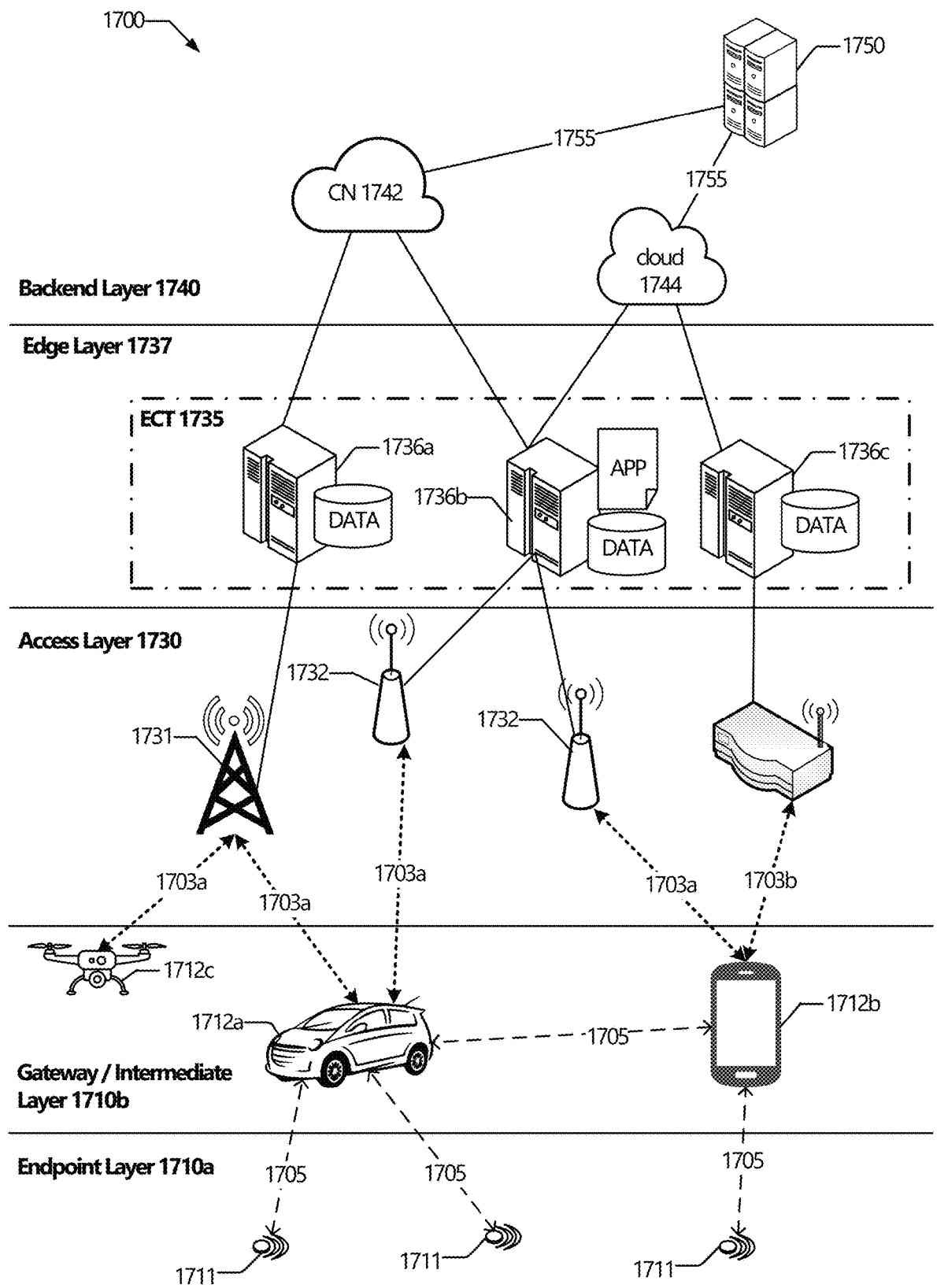
FIG. 17 illustrates an example edge computing environment.

FIG. 17 illustrates an example edge computing environment 1700 including different layers of communication, starting from an endpoint layer 1710a (also referred to as "sensor layer 1710a", "things layer 1710a", or the like) including one or more IoT devices 1711 (also referred to as "endpoints 1710a" or the like) (e.g., in an Internet of Things (IoT) network, wireless sensor network (WSN), fog, and/or mesh network topology); increasing in sophistication to intermediate layer 1710b (also referred to as "client layer 1710b", "gateway layer 1710b", or the like) including various user equipment (UEs) 1712a, 1712b, and 1712c (also referred to as "intermediate nodes 1710b" or the like), which may facilitate the collection and processing of data from endpoints 1710a; increasing in processing and connectivity sophistication to access layer 1730 including a set of network access nodes (NANs) 1731, 1732, and 1733 (collectively referred to as "NANs 1730" or the like); increasing in processing and connectivity sophistication to edge layer 1737 including a set of edge compute nodes 1736a-c (collectively referred to as "edge compute nodes 1736" or the like) within an edge computing framework 1735 (also referred to as "ECT 1735" or the like); and increasing in connectivity and processing sophistication to a backend layer 1740 including core network (CN) 1742, cloud 1744, and server(s) 1750. The processing at the backend layer 1740 may be enhanced by network services as performed by one or more remote servers 1750, which may be, or include, one or more CN functions, cloud compute nodes or clusters, application (app) servers, and/or other like systems and/or devices. Some or all of these elements may be equipped with or otherwise implement some or all features and/or functionality discussed herein.

The environment 1700 is shown to include end-user devices such as intermediate nodes 1710b and endpoint nodes 1710a (collectively referred to as "nodes 1710", "UEs 1710", or the like), which are configured to connect to (or communicatively couple with) one or more communication networks (also referred to as "access networks," "radio access networks," or the like) based on different access technologies (or "radio access technologies") for accessing application, edge, and/or cloud services. These access networks may include one or more NANs 1730, which are arranged to provide network connectivity to the UEs 1710 via respective links 1703a and/or 1703b (collectively referred to as "channels 1703", "links 1703", "connections 1703", and/or the like) between individual NANs 1730 and respective UEs 1710.

As examples, the communication networks and/or access technologies may include cellular technology such as LTE, MuLTEfire, and/or NR/5G (e.g., as provided by Radio Access Network (RAN) node 1731 and/or RAN nodes 1732), WiFi or wireless local area network (WLAN) technologies (e.g., as provided by access point (AP) 1733 and/or RAN nodes 1732), and/or the like. Different technologies exhibit benefits and limitations in different scenarios, and application performance in different scenarios becomes dependent on the choice of the access networks (e.g., WiFi, LTE, and/or the like) and the used network and transport protocols (e.g., Transfer Control Protocol (TCP), Virtual Private Network (VPN), Multi-Path TCP (MPTCP), Generic Routing Encapsulation (GRE), and/or the like).

The intermediate nodes 1710b include UE 1712a, UE 1712b, and UE 1712c (collectively referred to as "UE 1712" or "UEs 1712"). In this example, the UE 1712a is illustrated as a vehicle system (also referred to as a vehicle UE or vehicle station), UE 1712b is illustrated as a smartphone (e.g., handheld touchscreen mobile computing device connectable to one or more cellular networks), and UE 1712c is illustrated as a flying drone or unmanned aerial vehicle (UAV). However, the UEs 1712 may be any mobile or non-mobile computing device, such as desktop computers, workstations, laptop computers, tablets, wearable devices, PDAs, pagers, wireless handsets smart appliances, single-board computers (SBCs) (e.g., Raspberry Pi, Arduino, Intel Edison, and/or the like), plug computers, and/or any type of computing device such as any of those discussed herein.

The endpoints 1710 include UEs 1711, which may be IoT devices (also referred to as "IoT devices 1711"), which are uniquely identifiable embedded computing devices (e.g., within the Internet infrastructure) that comprise a network access layer designed for low-power IoT applications utilizing short-lived UE connections. The IoT devices 1711 are any physical or virtualized, devices, sensors, or "things" that are embedded with HW and/or SW components that enable the objects, devices, sensors, or "things" capable of capturing and/or recording data associated with an event, and capable of communicating such data with one or more other devices over a network with little or no user intervention. As examples, IoT devices 1711 may be abiotic devices such as autonomous sensors, gauges, meters, image capture devices, microphones, light emitting devices, audio emitting devices, audio and/or video playback devices, electro-mechanical devices (e.g., switch, actuator, and/or the like), EEMS, ECUs, ECMs, embedded systems, microcontrollers, control modules, networked or "smart" appliances, MTC devices, M2M devices, and/or the like. The IoT devices 1711 can utilize technologies such as M2M or MTC for exchanging data with an MTC server (e.g., a server 1750), an edge server 1736 and/or ECT 1735, or device via a PLMN, ProSe or D2D communication, sensor networks, or IoT networks. The M2M or MTC exchange of data may be a machine-initiated exchange of data.

The IoT devices 1711 may execute background applications (e.g., keep-alive messages, status updates, and/or the like) to facilitate the connections of the IoT network. Where the IoT devices 1711 are, or are embedded in, sensor devices, the IoT network may be a WSN. An IoT network describes an interconnecting IoT UEs, such as the IoT devices 1711 being connected to one another over respective direct links 1705. The IoT devices may include any number of different types of devices, grouped in various combinations (referred to as an "IoT group") that may include IoT devices that provide one or more services for a particular user, customer, organizations, and/or the like. A service provider (e.g., an owner/operator of server(s) 1750, CN 1742, and/or cloud 1744) may deploy the IoT devices in the IoT group to a particular area (e.g., a geolocation, building, and/or the like) in order to provide the one or more services. In some implementations, the IoT network may be a mesh network of IoT devices 1711, which may be termed a fog device, fog system, or fog, operating at the edge of the cloud 1744. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 1744 to Things (e.g., IoT devices 1711). The fog may be established in accordance with specifications released by the OFC, the OCF, among others. Additionally or alternatively, the fog may be a tangle as defined by the IOTA foundation.

The fog may be used to perform low-latency computation/aggregation on the data while routing it to an edge cloud computing service (e.g., edge nodes 1730) and/or a central cloud computing service (e.g., cloud 1744) for performing heavy computations or computationally burdensome tasks. On the other hand, edge cloud computing consolidates human-operated, voluntary resources, as a cloud. These voluntary resource may include, inter-alia, intermediate nodes 1720 and/or endpoints 1710, desktop PCs, tablets, smartphones, nano data centers, and the like. In various implementations, resources in the edge cloud may be in one to two-hop proximity to the IoT devices 1711, which may result in reducing overhead related to processing data and may reduce network delay.

Additionally or alternatively, the fog may be a consolidation of IoT devices 1711 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

Additionally or alternatively, the fog may operate at the edge of the cloud 1744. The fog operating at the edge of the cloud 1744 may overlap or be subsumed into an edge network 1730 of the cloud 1744. The edge network of the cloud 1744 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 1736 or edge devices). The Fog layer resides on top of the edge layer and is a consolidation of networking devices such as the intermediate nodes 1720 and/or endpoints 1710 of FIG. 17.

Data may be captured, stored/recorded, and communicated among the IoT devices 1711 or, for example, among the intermediate nodes 1720 and/or endpoints 1710 that have direct links 1705 with one another as shown by FIG. 17. Analysis of the traffic flow and control schemes may be implemented by aggregators that are in communication with the IoT devices 1711 and each other through a mesh network. The aggregators may be a type of IoT device 1711 and/or network appliance. In the example of FIG. 17, the aggregators may be edge nodes 1730, or one or more designated intermediate nodes 1720 and/or endpoints 1710. Data may be uploaded to the cloud 1744 via the aggregator, and commands can be received from the cloud 1744 through gateway devices that are in communication with the IoT devices 1711 and the aggregators through the mesh network. Unlike the traditional cloud computing model, in some implementations, the cloud 1744 may have little or no computational capabilities and only serves as a repository for archiving data recorded and processed by the fog. In these implementations, the cloud 1744 centralized data storage system and provides reliability and access to data by the computing resources in the fog and/or edge devices. Being at the core of the architecture, the Data Store of the cloud 1744 is accessible by both Edge and Fog layers of the aforementioned edge-fog network.

As mentioned previously, the access networks provide network connectivity to the end-user devices 1720, 1710 via respective NANs 1730. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for [WiMAX] implementations. Additionally or alternatively, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. Additionally or alternatively, the CRAN, CR, or vBBUP may implement a RAN function split, wherein one or more communication protocol layers are operated by the CRAN/CR/vBBUP and other communication protocol entities are operated by individual RAN nodes 1731, 1732. This virtualized framework allows the freed-up processor cores of the NANs 1731, 1732 to perform other virtualized applications, such as virtualized applications for various elements discussed herein.

The UEs 1710 may utilize respective connections (or channels) 1703a, each of which comprises a physical communications interface or layer. The connections 1703a are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. Additionally or alternatively, the UEs 1710 and the NANs 1730 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 1710 and NANs 1730 may operate using LAA, enhanced LAA (eLAA), and/or further eLAA (feLAA) mechanisms. The UEs 1710 may further directly exchange communication data via respective direct links 1705, which may be LTE/NR Proximity Services (ProSe) link or PC5 interfaces/links, or WiFi based links or a personal area network (PAN) based links (e.g., [IEEE802154] based protocols including ZigBee, IPv6 over Low power Wireless Personal Area Networks (6LoWPAN), WirelessHART, MiWi, Thread, and/or the like; WiFi-direct; Bluetooth/Bluetooth Low Energy (BLE) protocols).

Additionally or alternatively, individual UEs 1710 provide radio information to one or more NANs 1730 and/or one or more edge compute nodes 1736 (e.g., edge servers/hosts, and/or the like). The radio information may be in the form of one or more measurement reports, and/or may include, for example, signal strength measurements, signal quality measurements, and/or the like. Each measurement report is tagged with a timestamp and the location of the measurement (e.g., the UEs 1710 current location). As examples, the measurements collected by the UEs 1710 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet error ratio (PER), packet loss rate, packet reception rate (PRR), data rate, peak data rate, end-to-end (e2e) delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio ($E_b/N_0$), energy per chip to interference power density ratio ($E_c/I_0$), energy per chip to noise power density ratio ($E_c/N_0$), peak-to-average power ratio (PAPR), reference signal received power (RSRP), reference signal received quality (RSRQ), received signal strength indicator (RS SI), received channel power indicator (RCPI), received signal to noise indicator (RSNI), Received Signal Code Power (RSCP), average noise plus interference (ANPI), GNSS timing of cell frames for UE positioning for E-UTRAN or 5G/NR (e.g., a timing between an AP or RAN node reference time and a GNSS-specific reference time for a given GNSS), GNSS code measurements (e.g., the GNSS code phase (integer and fractional parts) of the spreading code of the $i^{th}$ GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurements, thermal noise power measurements, received interference power measurements, power histogram measurements, channel load measurements, STA statistics, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR), and RSRP, RSSI, RSRQ, RCPI, RSNI, and/or ANPI measurements of various beacon, Fast Initial Link Setup (FILS) discovery frames, or probe response frames for WLAN/WiFi (e.g., IEEE802111) networks. Other measurements may be additionally or alternatively used, such as those discussed in 3GPP TS 36.214 v16.2.0 (2021-03-31) ("[TS362141]"), 3GPP TS 38.215 v16.4.0 (2021-01-08) ("[TS382151]"), 3GPP TS 38.314 v16.4.0 (2021-09-30) ("[TS383141]"), *IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications, IEEE Std* 802.11-2020, pp. 1-4379 (26 Feb. 2021) ("[IEEE802111]"), and/or the like. Additionally or alternatively, any of the aforementioned measurements (or combination of measurements) may be collected by one or more NANs 1730 and provided to the edge compute node(s) 1736.

Additionally or alternatively, the measurements can include one or more of the following measurements: measurements related to Data Radio Bearer (DRB) (e.g., number of DRBs attempted to setup, number of DRBs successfully setup, number of released active DRBs, in-session activity time for DRB, number of DRBs attempted to be resumed, number of DRBs successfully resumed, and/or the like); measurements related to Radio Resource Control (RRC) (e.g., mean number of RRC connections, maximum number of RRC connections, mean number of stored inactive RRC connections, maximum number of stored inactive RRC connections, number of attempted, successful, and/or failed RRC connection establishments, and/or the like); measurements related to UE Context (UECNTX); measurements related to Radio Resource Utilization (RRU) (e.g., DL total PRB usage, UL total PRB usage, distribution of DL total PRB usage, distribution of UL total PRB usage, DL PRB used for data traffic, UL PRB used for data traffic, DL total available PRBs, UL total available PRBs, and/or the like); measurements related to Registration Management (RM); measurements related to Session Management (SM) (e.g., number of PDU sessions requested to setup; number of PDU sessions successfully setup; number of PDU sessions failed to setup, and/or the like); measurements related to GTP Management (GTP); measurements related to IP Management (IP); measurements related to Policy Association (PA); measurements related to Mobility Management (MM) (e.g., for inter-RAT, intra-RAT, and/or Intra/Inter-frequency handovers and/or conditional handovers: number of requested, successful, and/or failed handover preparations; number of requested, successful, and/or failed handover resource allocations; number of requested, successful, and/or failed handover executions; mean and/or maximum time of requested handover executions; number of successful and/or failed handover executions per beam pair, and/or the like); measurements related to Virtualized Resource(s) (VR); measurements related to Carrier (CARR); measurements related to QoS Flows (QF) (e.g., number of released active QoS flows, number of QoS flows attempted to release, in-session activity time for QoS flow, in-session activity time for a UE 1710, number of QoS flows attempted to setup, number of QoS flows successfully established, number of QoS flows failed to setup, number of initial QoS flows attempted to setup, number of initial QoS flows successfully established, number of initial QoS flows failed to setup, number of QoS flows attempted to modify, number of QoS flows successfully modified, number of QoS flows failed to modify, and/or the like); measurements related to Application Triggering (AT); measurements related to Short Message Service (SMS); measurements related to Power, Energy and Environment (PEE); measurements related to NF service (NFS); measurements related to Packet Flow Description (PFD); measurements related to Random Access Channel (RACH); measurements related to Measurement Report (MR); measurements related to Layer 1 Measurement (L1M); measurements related to Network Slice Selection (NSS); measurements related to Paging (PAG); measurements related to Non-IP Data Delivery (NIDD); measurements related to external parameter provisioning (EPP); measurements related to traffic influence (TI); measurements related to Connection Establishment (CE); measurements related to Service Parameter Provisioning (SPP); measurements related to Background Data Transfer Policy (BDTP); measurements related to Data Management (DM); and/or any other performance measurements such as those discussed in 3GPP TS 28.552 v17.3.1 (2021-06-24) ("[TS285521]"), 3GPP TS 32.425 v17.1.0 (2021-06-24) ("[TS324251]"), and/or the like.

The radio information may be reported in response to a trigger event and/or on a periodic basis. Additionally or alternatively, individual UEs 1710 report radio information either at a low periodicity or a high periodicity depending on a data transfer that is to take place, and/or other information about the data transfer. Additionally or alternatively, the edge compute node(s) 1736 may request the measurements from the NANs 1730 at low or high periodicity, or the NANs 1730 may provide the measurements to the edge compute node(s) 1736 at low or high periodicity. Additionally or alternatively, the edge compute node(s) 1736 may obtain other relevant data from other edge compute node(s) 1736, core network functions (NFs), application functions (AFs), and/or other UEs 1710 such as Key Performance Indicators (KPIs), with the measurement reports or separately from the measurement reports.

Additionally or alternatively, in cases where is discrepancy in the observation data from one or more UEs, one or more RAN nodes, and/or core network NFs (e.g., missing reports, erroneous data, and/or the like) simple imputations may be performed to supplement the obtained observation data such as, for example, substituting values from previous reports and/or historical data, apply an extrapolation filter, and/or the like. Additionally or alternatively, acceptable bounds for the observation data may be predetermined or configured. For example, CQI and MCS measurements may be configured to only be within ranges defined by suitable 3GPP standards. In cases where a reported data value does not make sense (e.g., the value exceeds an acceptable range/bounds, or the like), such values may be dropped for the current learning/training episode or epoch. For example, on packet delivery delay bounds may be defined or configured, and packets determined to have been received after the packet delivery delay bound may be dropped.

In any of the examples discussed herein, any suitable data collection and/or measurement mechanism(s) may be used to collect the observation data. For example, data marking (e.g., sequence numbering, and/or the like), packet tracing, signal measurement, data sampling, and/or timestamping techniques may be used to determine any of the aforementioned metrics/observations. The collection of data may be based on occurrence of events that trigger collection of the data. Additionally or alternatively, data collection may take place at the initiation or termination of an event. The data collection can be continuous, discontinuous, and/or have start and stop times. The data collection techniques/mechanisms may be specific to a HW configuration/implementation or non-HW-specific, or may be based on various software parameters (e.g., OS type and version, and/or the like). Various configurations may be used to define any of the aforementioned data collection parameters. Such configurations may be defined by suitable specifications/standards, such as 3GPP (e.g., [SA6Edge]), ETSI (e.g., [MEC]), O-RAN (e.g., [O-RAN]), Intel® Smart Edge Open (formerly OpenNESS) (e.g., [ISEO]), IETF (e.g., [MAMS]), IEEE/WiFi (e.g., [IEEE80211], [WiMAX], [IEEE16090], and/or the like), and/or any other like standards such as those discussed herein.

The UE 1712b is shown as being capable of accessing access point (AP) 1733 via a connection 1703b. In this example, the AP 1733 is shown to be connected to the Internet without connecting to the CN 1742 of the wireless system. The connection 1703b can comprise a local wireless connection, such as a connection consistent with any [IEEE802] protocol (e.g., [IEEE80211] and variants thereof), wherein the AP 1733 would comprise a WiFi router. Additionally or alternatively, the UEs 1710 can be configured to communicate using suitable communication signals with each other or with any of the AP 1733 over a single or multicarrier communication channel in accordance with various communication techniques, such as, but not limited to, an OFDM communication technique, a single-carrier frequency division multiple access (SC-FDMA) communication technique, and/or the like, although the scope of the present disclosure is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), and/or the like; or Quadrature Amplitude Modulation (QAM) such as M-QAM; and/or the like.

The one or more NANs 1731 and 1732 that enable the connections 1703a may be referred to as "RAN nodes" or the like. The RAN nodes 1731, 1732 may comprise ground stations (e.g., terrestrial access points) or satellite stations providing coverage within a geographic area (e.g., a cell). The RAN nodes 1731, 1732 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 1731 is embodied as a NodeB, evolved NodeB (eNB), or a next generation NodeB (gNB), and the RAN nodes 1732 are embodied as relay nodes, distributed units, or Road Side Unites (RSUs). Any other type of NANs can be used.

Any of the RAN nodes 1731, 1732 can terminate the air interface protocol and can be the first point of contact for the UEs 1712 and IoT devices 1711. Additionally or alternatively, any of the RAN nodes 1731, 1732 can fulfill various logical functions for the RAN including, but not limited to, RAN function(s) (e.g., radio network controller (RNC) functions and/or NG-RAN functions) for radio resource management, admission control, UL and DL dynamic resource allocation, radio bearer management, data packet scheduling, and/or the like. Additionally or alternatively, the UEs 1710 can be configured to communicate using OFDM communication signals with each other or with any of the NANs 1731, 1732 over a multicarrier communication channel in accordance with various communication techniques, such as, but not limited to, an OFDMA communication technique (e.g., for DL communications) and/or an SC-FDMA communication technique (e.g., for UL and ProSe or sidelink communications), although the scope of the present disclosure is not limited in this respect.

For most cellular communication systems, the RAN function(s) operated by the RAN or individual NANs 1731-1732 organize DL transmissions (e.g., from any of the RAN nodes 1731, 1732 to the UEs 1710) and UL transmissions (e.g., from the UEs 1710 to RAN nodes 1731, 1732) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 1710 at each transmission time interval (TTI). A TTI is the duration of a transmission on a radio link 1703a, 1705, and is related to the size of the data blocks passed to the radio link layer from higher network layers.

The NANs 1731, 1732 may be configured to communicate with one another via respective interfaces or links (not shown), such as an X2 interface for LTE implementations (e.g., when CN 1742 is an Evolved Packet Core (EPC)), an Xn interface for 5G or NR implementations (e.g., when CN 1742 is an Fifth Generation Core (5GC)), or the like. The NANs 1731 and 1732 are also communicatively coupled to CN 1742. Additionally or alternatively, the CN 1742 may be an evolved packet core (EPC), a NextGen Packet Core (NPC), a 5G core (5GC), and/or some other type of CN. The CN 1742 is a network of network elements and/or network functions (NFs) relating to a part of a communications network that is independent of the connection technology used by a terminal or user device. The CN 1742 comprises a plurality of network elements/NFs configured to offer various data and telecommunications services to customers/subscribers (e.g., users of UEs 1712 and IoT devices 1711) who are connected to the CN 1742 via a RAN. The components of the CN 1742 may be implemented in one physical node or separate physical nodes including components to read and execute instructions from a machine-readable or computer-readable medium (e.g., a non-transitory machine-readable storage medium). Additionally or alternatively, Network Functions Virtualization (NFV) may be utilized to virtualize any or all of the above-described network node functions via executable instructions stored in one or more computer-readable storage mediums (described in further detail infra). A logical instantiation of the CN 1742 may be referred to as a network slice, and a logical instantiation of a portion of the CN 1742 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 1742 components/functions.

The CN 1742 is shown to be communicatively coupled to an application server 1750 and a network 1750 via an IP communications interface 1755. the one or more server(s) 1750 comprise one or more physical and/or virtualized systems for providing functionality (or services) to one or more clients (e.g., UEs 1712 and IoT devices 1711) over a network. The server(s) 1750 may include various computer devices with rack computing architecture component(s), tower computing architecture component(s), blade computing architecture component(s), and/or the like. The server(s) 1750 may represent a cluster of servers, a server farm, a cloud computing service, or other grouping or pool of servers, which may be located in one or more datacenters. The server(s) 1750 may also be connected to, or otherwise associated with one or more data storage devices (not shown). Moreover, the server(s) 1750 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 1750 offer applications or services that use IP/network resources. As examples, the server(s) 1750 may provide traffic management services, cloud analytics, content streaming services, immersive gaming experiences, social networking and/or microblogging services, and/or other like services. In addition, the various services provided by the server(s) 1750 may include initiating and controlling software and/or firmware updates for applications or individual components implemented by the UEs 1712 and IoT devices 1711. The server(s) 1750 can also be configured to support one or more communication services (e.g., Voice-over-Internet Protocol (VoIP) sessions, PTT sessions, group communication sessions, social networking services, and/or the like) for the UEs 1712 and IoT devices 1711 via the CN 1742.

The Radio Access Technologies (RATs) employed by the NANs 1730, the UEs 1710, and the other elements in FIG. 17 may include, for example, any of the communication protocols and/or RATs discussed herein. Different technologies exhibit benefits and limitations in different scenarios, and application performance in different scenarios becomes dependent on the choice of the access networks (e.g., WiFi, LTE, and/or the like) and the used network and transport protocols (e.g., Transfer Control Protocol (TCP), Virtual Private Network (VPN), Multi-Path TCP (MPTCP), Generic Routing Encapsulation (GRE), and/or the like). These RATs may include one or more V2X RATs, which allow these elements to communicate directly with one another, with infrastructure equipment (e.g., NANs 1730), and other devices. In some implementations, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize a C-V2X air interface and the WLAN V2X RAT may utilize an W-V2X air interface.

The W-V2X RATs include, for example, [IEEE16090], [J2735_202007], Intelligent Transport Systems in the 5 GHz frequency band (ITS-G5), [IEEE80211p] (which is the layer 1 (L1) and layer 2 (L2) part of WAVE, DSRC, and ITS-G5), and/or [WiMAX]. The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including [IEEE80211p] RATs) that may be used in any geographic or political region, the terms "DSRC" (used, among other regions, in the U.S) and "ITS-G5" (used, among other regions, in Europe) may be used interchangeably throughout this disclosure. The access layer for the ITS-G5 interface is outlined in ETSI EN 302 663 V1.3.1 (2020-01) ("[EN3026631]") and describes the access layer of the ITS-S reference architecture. The ITS-G5 access layer comprises [IEEE80211] (which now incorporates [IEEE80211p]), as well as features for Decentralized Congestion Control (DCC) methods discussed in ETSI TS 102 687 V1.2.1 (2018-04) ("[TS1026871]"). The access layer for 3GPP LTE-V2X based interface(s) is outlined in, inter alia, ETSI EN 303 613 V1.1.1 (2020-01), 3GPP TS 23.285 v16.2.0 (2019-12); and 3GPP 5G/NR-V2X is outlined in, inter alia, 3GPP TR 23.786 v16.1.0 (2019-06) and 3GPP TS 23.287 v16.2.0 (2020-03).

The cloud 1744 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, and/or the like), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 1744 include application capabilities type, infrastructure capabilities type, and platform capabilities type. A cloud capabilities type is a classification of the functionality provided by a cloud service to a cloud service customer (e.g., a user of cloud 1744), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 1744 may provide include, for example, Communications as a Service (CaaS), which is a cloud service category involving real-time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

Additionally or alternatively, the cloud 1744 may represent one or more cloud servers, application servers, web servers, and/or some other remote infrastructure. The remote/cloud servers may include any one of a number of services and capabilities such as, for example, any of those discussed herein. Additionally or alternatively, the cloud 1744 may represent a network such as the Internet, a local area network (LAN), a wide area network (WAN), a wireless local area network (WLAN), or a wireless wide area network (WWAN) including proprietary and/or enterprise networks for a company or organization, or combinations thereof. The cloud 1744 may be a network that comprises computers, network connections among the computers, and software routines to enable communication between the computers over network connections. In this regard, the cloud 1744 comprises one or more network elements that may include one or more processors, communications systems (e.g., including network interface controllers, one or more transmitters/receivers connected to one or more antennas, and/or the like), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 1744 may be via a wired or a wireless connection using the various communication protocols discussed infra. More than one network may be involved in a communication session between the illustrated devices. Connection to the cloud 1744 may require that the computers execute software routines which enable, for example, the seven layers of the OSI model of computer networking or equivalent in a wireless (cellular) phone network. Cloud 1744 may be used to enable relatively long-range communication such as, for example, between the one or more server(s) 1750 and one or more UEs 1710. Additionally or alternatively, the cloud 1744 may represent the Internet, one or more cellular networks, local area networks, or wide area networks including proprietary and/or enterprise networks, TCP/Internet Protocol (IP)-based network, or combinations thereof. In these implementations, the cloud 1744 may be associated with network operator who owns or controls equipment and other elements necessary to provide network-related services, such as one or more base stations or access points, one or more servers for routing digital data or telephone calls (e.g., a core network or backbone network), and/or the like. The backbone links 1755 may include any number of wired or wireless technologies, and may be part of a LAN, a WAN, or the Internet. In one example, the backbone links 1755 are fiber backbone links that couple lower levels of service providers to the Internet, such as the CN 1712 and cloud 1744.

As shown by FIG. 17, each of the NANs 1731, 1732, and 1733 are co-located with edge compute nodes (or "edge servers") 1736a, 1736b, and 1736c, respectively. These implementations may be small-cell clouds (SCCs) where an edge compute node 1736 is co-located with a small cell (e.g., pico-cell, femto-cell, and/or the like), or may be mobile micro clouds (MCCs) where an edge compute node 1736 is co-located with a macro-cell (e.g., an eNB, gNB, and/or the like). The edge compute node 1736 may be deployed in a multitude of arrangements other than as shown by FIG. 17. In a first example, multiple NANs 1730 are co-located or otherwise communicatively coupled with one edge compute node 1736. In a second example, the edge servers 1736 may be co-located or operated by RNCs, which may be the case for legacy network deployments, such as 3G networks. In a third example, the edge servers 1736 may be deployed at cell aggregation sites or at multi-RAT aggregation points that can be located either within an enterprise or used in public coverage areas. In a fourth example, the edge servers 1736 may be deployed at the edge of CN 1742. These implementations may be used in follow-me clouds (FMC), where cloud services running at distributed data centers follow the UEs 1710 as they roam throughout the network.

In any of the implementations discussed herein, the edge servers 1736 provide a distributed computing environment for application and service hosting, and also provide storage and processing resources so that data and/or content can be processed in close proximity to subscribers (e.g., users of UEs 1710) for faster response times The edge servers 1736 also support multitenancy run-time and hosting environment (s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 1736 from the UEs 1710, CN 1742, cloud 1744, and/or server(s) 1750, or vice versa. For example, a device application or client application operating in a UE 1710 may offload application tasks or workloads to one or more edge servers 1736. In another example, an edge server 1736 may offload application tasks or workloads to one or more UE 1710 (e.g., for distributed ML computation or the like).

The edge compute nodes 1736 may include or be part of an edge system 1735 that employs one or more ECTs 1735. The edge compute nodes 1736 may also be referred to as "edge hosts 1736" or "edge servers 1736." The edge system 1735 includes a collection of edge servers 1736 and edge management systems (not shown by FIG. 17) necessary to run edge computing applications within an operator network or a subset of an operator network. The edge servers 1736 are physical computer systems that may include an edge platform and/or virtualization infrastructure, and provide compute, storage, and network resources to edge computing applications. Each of the edge servers 1736 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to UEs 1710. The VI of the edge servers 1736 provide virtualized environments and virtualized resources for the edge hosts, and the edge computing applications may run as VMs and/or application containers on top of the VI.

In one example implementation, the ECT 1735 is and/or operates according to the MEC framework, as discussed in ETSI GR MEC 001 v3.1.1 (2022-01), ETSI GS MEC 003 v3.1.1 (2022-03), ETSI GS MEC 009 v3.1.1 (2021-06), ETSI GS MEC 010-1 v1.1.1 (2017-10), ETSI GS MEC 010-2 v2.2.1(2022-02), ETSI GS MEC 011 v2.2.1 (2020-12), ETSI GS MEC 012 V2.2.1 (2022-02), ETSI GS MEC 013 V2.2.1 (2022-01), ETSI GS MEC 014 v2.1.1 (2021-03), ETSI GS MEC 015 v2.1.1 (2020-06), ETSI GS MEC 016 v2.2.1 (2020-04), ETSI GS MEC 021 v2.2.1 (2022-02), ETSI GR MEC 024 v2.1.1 (2019-11), ETSI GS MEC 028 V2.2.1 (2021-07), ETSI GS MEC 029 v2.2.1 (2022-01), ETSI MEC GS 030 v2.1.1 (2020-04), ETSI GR MEC 031 v2.1.1 (2020-10), U.S. Provisional App. No. 63/003,834 filed Apr. 1, 2020 ("[US'8341]"), and Int'l App. No. PCT/US2020/066969 filed on Dec. 23, 2020 ("[PCT'696]") (collectively referred to herein as "[MEC]"), the contents of each of which are hereby incorporated by reference in their entireties. This example implementation (and/or in any other example implementation discussed herein) may also include NFV and/or other like virtualization technologies such as those discussed in ETSI GR NFV 001 V1.3.1 (2021-03), ETSI GS NFV 002 V1.2.1 (2014-12), ETSI GR NFV 003 V1.6.1 (2021-03), ETSI GS NFV 006 V2.1.1 (2021-01), ETSI GS NFV-INF 001 V1.1.1 (2015-01), ETSI GS NFV-INF 003 V1.1.1 (2014-12), ETSI GS NFV-INF 004 V1.1.1 (2015-01), ETSI GS NFV-MAN 001 v1.1.1 (2014-12), and/or Israel et al, *OSM Release FIVE Technical Overview*, ETSI OPEN SOURCE MANO, OSM White Paper, 1st ed. (January 2019), https://osm.etsi.org/images/OSM-Whitepaper-TechContent-ReleaseFIVE-FINAL.pdf (collectively referred to as "[ETSINFV]"), the contents of each of which are hereby incorporated by reference in their entireties. Other virtualization technologies and/or service orchestration and automation platforms may be used such as, for example, those discussed in *E2E Network Slicing Architecture*, GSMA, Official Doc. NG.127, v1.0 (3 Jun. 2021), https://www.gsma. com/newsroom/wp-content/uploads//NG.127-v1.0-2. pdf, *Open Network Automation Platform (ONAP) documentation*, Release Istanbul, v9.0.1 (17 Feb. 2022), https://docs.onap.org/en/latest/index.html ("[ONAP]"), 3GPP Service Based Management Architecture (SBMA) as discussed in 3GPP TS 28.533 v17.1.0 (2021-12-23) ("[TS285331]"), the contents of each of which are hereby incorporated by reference in their entireties.

In another example implementation, the ECT 1735 is and/or operates according to the O-RAN framework. Typically, front-end and back-end device vendors and carriers have worked closely to ensure compatibility. The flip-side of such a working model is that it becomes quite difficult to plug-and-play with other devices and this can hamper innovation. To combat this, and to promote openness and interoperability at every level, several key players interested in the wireless domain (e.g., carriers, device manufacturers, academic institutions, and/or the like) formed the Open RAN alliance ("O-RAN") in 2018. The O-RAN network architecture is a building block for designing virtualized RAN on programmable hardware with radio access control powered by AI. Various aspects of the O-RAN architecture are described in *O-RAN Architecture Description v05.00*, 0-RAN ALLIANCE WG1 (July 2021); *O-RAN Operations and Maintenance Architecture Specification v04.00*, 0-RAN ALLIANCE WG1 (November 2020); *O-RAN Operations and Maintenance Interface Specification v04.00*, 0-RAN ALLIANCE WG1 (November 2020); *O-RAN Information Model and Data Models Specification v01.00*, O-RAN ALLIANCE WG1 (November 2020); *O-RAN Working Group 1 Slicing Architecture v05.00*, O-RAN ALLIANCE WG1 (July 2021) ("[O-RAN.WG1. Slicing-Architecture]"); O-RAN Working Group 2 (*Non-RT RIC and A1 interface WG*) *A1 interface: Application Protocol v03.01*, O-RAN ALLIANCE WG2 (March 2021); O-RAN Working Group 2 (*Non-RT RIC and A1 interface WG*) *A1 interface: Type Definitions v02.00*, O-RAN ALLIANCE WG2 (July 2021); O-RAN Working Group 2 (*Non-RT RIC and A1 interface WG*) *A1 interface: Transport Protocol v01.01*, O-RAN ALLIANCE WG2 (March 2021); *O-RAN Working Group 2 AI/ML workflow description and requirements v01.03* O-RAN ALLIANCE WG2 (July 2021); *O-RAN Working Group 2 Non-RT RIC: Functional Architecture v01.03* O-RAN ALLIANCE WG2 (July 2021); *O-RAN Working Group 3, Near-Real-time Intelligent Controller, E2 Application Protocol (E2AP) v02.00*, O-RAN ALLIANCE WG3 (July 2021); *O-RAN Working Group 3 Near-Real-time Intelligent Controller Architecture & E2 General Aspects and Principles v02.00*, O-RAN ALLIANCE WG3 (July 2021); *O-RAN Working Group 3 Near-Real-time Intelligent Controller E2 Service Model (E2SM) v02.00*, O-RAN ALLIANCE WG3 (July 2021); *O-RAN Working Group 3 Near-Real-time Intelligent Controller E2 Service Model (E2SM) KPM v02.00*, O-RAN ALLIANCE WG3 (July 2021); *O-RAN Working Group 3 Near-Real-time Intelligent Controller E2 Service Model (E2SM) RAN Function Network Interface (NI) v01.00*, O-RAN ALLIANCE WG3 (February 2020); *O-RAN Working Group 3 Near-Real-time Intelligent Controller E2 Service Model (E2SM) RAN Control v01.00*, O-RAN ALLIANCE WG3 (July 2021); *O-RAN Working Group 3 Near-Real-time Intelligent Controller Near-RT RIC Architecture v02.00*, O-RAN ALLIANCE WG3 (March 2021); *O-RAN Fronthaul Working Group 4 Cooperative Transport Interface Transport Control Plane Specification v02.00*, O-RAN ALLIANCE WG4 (March 2021); *O-RAN Fronthaul Working Group 4 Cooperative Transport Interface Transport Management Plane Specification v02.00*, O-RAN ALLIANCE WG4 (March 2021); *O-RAN Fronthaul Working Group 4 Control, User, and Synchronization Plane Specification v07.00*, O-RAN ALLIANCE WG4 (July 2021) ("[O-RAN.WG4. CUS]"); *O-RAN Fronthaul Working Group 4 Management Plane Specification v07.00*, O-RAN ALLIANCE WG4 (July 2021); *O-RAN Open F1/W1/E1/X2/Xn Interfaces Working Group Transport Specification v01.00*, O-RAN ALLIANCE WG5 (April 2020); *O-RAN Alliance Working Group 5 I1 Interface specification for O-DU v02.00*, O-RAN ALLIANCE WGX (July 2021); *Cloud Architecture and Deployment Scenarios for O-RAN Virtualized RAN v02.02*, O-RAN ALLIANCE WG6 (July 2021); *O-RAN Acceleration Abstraction Layer General Aspects and Principles v01.01*, O-RAN ALLIANCE WG6 (July 2021); *Cloud Platform Reference Designs v02.00*, O-RAN ALLIANCE WG6 (November 2020); *O-RAN O2 Interface General Aspects and Principles v01.01*, O-RAN ALLIANCE WG6 (July 2021); *O-RAN White Box Hardware Working Group Hardware Reference Design Specification for Indoor Pico Cell with Fronthaul Split Option 6* v02.00, O-RAN ALLIANCE WG7 (July 2021) ("[O-RAN.WG7. IPC-HRD-Opt6]"); *O-RAN WG7 Hardware Reference Design Specification for Indoor Picocell (FR1) with Split Option 7-2* v03.00, O-RAN ALLIANCE WG7 (July 2021) ("[O-RAN.WG7. IPC-HRD-Opt7]"); *O-RAN WG7 Hardware Reference Design Specification for Indoor Picocell (FR1) with Split Option 8* v03.00, O-RAN ALLIANCE WG7 (July 2021) ("[O-RAN.WG7. IPC-HRD-Opt8]"); *O-RAN Open Transport Working Group 9 Xhaul Packet Switched Architectures and Solutions* v02.00, O-RAN ALLIANCE WG9 (July 2021) ("[ORAN-WG9. XPAAS]"); *O-RAN Open X-haul Transport Working Group Management interfaces for Transport Network Elements* v02.00, O-RAN ALLIANCE WG9 (July 2021) ("[ORAN-WG9. XTRP-MGT]"); *O-RAN Open X-haul Transport WG9 WDM-based Fronthaul Transport* v01.00, O-RAN ALLIANCE WG9 (November 2020) ("[ORAN-WG9. WDM]"); *O-RAN Open X-haul Transport Working Group Synchronization Architecture and Solution Specification* v01.00, O-RAN ALLIANCE WG9 (March 2021) ("[ORAN-WG9. XTRP-SYN]"); *O-RAN Operations and Maintenance Interface Specification* v05.00, O-RAN ALLIANCE WG10 (July 2021); *O-RAN Operations and Maintenance Architecture* v05.00, O-RAN ALLIANCE WG10 (July 2021); *O-RAN: Towards an Open and Smart RAN*, O-RAN ALLIANCE, White Paper (October 2018), https://static1.squarespace.com/static/5ad774cce74940d7115044b0/t/5bc79b3719-05f4197055e8c 6/1539808057078/O-RAN+WP+FInal+181017. pdf ("[ORANWP]"), and U.S. patent application Ser. No. 17/484,743 filed on 24 Sep. 2021 ("[US'7431]") (collectively referred to as "[O-RAN]"); the contents of each of which are hereby incorporated by reference in their entireties.

In another example implementation, the ECT 1735 operates according to the 3rd Generation Partnership Project (3GPP) System Aspects Working Group 6 (SA6) Architecture for enabling Edge Applications (referred to as "3GPP edge computing") as discussed in 3GPP TS 23.558 v17.3.0 (2022-03-23) ("[TS235581]"), 3GPP TS 23.501 v17.4.0 (2022-03-23) ("[TS235011]"), and U.S. patent application Ser. No. 17/484,719 filed on 24 Sep. 2021 ("[US'7191]") (collectively referred to as "[SA6Edge]"), the contents of each of which is hereby incorporated by reference in their entireties.

In another example implementation, the ECT 1735 is and/or operates according to the Intel® Smart Edge Open framework (formerly known as OpenNESS) as discussed in Intel® Smart Edge Open Developer Guide, version 21.09 (30 Sep. 2021), available at: https://smart-edge-open.github.io/("[ISEO]"), the contents of which is hereby incorporated by reference in its entirety.

In another example implementation, the ECT 1735 operates according to the Multi-Access Management Services (MAMS) framework as discussed in Kanugovi et al., *Multi-Access Management Services (MAMS)*, INTERNET ENGINEERING TASK FORCE (IETF), Request for Comments (RFC) 8743 (March 2020) ("[RFC87431]"), Ford et al., *TCP Extensions for Multipath Operation with Multiple Addresses*, IETF RFC 8684, (March 2020), De Coninck et al., *Multipath Extensions for QUIC (MP-QUIC)*, IETF DRAFT-DECONINCK-QUIC-MULTIPATH-07, IETA, QUIC Working Group (3 May 2021), Zhu et al., *User-Plane Protocols for Multiple Access Management Service*, IETF DRAFT-ZHU-IN-TAREA-MAMS-USER-PROTOCOL-09, IETA, INTAREA (4 Mar. 2020), and Zhu et al., *Generic Multi-Access (GMA) Convergence Encapsulation Protocols*, IETF RFC 9188 (February 2022) (collectively referred to as "[MAMS]"), the contents of each of which are hereby incorporated by reference in their entireties. In these implementations, an edge compute node 1735 and/or one or more cloud computing nodes/clusters may be one or more MAMS servers that includes or operates a Network Connection Manager (NCM) for downstream/DL traffic, and the individual UEs 1710 include or operate a Client Connection Manager (CCM) for upstream/UL traffic. An NCM is a functional entity that handles MAMS control messages from clients (e.g., individual UEs 1710 configures the distribution of data packets over available access paths and (core) network paths, and manages user-plane treatment (e.g., tunneling, encryption, and/or the like) of the traffic flows (see e.g., [RFC8743], [MAMS]). The CCM is the peer functional element in a client (e.g., individual UEs 1710 that handles MAMS control-plane procedures, exchanges MAMS signaling messages with the NCM, and configures the network paths at the client for the transport of user data (e.g., network packets, and/or the like) (see e.g., [RFC8743], [MAMS]).

It should be understood that the aforementioned edge computing frameworks/ECTs and services deployment examples are only illustrative examples of ECTs, and that the present disclosure may be applicable to many other or additional edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure.

An example edge computing configuration includes a layer of processing referred to as an "edge cloud". The edge cloud is co-located at an edge location, such as a NAN 1731-1733, a local processing hub, or a central office, and thus may include multiple entities, devices, and equipment instances. The edge cloud is located much closer to the endpoint (consumer and producer) data sources (e.g., node 1710, 1720 including autonomous vehicles, business and industrial equipment, video capture devices, drones, smart cities and building devices, sensors and IoT devices, and/or the like) than a cloud data center (e.g., cloud 1744, server(s) 1750, and/or the like). Compute, memory, and storage resources which are offered at the edges in the edge cloud are critical to providing ultra-low latency response times for services and functions used by the endpoint data sources as well as reduce network backhaul traffic from the edge cloud toward cloud data center, thus, improving energy consumption and overall network usages among other benefits. In some embodiments, any of the data sources, edge cloud entities/elements, central office, and/or cloud/data center elements may be individual nodes in a node chain and/or be part of a TSN/TAN 100.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources. Aspects of an edge cloud architecture covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

As such, the edge cloud is formed from network components and functional features operated by and within edge gateway nodes, edge aggregation nodes, or other edge compute nodes among various network layers. The edge cloud, thus, may be embodied as any type of network that provides edge computing and/or storage resources which are proximately located to radio access network (RAN) capable endpoint devices (e.g., mobile computing devices, IoT devices, smart devices, and/or the like), which are discussed herein. In other words, the edge cloud may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, and/or the like), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud may be servers, multi-tenant servers, appliance computing devices, and/or any other type of computing devices. For example, the edge cloud may include an appliance computing device that is a self-contained electronic device including a housing, a chassis, a case or a shell. In some circumstances, the housing may be dimensioned for portability such that it can be carried by a human and/or shipped. Alternatively, it may be a smaller module suitable for installation in a vehicle for example. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications. Example housings and/or surfaces thereof may include or connect to mounting hardware to enable attachment to structures such as buildings, telecommunication structures (e.g., poles, antenna structures, and/or the like) and/or racks (e.g., server racks, blade mounts, and/or the like). Example housings and/or surfaces thereof may support one or more sensors (e.g., temperature sensors, vibration sensors, light sensors, acoustic sensors, capacitive sensors, proximity sensors, and/or the like). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, and/or the like) and/or articulating hardware (e.g., robot arms, pivotable appendages, and/or the like). In some circumstances, the sensors may include any type of input devices such as user interface hardware (e.g., buttons, switches, dials, sliders, and/or the like). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 19. The edge cloud may also include one or more servers and/or one or more multi-tenant servers. Such a server may include an operating system and implement a virtual computing environment. A virtual computing environment may include a hypervisor managing (e.g., spawning, deploying, destroying, and/or the like) one or more virtual machines, one or more containers, etc. Such virtual computing environments provide an execution environment in which one or more applications and/or other software, code or scripts may execute while being isolated from one or more other applications, software, code or scripts.

Figure 18:
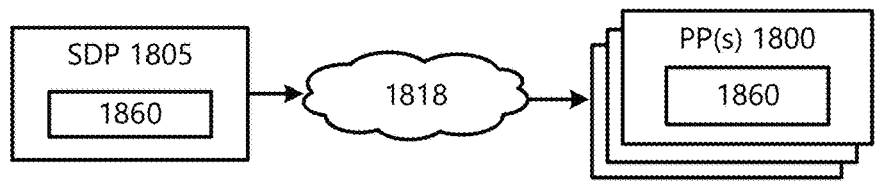
FIG. 18 illustrates an example software distribution platform.
Figure 19:
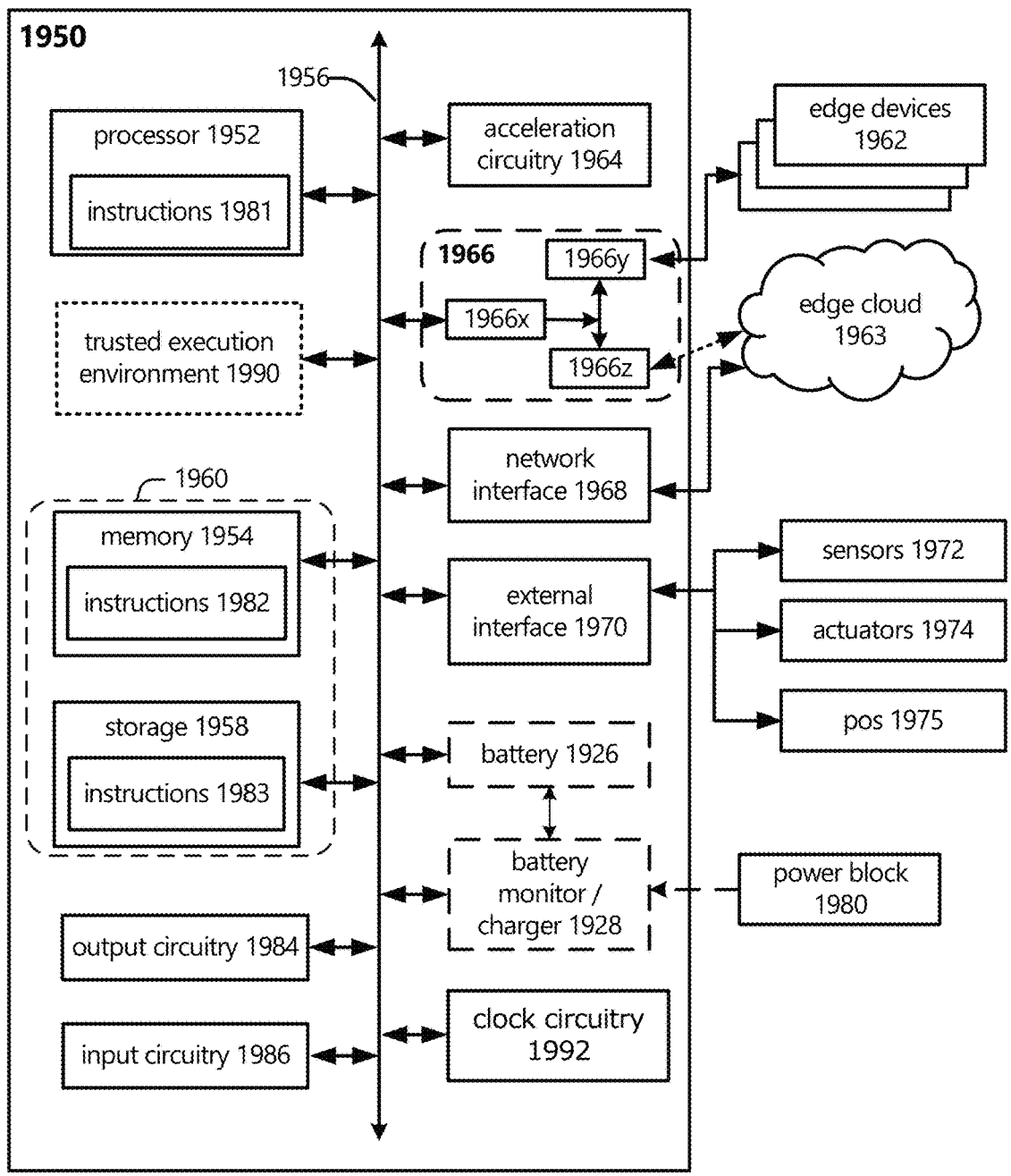
FIG. 19 depicts example components a compute node.

FIG. 18 illustrates an example software distribution platform 1805 to distribute software 1860, such as the example computer readable instructions 1960 of FIG. 19, to one or more devices, such as example processor platform(s) 1800 and/or example connected edge devices 1962 (see e.g., FIG. 19) and/or any of the other computing systems/devices discussed herein. The example software distribution platform 1805 may be implemented by any computer server, data facility, cloud service, and/or the like, capable of storing and transmitting software to other computing devices (e.g., third parties, the example connected edge devices 1962 of FIG. 19). Example connected edge devices may be customers, clients, managing devices (e.g., servers), third parties (e.g., customers of an entity owning and/or operating the software distribution platform 1805). Example connected edge devices may operate in commercial and/or home automation environments. In some examples, a third party is a developer, a seller, and/or a licensor of software such as the example computer readable instructions 1960 of FIG. 19. The third parties may be consumers, users, retailers, OEMs, and/or the like that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), and/or the like).

In the example of FIG. 18, the software distribution platform 1805 includes one or more servers and one or more storage devices. The storage devices store the computer readable instructions 1860, which may correspond to the example computer readable instructions 1960 of FIG. 19, as described above. The one or more servers of the example software distribution platform 1805 are in communication with a network 1810, which may correspond to any one or more of the Internet and/or any of the example networks as described herein. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 1860 from the software distribution platform 1805. For example, the software 1860, which may correspond to the example computer readable instructions 1960 of FIG. 19, may be downloaded to the example processor platform(s) 1800, which is/are to execute the computer readable instructions 1860 to implement the various implementations discussed herein. In some examples, one or more servers of the software distribution platform 1805 are communicatively connected to one or more security domains and/or security devices through which requests and transmissions of the example computer readable instructions 1860 must pass. In some examples, one or more servers of the software distribution platform 1805 periodically offer, transmit, and/or force updates to the software (e.g., the example computer readable instructions 1960 of FIG. 19) to ensure improvements, patches, updates, and/or the like are distributed and applied to the software at the end user devices.

The computer readable instructions 1860 are stored on storage devices of the software distribution platform 1805 in a particular format. A format of computer readable instructions includes, but is not limited to a particular code language (e.g., Java, JavaScript, Python, C, C#, SQL, HTML, and/or the like), and/or a particular code state (e.g., uncompiled code (e.g., ASCII), interpreted code, linked code, executable code (e.g., a binary), and/or the like). In some examples, the computer readable instructions 1981, 1982, 1983 stored in the software distribution platform 1805 are in a first format when transmitted to the example processor platform(s) 1800. In some examples, the first format is an executable binary in which particular types of the processor platform(s) 1800 can execute. However, in some examples, the first format is uncompiled code that requires one or more preparation tasks to transform the first format to a second format to enable execution on the example processor platform(s) 1800. For instance, the receiving processor platform(s) 1800 may need to compile the computer readable instructions 1860 in the first format to generate executable code in a second format that is capable of being executed on the processor platform(s) 1800. In still other examples, the first format is interpreted code that, upon reaching the processor platform(s) 1800, is interpreted by an interpreter to facilitate execution of instructions.

FIG. 19 illustrates an example of components that may be present in an compute node 1950 for implementing the techniques (e.g., operations, processes, methods, and methodologies) described herein. This compute node 1950 provides a closer view of the respective components of node 1950 when implemented as or as part of a computing device (e.g., as a mobile device, a base station, server, gateway, and/or the like). The compute node 1950 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the compute node 1950, or as components otherwise incorporated within a chassis of a larger system. In some examples, the compute node 1950 may correspond to the bridges, routers, and end stations discussed with respect to FIGS. 1-3; end stations 701, 801, 721, bridge 710, CNC 830, CUCs 833 of FIGS. 7-9; a station or device including the EEE-TSN mechanisms of FIGS. 10-16; software distribution platform 1805 and/or processor platform(s) 1800 of FIG. 18; and/or any other component, device, and/or system discussed herein. The compute node 1950 may be embodied as a type of device, appliance, computer, or other "thing" capable of communicating with other edge, networking, or endpoint components. For example, compute node 1950 may be embodied as a smartphone, a mobile compute device, a smart appliance, an in-vehicle compute system (e.g., a navigation system), an edge compute node, a NAN, switch, router, bridge, hub, and/or other device or system capable of performing the described functions.

The compute node 1950 includes processing circuitry in the form of one or more processors 1952. The processor circuitry 1952 includes circuitry such as, for example, one or more processor cores and one or more of cache memory, low drop-out voltage regulators (LDOs), interrupt controllers, serial interfaces such as SPI, I$^2$C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1952 may include one or more hardware accelerators (e.g., same or similar to acceleration circuitry 1964), which may be microprocessors, programmable processing devices (e.g., FPGA, ASIC, and/or the like), or the like. The one or more accelerators may include, for example, computer vision and/or deep learning accelerators. In some implementations, the processor circuitry 1952 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein. The processor circuitry 1952 includes a microarchitecture that is capable of executing the µenclave implementations and techniques discussed herein. The processors (or cores) 1952 may be coupled with or may include memory/storage and may be configured to execute instructions stored in the memory/storage to enable various applications or OSs to run on the platform 1950. The processors (or cores) 1952 is configured to operate application software to provide a specific service to a user of the platform 1950. Additionally or alternatively, the processor(s) 1952 may be a special-purpose processor(s)/controller(s) configured (or configurable) to operate according to the elements, features, and implementations discussed herein.

The processor circuitry 1952 may be or include, for example, one or more processor cores (CPUs), application processors, graphics processing units (GPUs), RISC processors, Acorn RISC Machine (ARM) processors, CISC processors, one or more DSPs, FPGAs, PLDs, one or more ASICs, baseband processors, radio-frequency integrated circuits (RFIC), microprocessors or controllers, multi-core processor, multithreaded processor, ultra-low voltage processor, embedded processor, an XPU, a data processing unit (DPU), an Infrastructure Processing Unit (IPU), a network processing unit (NPU), and/or any other known processing elements, or any suitable combination thereof.

As examples, the processor(s) 1952 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 1952 may be a part of a system on a chip (SoC), System-in-Package (SiP), a multi-chip package (MCP), and/or the like, in which the processor(s) 1952 and other components are formed into a single integrated circuit, or a single package, such as the Edison™ or Galileo™ SoC boards from Intel® Corporation. Other examples of the processor(s) 1952 are mentioned elsewhere in the present disclosure. In some implementations, the processor circuitry 1952 may be or include the host platform 490 of FIG. 4.

The processor(s) 1952 may communicate with system memory 1954 over an interconnect (IX) 1956. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or Mini-DIMMs. Additionally or alternatively, the memory circuitry 1954 is or includes block addressable memory device(s), such as those based on NAND or NOR technologies (e.g., single-level cell ("SLC"), Multi-Level Cell ("MLC"), Quad-Level Cell ("QLC"), Tri-Level Cell ("TLC"), or some other NAND). In some implementations, the memory circuitry 1954 corresponds to, or includes, the memory subsystem 470 of FIG. 4 discussed previously.

To provide for persistent storage of information such as data, applications, OSs and so forth, a storage 1958 may also couple to the processor 1952 via the IX 1956. In an example, the storage 1958 may be implemented via a solid-state disk drive (SSDD) and/or high-speed electrically erasable memory (commonly referred to as "flash memory"). Other devices that may be used for the storage 1958 include flash memory cards, such as SD cards, microSD cards, eXtreme Digital (XD) picture cards, and the like, and USB flash drives. Additionally or alternatively, the memory circuitry 1954 and/or storage circuitry 1958 may be or may include memory devices that use chalcogenide glass, multi-threshold level NAND flash memory, NOR flash memory, single or multi-level Phase Change Memory (PCM) and/or phase change memory with a switch (PCMS), NVM devices that use chalcogenide phase change material (e.g., chalcogenide glass), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. Additionally or alternatively, the memory circuitry 1954 and/or storage circuitry 1958 can include resistor-based and/or transistor-less memory architectures. The memory circuitry 1954 and/or storage circuitry 1958 may also incorporate three-dimensional (3D) cross-point (XPOINT) memory devices (e.g., Intel® 3D XPoint™ memory), and/or other byte addressable write-in-place NVM. The memory circuitry 1954 and/or storage circuitry 1958 may refer to the die itself and/or to a packaged memory product.

In low power implementations, the storage 1958 may be on-die memory or registers associated with the processor 1952. However, in some examples, the storage 1958 may be implemented using a micro hard disk drive (HDD). Further, any number of new technologies may be used for the storage 1958 in addition to, or instead of, the technologies described, such resistance change memories, phase change memories, holographic memories, or chemical memories, among others.

Computer program code for carrying out operations of the present disclosure (e.g., computational logic and/or instructions 1981, 1982, 1983) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code 1981, 1982, 1983 for carrying out operations of the present disclosure may also be written in any combination of the programming languages discussed herein. The program code may execute entirely on the system 1950, partly on the system 1950, as a stand-alone software package, partly on the system 1950 and partly on a remote computer or entirely on the remote computer or server. In the latter scenario, the remote computer may be connected to the system 1950 through any type of network, including a LAN or WAN, or the connection may be made to an external computer (e.g., through the Internet using an Internet Service Provider (ISP)).

In an example, the instructions 1981, 1982, 1983 on the processor circuitry 1952 (separately, or in combination with the instructions 1981, 1982, 1983) may configure execution or operation of a trusted execution environment (TEE) 1990. The TEE 1990 operates as a protected area accessible to the processor circuitry 1902 to enable secure access to data and secure execution of instructions. In some embodiments, the TEE 1990 may be a physical hardware device that is separate from other components of the system 1950 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

Additionally or alternatively, the TEE 1990 may be implemented as secure enclaves (or "enclaves"), which are isolated regions of code and/or data within the processor and/or memory/storage circuitry of the compute node 1950. Only code executed within a secure enclave may access data within the same secure enclave, and the secure enclave may only be accessible using the secure application (which may be implemented by an application processor or a tamper-resistant microcontroller). Various implementations of the TEE 1990, and an accompanying secure area in the processor circuitry 1952 or the memory circuitry 1954 and/or storage circuitry 1958 may be provided, for instance, through use of Intel® Software Guard Extensions (SGX), ARM® TrustZone®, Keystone Enclaves, Open Enclave SDK, and/or the like. Other aspects of security hardening, hardware roots-of-trust, and trusted or protected operations may be implemented in the device 1900 through the TEE 1990 and the processor circuitry 1952. Additionally or alternatively, the memory circuitry 1954 and/or storage circuitry 1958 may be divided into isolated user-space instances such as virtualization/OS containers, partitions, virtual environments (VEs), and/or the like. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 1904 and/or storage circuitry 1908 may be divided into one or more trusted memory regions for storing applications or software modules of the TEE 1990.

The OS stored by the memory circuitry 1954 and/or storage circuitry 1958 is software to control the compute node 1950. The OS may include one or more drivers that operate to control particular devices that are embedded in the compute node 1950, attached to the compute node 1950, and/or otherwise communicatively coupled with the compute node 1950. Example OSs include consumer-based operating systems (e.g., Microsoft® Windows® 10, Google® Android®, Apple® macOS®, Apple® iOS®, KaiOS™ provided by KaiOS Technologies Inc., Unix or a Unix-like OS such as Linux, Ubuntu, or the like), industry-focused OSs such as real-time OS (RTOS) (e.g., Apache® Mynewt, Windows® IoT®, Android Things®, Micrium® Micro-Controller OSs ("MicroC/OS" or "μC/OS"), VxWorks®, FreeRTOS, and/or the like), hypervisors (e.g., Xen® Hypervisor, Real-Time Systems® RTS Hypervisor, Wind River Hypervisor, VMWare® vSphere® Hypervisor, and/or the like), and/or the like. The OS can invoke alternate software to facilitate one or more functions and/or operations that are not native to the OS, such as particular communication protocols and/or interpreters. Additionally or alternatively, the OS instantiates various functionalities that are not native to the OS. In some examples, OSs include varying degrees of complexity and/or capabilities. In some examples, a first OS on a first compute node 1950 may be the same or different than a second OS on a second compute node 1950. For instance, the first OS may be an RTOS having particular performance expectations of responsivity to dynamic input conditions, and the second OS can include GUI capabilities to facilitate end-user I/O and the like.

The storage 1958 may include instructions 1983 in the form of software, firmware, or hardware commands to implement the techniques described herein. Although such instructions 1983 are shown as code blocks included in the memory 1954 and the storage 1958, any of the code blocks may be replaced with hardwired circuits, for example, built into an application specific integrated circuit (ASIC), FPGA memory blocks, and/or the like. In an example, the instructions 1981, 1982, 1983 provided via the memory 1954, the storage 1958, or the processor 1952 may be embodied as a non-transitory, machine-readable medium 1960 including code to direct the processor 1952 to perform electronic operations in the compute node 1950. The processor 1952 may access the non-transitory, machine-readable medium 1960 (also referred to as "computer readable medium 1960" or "CRM 1960") over the IX 1956. For instance, the non-transitory, CRM 1960 may be embodied by devices described for the storage 1958 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, CRM 1960 may include instructions to direct the processor 1952 to perform a specific sequence or flow of actions, for example, as described with respect to the flowchart(s) and/or block diagram(s) of operations and functionality depicted herein.

The compute node 1950 also includes clock circuitry 1992, which is a device (or collection of devices) that tracks the passage of time. In some implementations, the clock circuitry 1992 may be an atomic clock and/or a clock generator (electronic oscillator and/or timing-signal generator). In clock generator implementations, the clock circuitry 1992 may include resonant circuitry (e.g., crystal oscillator or the like) and amplifier circuitry to invert the signal from the resonant circuitry and feed a portion back into the resonant circuitry to maintain oscillation.

The crystal oscillator includes a piezoelectric resonator such as quartz, polycrystalline ceramics, thin-film resonators, and/or the like. Where crystal units are used, the clock circuitry 1992 may also include an oscillation circuit separate from the crystal clock. Where crystal oscillators are used, the crystal unit and oscillation circuit may be integrated into a single package or integrated circuit. Examples of such clock circuitry 1992 include crystal clocks (Y), crystal oscillators (XOs), calibrated dual XO (CDXO), microcomputer-compensated crystal oscillator (MCXO), oven controlled XOs (OCXOs), double OCXOs (DOCXOs), temperature-compensated crystal oscillator crystal oscillators (TCXOs), tactical miniature crystal oscillator (TMXO), temperature-sensing crystal oscillator (TSXO), voltage controlled XOs (VCXOs), and/or other suitable clocks and/or variants and/or combinations thereof. Any of the aforementioned crystal clocks and/or XOs may be formed from a suitable material such as quartz, rubidium (e.g., rubidium crystal oscillators (RbXO)), cesium (e.g., cesium beam atomic clocks), and/or other suitable materials and/or variants and/or combinations thereof.

The clock circuitry 1992 is configured to create a signal with a relatively precise frequency, which may be used by other components such as for example, keeping track of time, providing a clock signal for digital circuits, stabilizing frequencies for transmitters and receivers, and/or the like. In some implementations, the clock circuitry 1992 may be a stand-alone component (e.g., separate from the other components of compute node 1950), or may be part of another component (e.g., processor circuitry 1952 positioning circuitry 1975, and/or the like). Additionally or alternatively, the clock circuitry 1992 can be synchronized with a synchronization source. In one example, a timing indicated by GNSS signals (e.g., as provided by positioning circuitry 1975) can be used as a synchronization source in deployment scenarios where global synchronization is desired. Additionally or alternatively, a network time (or timing) can be used as a synchronization source in deployment scenarios where network-based synchronization is desired. Additionally or alternatively, a longwave radio clock or radio-controlled clock may be used as a synchronization source, where a dedicated terrestrial longwave radio transmitter connected to a time standard (e.g., an atomic clock) transmits a time code that is demodulated and decoded to determine the current time. Additionally or alternatively, a GM instance may be used as a synchronization source as described previously. Any combination of the previous synchronization sources may be used. Additionally or alternatively, any of the aforementioned synchronization sources as a primary synchronization source, and another one or more of the aforementioned synchronization sources can be used as secondary or fallback synchronization sources that is/are used when the primary synchronization source is unavailable. Additionally or alternatively, the clock circuitry 1992 may be configured with priority information for different synchronization sources, where each a highest priority synchronization source is used when available. The synchronization configuration may be signaled to, and provisioned in, the clock circuitry 1992 (via the communication circuitry).

The components of edge computing device 1950 may communicate over an interconnect (IX) 1956. The IX 1956 may represent any suitable type of connection or interface such as, for example, metal or metal alloys (e.g., copper, aluminum, and/or the like), fiber, and/or the like. The IX 1956 may include any number of IX, fabric, and/or interface technologies, including instruction set architecture (ISA), extended ISA (eISA), Inter-Integrated Circuit (I2C), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX technology, RapidIO™ IX, Coherent Accelerator Processor Interface (CAPI), OpenCAPI, cache coherent interconnect for accelerators (CCIX), Gen-Z Consortium IXs, Hyper-Transport IXs, NVLink provided by NVIDIA®, a Time-Trigger Protocol (TTP) system, a FlexRay system, PROFI-BUS, ARM® Advanced eXtensible Interface (AXI), ARM® Advanced Microcontroller Bus Architecture (AMBA) IX, HyperTransport, Infinity Fabric (IF), and/or any number of other IX technologies. The IX 1956 may be a proprietary bus, for example, used in a SoC based system.

The IX 1956 couples the processor 1952 to communication circuitry 1966 for communications with other devices, such as a remote server (not shown) and/or the connected edge devices 1962. The communication circuitry 1966 is a hardware element, or collection of hardware elements, used to communicate over one or more networks (e.g., cloud 1963) and/or with other devices (e.g., edge devices 1962). Communication circuitry 1966 includes modem circuitry 1966x may interface with application circuitry of compute node 1950 (e.g., a combination of processor circuitry 1902 and CRM 1960) for generation and processing of baseband signals and for controlling operations of the transceivers (TRx) 1966y and 1966z. The modem circuitry 1966x may handle various radio control functions that enable communication with one or more (R)ANs via the TRxs 1966y and 1966z according to one or more wireless communication protocols and/or RATs. The modem circuitry 1966x may include circuitry such as, but not limited to, one or more single-core or multi-core processors (e.g., one or more baseband processors) or control logic to process baseband signals received from a receive signal path of the TRxs 1966y, 1966z, and to generate baseband signals to be provided to the TRxs 1966y, 1966z via a transmit signal path. The modem circuitry 1966x may implement a real-time OS (RTOS) to manage resources of the modem circuitry 1966x, schedule tasks, perform the various radio control functions, process the transmit/receive signal paths, and the like. In some implementations, the modem circuitry 1966x includes a μarch that is capable of executing the μenclave implementations and techniques discussed herein.

The TRx 1966y may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1962. For example, a wireless local area network (WLAN) unit may be used to implement Wi-Fi® communications in accordance with a [IEEE802] standard (e.g., [IEEE80211] and/or the like). In addition, wireless wide area communications, e.g., according to a cellular or other wireless wide area protocol, may occur via a wireless wide area network (WWAN) unit.

The TRx 1966y (or multiple transceivers 1966y) may communicate using multiple standards or radios for communications at a different range. For example, the compute node 1950 may communicate with relatively close devices (e.g., within about 10 meters) using a local transceiver based on BLE, or another low power radio, to save power. More distant connected edge devices 1962 (e.g., within about 50 meters) may be reached over ZigBee® or other intermediate power radios. Both communications techniques may take place over a single radio at different power levels or may take place over separate transceivers, for example, a local transceiver using BLE and a separate mesh transceiver using ZigBee®.

A TRx 1966z (e.g., a radio transceiver) may be included to communicate with devices or services in the edge cloud 1963 via local or wide area network protocols. The TRx 1966z may be an LPWA transceiver that follows [IEEE802154] or IEEE 802.15.4g standards, among others. The edge computing node 1963 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used. Any number of other radio communications and protocols may be used in addition to the systems mentioned for the TRx 1966z, as described herein. For example, the TRx 1966z may include a cellular transceiver that uses spread spectrum (SPA/SAS) communications for implementing high-speed communications. Further, any number of other protocols may be used, such as WiFi® networks for medium speed communications and provision of network communications. The TRx 1966z may include radios that are compatible with any number of 3GPP specifications, such as LTE and 5G/NR communication systems.

A network interface controller (NIC) 1968 may be included to provide a wired communication to nodes of the edge cloud 1963 or to other devices, such as the connected edge devices 1962 (e.g., operating in a mesh, fog, and/or the like). The wired communication may provide an Ethernet connection (see e.g.,[IEEE802.3]) or may be based on other types of networks, such as Controller Area Network (CAN), Local Interconnect Network (LIN), DeviceNet, ControlNet, Data Highway+, or PROFINET, among many others. In some implementations, the NIC d68 may be an Ethernet controller (e.g., a Gigabit Ethernet Controller or the like), a SmartNIC, Intelligent Fabric Processor(s) (IFP(s)). An additional NIC 1968 may be included to enable connecting to a second network, for example, a first NIC 1968 providing communications to the cloud over Ethernet, and a second NIC 1968 providing communications to other devices over another type of network. In some implementations, the NIC 1968 may be or include the NIC architectures 400, 500 of FIGS. 4-6.

Given the variety of types of applicable communications from the device to another component or network, applicable communications circuitry used by the device may include or be embodied by any one or more of components 1964, 1966, 1968, or 1970. Accordingly, in various examples, applicable means for communicating (e.g., receiving, transmitting, and/or the like) may be embodied by such communications circuitry.

The compute node 1950 can include or be coupled to acceleration circuitry 1964, which may be embodied by one or more hardware accelerators, a neural compute stick, neuromorphic hardware, FPGAs, GPUs, SoCs (including programmable SoCs), vision processing units (VPUs), digital signal processors, dedicated ASICs, programmable ASICs, PLDs (e.g., CPLDs and/or HCPLDs), DPUs, IPUs, NPUs, and/or other forms of specialized processors or circuitry designed to accomplish one or more specialized tasks. Additionally or alternatively, the acceleration circuitry 1964 is embodied as one or more XPUs. In some implementations, an XPU is a multi-chip package including multiple chips stacked like tiles into an XPU, where the stack of chips includes any of the processor types discussed herein. Additionally or alternatively, an XPU is implemented by a heterogeneous computing system including multiple types of processor circuitry (e.g., one or more FPGAs, one or more CPUs, one or more GPUs, one or more DSPs, and/or the like, and/or a combination thereof) and application programming interface(s) (API(s)) that may assign computing task(s) to whichever one(s) of the multiple types of the processing circuitry is/are best suited to execute the computing task(s). In any of these implementations, the tasks may include AI/ML tasks (e.g., training, inferencing/prediction, classification, and the like), visual data processing, network data processing, infrastructure function management, object detection, rule analysis, or the like. In FPGA-based implementations, the acceleration circuitry 1964 may comprise logic blocks or logic fabric and other interconnected resources that may be programmed (configured) to perform various functions, such as the procedures, methods, functions, and/or the like discussed herein. In such implementations, the acceleration circuitry 1964 may also include memory cells (e.g., EPROM, EEPROM, flash memory, static memory (e.g., SRAM, anti-fuses, and/or the like) used to store logic blocks, logic fabric, data, and/or the like in LUTs and the like.

In some implementations, the acceleration circuitry 1964 and/or the processor circuitry 1952 can be or include may be a cluster of artificial intelligence (AI) GPUs, tensor processing units (TPUs) developed by Google® Inc., Real AI Processors (RAPs™) provided by AlphaICs®, Intel® Nervana™ Neural Network Processors (NNPs), Intel® Movidius™ Myriad™ X Vision Processing Units (VPUs), NVIDIA® PX™ based GPUs, the NM500 chip provided by General Vision®, Tesla® Hardware 3 processor, an Adapteva® Epiphany™ based processor, and/or the like. Additionally or alternatively, the acceleration circuitry 1964 and/or the processor circuitry 1952 can be implemented as AI accelerating co-processor(s), such as the Hexagon 685 DSP provided by Qualcomm®, the PowerVR 2NX Neural Net Accelerator (NNA) provided by Imagination Technologies Limited®, the Apple® Neural Engine core, a Neural Processing Unit (NPU) within the HiSilicon Kirin 970 provided by Huawei®, and/or the like.

The IX 1956 also couples the processor 1952 to an external interface 1970 that is used to connect additional devices or subsystems. In some implementations, the interface 1970 can include one or more input/output (I/O) controllers. Examples of such I/O controllers include integrated memory controller (IMC), memory management unit (MMU), input-output MMU (IOMMU), sensor hub, General Purpose I/O (GPIO) controller, PCIe endpoint (EP) device, direct media interface (DMI) controller, Intel® Flexible Display Interface (FDI) controller(s), VGA interface controller(s), Peripheral Component Interconnect Express (PCIe) controller(s), universal serial bus (USB) controller(s), eXtensible Host Controller Interface (xHCI) controller(s), Enhanced Host Controller Interface (EHCI) controller(s), Serial Peripheral Interface (SPI) controller(s), Direct Memory Access (DMA) controller(s), hard drive controllers (e.g., Serial AT Attachment (SATA) host bus adapters/controllers, Intel® Rapid Storage Technology (RST), and/or the like), Advanced Host Controller Interface (AHCI), a Low Pin Count (LPC) interface (bridge function), Advanced Programmable Interrupt Controller(s) (APIC), audio controller(s), SMBus host interface controller(s), UART controller(s), and/or the like. Some of these controllers may be part of, or otherwise applicable to the memory circuitry 1954, storage circuitry 1958, and/or IX 1956 as well. The additional/external devices may include sensors 1972, actuators 1974, and positioning circuitry 1945.

The sensor circuitry 1972 includes devices, modules, or subsystems whose purpose is to detect events or changes in its environment and send the information (sensor data) about the detected events to some other a device, module, subsystem, and/or the like. Examples of such sensors 1972 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors, including sensors for measuring the temperature of internal components and sensors for measuring temperature external to the compute node 1950); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 1974, allow platform 1950 to change its state, position, and/or orientation, or move or control a mechanism or system. The actuators 1974 comprise electrical and/or mechanical devices for moving or controlling a mechanism or system, and converts energy (e.g., electric current or moving air and/or liquid) into some kind of motion. The actuators 1974 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1974 may include one or more electromechanical devices such as pneumatic actuators, hydraulic actuators, electromechanical switches including electromechanical relays (EMRs), motors (e.g., DC motors, stepper motors, servomechanisms, and/or the like), power switches, valve actuators, wheels, thrusters, propellers, claws, clamps, hooks, audible sound generators, visual warning devices, and/or other like electromechanical components. The platform 1950 may be configured to operate one or more actuators 1974 based on one or more captured events and/or instructions or control signals received from a service provider and/or various client systems.

The positioning circuitry 1945 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), and/or the like), or the like. The positioning circuitry 1945 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the positioning circuitry 1945 may include a Micro-Technology for Positioning, Navigation, and Timing (Micro-PNT) IC that uses a master timing clock to perform position tracking/estimation without GNSS assistance. The positioning circuitry 1945 may also be part of, or interact with, the communication circuitry 1966 to communicate with the nodes and components of the positioning network. The positioning circuitry 1945 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 1945 is, or includes an INS, which is a system or device that uses sensor circuitry 1972 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the platform 1950 without the need for external references.

In some optional examples, various input/output (I/O) devices may be present within or connected to, the compute node 1950, which are referred to as input circuitry 1986 and output circuitry 1984 in FIG. 19. The input circuitry 1986 and output circuitry 1984 include one or more user interfaces designed to enable user interaction with the platform 1950 and/or peripheral component interfaces designed to enable peripheral component interaction with the platform 1950. Input circuitry 1986 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1984 may be included to show information or otherwise convey information, such as sensor readings, actuator position(s), or other like information. Data and/or graphics may be displayed on one or more user interface components of the output circuitry 1984. Output circuitry 1984 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, and/or the like), with the output of characters, graphics, multimedia objects, and the like being generated or produced from the operation of the platform 1950. The output circuitry 1984 may also include speakers or other audio emitting devices, printer(s), and/or the like. Additionally or alternatively, the sensor circuitry 1972 may be used as the input circuitry 1984 (e.g., an image capture device, motion capture device, or the like) and one or more actuators 1974 may be used as the output device circuitry 1984 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, and/or the like. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1976 may power the compute node 1950, although, in examples in which the compute node 1950 is mounted in a fixed location, it may have a power supply coupled to an electrical grid, or the battery may be used as a backup or for temporary capabilities. The battery 1976 may be a lithium ion battery, or a metal-air battery, such as a zinc-air battery, an aluminum-air battery, a lithium-air battery, and the like.

A battery monitor/charger 1978 may be included in the compute node 1950 to track the state of charge (SoCh) of the battery 1976, if included. The battery monitor/charger 1978 may be used to monitor other parameters of the battery 1976 to provide failure predictions, such as the state of health (SoH) and the state of function (SoF) of the battery 1976. The battery monitor/charger 1978 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1978 may communicate the information on the battery 1976 to the processor 1952 over the IX 1956. The battery monitor/charger 1978 may also include an analog-to-digital (ADC) converter that enables the processor 1952 to directly monitor the voltage of the battery 1976 or the current flow from the battery 1976. The battery parameters may be used to determine actions that the compute node 1950 may perform, such as transmission frequency, mesh network operation, sensing frequency, and the like.

A power block 1980, or other power supply coupled to a grid, may be coupled with the battery monitor/charger 1978 to charge the battery 1976. In some examples, the power block 1980 may be replaced with a wireless power receiver to obtain the power wirelessly, for example, through a loop antenna in the compute node 1950. A wireless battery charging circuit, such as an LTC4020 chip from Linear Technologies of Milpitas, California, among others, may be included in the battery monitor/charger 1978. The specific charging circuits may be selected based on the size of the battery 1976, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The example of FIG. 19 is intended to depict a high-level view of components of a varying device, subsystem, or arrangement of an edge computing node. However, in other implementations, some of the components shown may be omitted, additional components may be present, and a different arrangement of the components shown may occur in other implementations. Further, these arrangements are usable in a variety of use cases and environments, including those discussed below (e.g., a mobile device in industrial compute for smart city or smart factory, among many other examples).

3. Example Implementations

Additional examples of the presently described methods, devices, systems, and networks discussed herein include the following, non-limiting implementations. Each of the following non-limiting examples may stand on its own or may be combined in any permutation or combination with any one or more of the other examples provided below or throughout the present disclosure.

Example 1 includes a method of operating gate control logic of a network interface controller (NIC) for time-sensitive networking, wherein the NIC is connected to a host platform of a computing system, the method comprising: requesting or fetching, through a direct channel to a host memory of the host platform, a set of entries of a gate control list (GCL) to be stored in a GCL buffer on the NIC, wherein the GCL is stored in the host memory of the host platform; reading, from the GCL buffer, a subset of entries of the set of entries; controlling, during a gating cycle, individual gates of a set of gates to be opened according to the read subset of entries, wherein each gate of the set of gates is connected to a corresponding traffic class (TC) queue of a set of TC queues, each TC queue in the set of TC queues stores data to be transmitted based on a corresponding TC, and controlling the individual gates to be opened is to cause at least some of the data in the opened individual gates to be packetized for transmission over a communication link; and requesting or fetching, during the controlling, another set of entries in the GCL for storage in the GCL buffer.

Example 2 includes the method of example 1 and/or some other examples herein, wherein the method includes: parsing content of the read subset of entries to identify a subset of TC queues of the set of TC queues to be opened for the gating cycle; and requesting or fetching data from the host memory to be placed in the identified subset of TC queues.

Example 3 includes the method of example 2 and/or some other examples herein, wherein each TC queue in the set of TC queues corresponds to a transmission (Tx) queue in the host memory, and the requesting the data from the host memory includes: requesting or fetching the data from Tx queues in the host memory that correspond to each of the identified subset of TC queues.

Example 4 includes the method of examples 2-3 and/or some other examples herein, wherein requesting the data from the host memory includes: requesting or fetching the data from the host memory when a current time lapses a prefetch timer threshold with respect to a cycle start time of the gating cycle.

Example 5 includes the method of examples 1-4 and/or some other examples herein, wherein the requesting the other set of entries in the GCL includes: requesting or fetching the other set of entries in the GCL when a prefill buffer level threshold has been met or exceeded.

Example 6 includes the method of examples 1-5 and/or some other examples herein, wherein the method includes: requesting or fetching the other set of entries in the GCL when a buffer level threshold has been met or exceeded.

Example 7 includes the method of examples 1-6 and/or some other examples herein, wherein the controlling the individual gates includes: starting the controlling when a cycle start time occurs.

Example 8 includes the method of examples 1-7 and/or some other examples herein, wherein the GCL includes a first bank of entries and a second bank of entries, and the method includes creating the GCL, and creating the GCL includes: writing entries of the GCL directly into the host memory at a first base address of the first bank; enabling a first bank own bit corresponding to the first bank when the writing the entries into the first bank is completed; writing, during the controlling of the individual gates, the entries of the GCL into the host memory at a second base address of the second bank, wherein the subset of entries are fetched from the second bank during a next gating cycle; and enabling a second bank own bit corresponding to the second bank when the writing the entries into the second bank is completed.

Example 9 includes the method of example 8 and/or some other examples herein, wherein the NIC includes on-board memory circuitry, and the on-board memory circuitry includes a set of registers, wherein the set of registers includes a cycle start time register that includes the cycle start time.

Example 10 includes the method of example 9 and/or some other examples herein, wherein the set of registers includes a first bank base address register, a second bank base address register, the cycle start time register, a cycle time register, and a list length register, and the method includes: initializing the first bank base address register to include the first base address; initializing the second bank base address register to include the second base address; initializing the cycle start time register to include the cycle start time of the gating cycle; initializing the cycle time register to include a duration of the gating cycle; and initializing the list length register to include a number of entries of a currently enabled one of the first bank or the second bank.

Example 11 includes the method of examples 9-10 and/or some other examples herein, wherein the set of registers includes a bank own bit register, wherein the bank own bit register includes the first bank own bit and the second bank own bit.

Example 12 includes the method of examples 1-11 and/or some other examples herein, wherein the GCL buffer is implemented using on-board memory circuitry of the NIC.

Example 13 includes the method of examples 1-12 and/or some other examples herein, wherein the host platform of the computing system hosts a plurality of talker applications, and operates according to one or more of examples 15-28 and/or some other examples herein.

Example 14 includes the method of examples 1-13 and/or some other examples herein, wherein the NIC includes an energy efficient Ethernet (EEE) capability in a time-sensitive network (TSN), and operates according to one or more of examples 29-38 and/or some other examples herein.

Example 15 includes a method of operating a complex end station in a time-sensitive network (TSN), the method comprising: hosting a virtual bridge and a set of talker apps within the complex end station, wherein the virtual bridge is connected to each talker app of the set of talker apps via respective virtual links; receive, from a TSN management component, respective TSN configurations for each talker app of the set of talker apps; operating the virtual bridge to determine a platform-wide configuration based on the respective TSN configurations; and operating the virtual bridge to configure network interface circuitry based on the platform-wide configuration.

Example 16 includes the method of example 15 and/or some other examples herein, wherein the method includes: hosting a set of simple end station configuration apps corresponding to individual talker apps of the set of talker apps.

Example 17 includes the method of example 16 and/or some other examples herein, wherein the method includes operating respective simple end station configuration apps of the set of simple end station configuration apps to: querying a corresponding talker app of the set of talker apps for data path latency information of corresponding ones of the respective virtual links; and reporting the data path latency information as part of propagation delay information to the TSN management component via the virtual bridge.

Example 18 includes the method of example 17 and/or some other examples herein, wherein the respective TSN configurations for each talker app are based on the data path latency information of the corresponding ones of the respective virtual links.

Example 19 includes the method of example 18 and/or some other examples herein, wherein the respective TSN configurations for each talker app are based on both the data path latency information of the corresponding ones of the respective virtual links and a propagation delay of a physical link between the complex end station and the TSN management component.

Example 20 includes the method of examples 17-19 and/or some other examples herein, wherein each talker app of the set of talker apps includes a virtual port through which the corresponding ones of the respective virtual links is established with a virtual port of the virtual bridge.

Example 21 includes the method of example 20 and/or some other examples herein, wherein the virtual port of the virtual bridge corresponds to a physical port of the complex end station.

Example 22 includes the method of example 21 and/or some other examples herein, wherein the method includes: exposing one or more application programming interfaces (API) through the virtual port of the virtual bridge for discovery and configuration through the TSN management component.

Example 23 includes the method of examples 15-22 and/or some other examples herein, wherein the respective TSN configurations for each talker app includes a gate control list (GCL) for a physical link between the complex end station and the TSN management component, and respective GCLs for the respective virtual links.

Example 24 includes the method of example 23 and/or some other examples herein, wherein the platform-wide configuration includes one or more of a scheduling configuration, a set of operating system settings, and a network interface configuration.

Example 25 includes the method of examples 23-24 and/or some other examples herein, wherein the method includes: programming or provisioning the GCL for the physical link into network interface circuitry of the complex end station; and converting the GCLs for the respective virtual links into scheduling parameters, the scheduling parameters to be used for internal transfer of packets between respective talker apps of the set of talker apps and the network interface circuitry.

Example 26 includes the method of examples 15-25 and/or some other examples herein, wherein the TSN management component is a centralized user configuration station (CUC) or a centralized network configuration station (CNC)

Example 27 includes the method of examples 15-26 and/or some other examples herein, wherein the hosting the virtual bridge and the set of talker apps includes: hosting the virtual bridge and each talker app of the set of talker apps within respective virtualization containers or within respective virtual machines.

Example 28 includes the method of examples 15-27 and/or some other examples herein, wherein the method includes: operating the complex end station according to one or more of examples 1-13, 29-38 and/or some other examples herein.

Example 29 includes method of operating physical layer circuitry (PHY) of a station with an energy efficient Ethernet (EEE) capability in a time-sensitive network (TSN), the method comprising: triggering, when the PHY is in a sleep state, a wake-up process to enter a wake state by at most a first amount of time before a start of a scheduled slot during which to transmit TSN data, wherein the first amount of time is a minimum wake duration required by the PHY ($T_{phy\_wake}$); and inhibiting, when the PHY is in an active mode, transition to an low power idle (LPI) mode by at most a second amount of time before the start of a scheduled slot during which to transmit TSN data, wherein the second amount of time is based on a minimum sleep duration required by the PHY ($T_s$) and the $T_{phy\_wake}$.

Example 30 includes the method of example 29 and/or some other examples herein, wherein triggering the wakeup process includes one or both of: transmitting a wake signal for a predetermined period of time; and deasserting an LPI signal.

Example 31 includes the method of example 30 and/or some other examples herein, wherein inhibiting the transition to the LPI mode includes: asserting a force active signal to enforce the deassertion of the LPI signal.

Example 32 includes the method of example 31 and/or some other examples herein, wherein the method includes: identifying, from a configured gate control list (GCL), a subset of traffic class (TC) gates from among a set of TC gates that corresponding to TSN TCs; and asserting the force active signal $T_{phy\_wake}$ amount of time before assertion of gate control signals corresponding to the identified subset of TC gates.

Example 33 includes the method of example 32 and/or some other examples herein, wherein the method includes: asserting a sleep inhibit signal $T_s$ amount of time before assertion of the force active signal.

Example 34 includes the method of example 33 and/or some other examples herein, wherein the method includes: deasserting the sleep inhibit signal when the assertion of the force active signal is to take place.

Example 35 includes the method of example 34 and/or some other examples herein, wherein the method includes: asserting the force active signal for a duration of the scheduled slot during which to transmit TSN data.

Example 36 includes the method of example 35 and/or some other examples herein, wherein the method includes: deasserting the force active signal at an end of the scheduled slot during which to transmit TSN data.

Example 37 includes the method of examples 33-36 and/or some other examples herein, wherein the method includes: implementing a first pseudo-gate corresponding to the force active signal, wherein opening the first pseudo-gate is to cause the assertion of the force active signal; implementing a second pseudo-gate corresponding to the sleep inhibit signal, wherein opening the second pseudo-gate is to cause the assertion of the sleep inhibit signal; and programming the GCL with a pseudo-gate control pattern for opening and closing the first and second pseudo-gates according to the opening and closing of the identified subset of TC gates.

Example 38 includes the method of examples 29-37 and/or some other examples herein, wherein the PHY is the NIC of examples 1-13 and/or the station is the complex end station of examples 15-28 and/or some other examples herein.

Example 39 includes one or more computer readable media comprising instructions, wherein execution of the instructions by processor circuitry is to cause the processor circuitry to perform the method of examples 1-38 and/or some other examples herein. Example 40 includes a computer program comprising the instructions of example 39 and/or some other examples herein. Example 41 includes an Application Programming Interface defining functions, methods, variables, data structures, and/or protocols for the computer program of example 39 and/or some other examples herein. Example 42 includes an apparatus comprising circuitry loaded with the instructions of example 39 and/or some other examples herein. Example 43 includes an apparatus comprising circuitry operable to run the instructions of example 39 and/or some other examples herein. Example 44 includes an integrated circuit comprising one or more of the processor circuitry and the one or more computer readable media of example 39 and/or some other examples herein. Example 45 includes a computing system comprising the one or more computer readable media and the processor circuitry of example 39 and/or some other examples herein. Example 46 includes an apparatus comprising means for executing the instructions of example 39 and/or some other examples herein. Example 47 includes a signal generated as a result of executing the instructions of example 39 and/or some other examples herein. Example 48 includes a data unit generated as a result of executing the instructions of example 39 and/or some other examples herein. Example 49 includes the data unit of example 48 and/or some other examples herein, the data unit is a datagram, network packet, data frame, data segment, a Protocol Data Unit (PDU), a Service Data Unit (SDU), a message, or a database object. Example 50 includes a signal encoded with the data unit of examples 48-49 and/or some other examples herein. Example 53 includes an electromagnetic signal carrying the instructions of example 39 and/or some other examples herein. Example 52 includes an apparatus comprising means for performing the method of examples 1-38 and/or some other examples herein.

4. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," each of which may refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "establish" or "establishment" at least in some examples refers to (partial or in full) acts, tasks, operations, and/or the like, related to bringing or the readying the bringing of something into existence either actively or passively (e.g., exposing a device identity or entity identity). Additionally or alternatively, the term "establish" or "establishment" at least in some examples refers to (partial or in full) acts, tasks, operations, and/or the like, related to initiating, starting, or warming communication or initiating, starting, or warming a relationship between two entities or elements (e.g., establish a session, establish a session, and/or the like). Additionally or alternatively, the term "establish" or "establishment" at least in some examples refers to initiating something to a state of working readiness. The term "established" at least in some examples refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

The term "obtain" at least in some examples refers to (partial or in full) acts, tasks, operations, and/or the like, of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive a stream of packets (or the following parameters and templates or template values).

The term "receipt" at least in some examples refers to any action (or set of actions) involved with receiving or obtaining an object, data, data unit, and/or the like, and/or the fact of the object, data, data unit, and/or the like. being received. The term "receipt" at least in some examples refers to an object, data, data unit, and/or the like, being pushed to a device, system, element, and/or the like. (e.g., often referred to as a push model), pulled by a device, system, element, and/or the like. (e.g., often referred to as a pull model), and/or the like.

The term "element" at least in some examples refers to a unit that is indivisible at a given level of abstraction and has a clearly defined boundary, wherein an element may be any type of entity including, for example, one or more devices, systems, controllers, network elements, modules, and so forth, or combinations thereof.

The term "measurement" at least in some examples refers to the observation and/or quantification of attributes of an object, event, or phenomenon. Additionally or alternatively, the term "measurement" at least in some examples refers to a set of operations having the object of determining a measured value or measurement result, and/or the actual instance or execution of operations leading to a measured value.

The term "metric" at least in some examples refers to a standard definition of a quantity, produced in an assessment of performance and/or reliability of the network, which has an intended utility and is carefully specified to convey the exact meaning of a measured value.

The term "signal" at least in some examples refers to an observable change in a quality and/or quantity. Additionally or alternatively, the term "signal" at least in some examples refers to a function that conveys information about of an object, event, or phenomenon. Additionally or alternatively, the term "signal" at least in some examples refers to any time varying voltage, current, or electromagnetic wave that may or may not carry information. The term "digital signal" at least in some examples refers to a signal that is constructed from a discrete set of waveforms of a physical quantity so as to represent a sequence of discrete values.

The terms "ego" (as in, e.g., "ego device") and "subject" (as in, e.g., "data subject") at least in some examples refers to an entity, element, device, system, and/or the like, that is under consideration or being considered. The terms "neighbor" and "proximate" (as in, e.g., "proximate device") at least in some examples refers to an entity, element, device, system, and/or the like, other than an ego device or subject device.

The term "event" at least in some examples refers to a set of outcomes of an experiment (e.g., a subset of a sample space) to which a probability is assigned. Additionally or alternatively, the term "event" at least in some examples refers to a software message indicating that something has happened. Additionally or alternatively, the term "event" at least in some examples refers to an object in time, or an instantiation of a property in an object. Additionally or alternatively, the term "event" at least in some examples refers to a point in space at an instant in time (e.g., a location in space-time). Additionally or alternatively, the term "event" at least in some examples refers to a notable occurrence at a particular point in time.

The term "identifier" at least in some examples refers to a value, or a set of values, that uniquely identify an identity in a certain scope. Additionally or alternatively, the term "identifier" at least in some examples refers to a sequence of characters that identifies or otherwise indicates the identity of a unique object, element, or entity, or a unique class of objects, elements, or entities. Additionally or alternatively, the term "identifier" at least in some examples refers to a sequence of characters used to identify or refer to an application, program, session, object, element, entity, variable, set of data, and/or the like. The "sequence of characters" mentioned previously at least in some examples refers to one or more names, labels, words, numbers, letters, symbols, and/or any combination thereof. Additionally or alternatively, the term "identifier" at least in some examples refers to a name, address, label, distinguishing index, and/or attribute. Additionally or alternatively, the term "identifier" at least in some examples refers to an instance of identification. The term "persistent identifier" at least in some examples refers to an identifier that is reused by a device or by another device associated with the same person or group of persons for an indefinite period.

The term "identification" at least in some examples refers to a process of recognizing an identity as distinct from other identities in a particular scope or context, which may involve processing identifiers to reference an identity in an identity database.

The term "circuitry" at least in some examples refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an application-specific integrated circuit (ASIC), field-programmable gate array (FPGA), programmable logic controller (PLC), system on chip (SoC), system in package (SiP), multi-chip package (MCP), digital signal processor (DSP), and/or the like, that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" at least in some examples refers to, is part of, or includes circuitry capable of sequentially and automatically carrying out a sequence of arithmetic or logical operations, or recording, storing, and/or transferring digital data. The term "processor circuitry" at least in some examples refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some examples refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data. The terms "in-package memory" "on-chip memory", "on-die memory", or the like at least in some examples refers to a memory device or circuitry that is integrated in a same package, chip, or die as one or more other circuits or hardware elements.

The term "interface circuitry" at least in some examples refers to, is part of, or includes circuitry that enables the exchange of information between two or more components or devices. The term "interface circuitry" at least in some examples refers to one or more hardware interfaces, for example, buses, I/O interfaces, peripheral component interfaces, network interface cards, and/or the like.

The term "device" at least in some examples refers to a physical entity embedded inside, or attached to, another physical entity in its vicinity, with capabilities to convey digital information from or to that physical entity.

The term "entity" at least in some examples refers to a distinct component of an architecture or device, or information transferred as a payload.

The term "controller" at least in some examples refers to an element or entity that has the capability to affect a physical entity, such as by changing its state or causing the physical entity to move.

The term "terminal" at least in some examples refers to point at which a conductor from a component, device, or network comes to an end. Additionally or alternatively, the term "terminal" at least in some examples refers to an electrical connector acting as an interface to a conductor and creating a point where external circuits can be connected. In some examples, terminals may include electrical leads, electrical connectors, electrical connectors, solder cups or buckets, and/or the like.

The term "compute node" or "compute device" at least in some examples refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment, end consuming device, appliance, or the like.

The term "computer system" at least in some examples refers to any type interconnected electronic devices, computer devices, or components thereof. Additionally, the terms "computer system" and/or "system" at least in some examples refer to various components of a computer that are communicatively coupled with one another. Furthermore, the term "computer system" and/or "system" at least in some examples refer to multiple computer devices and/or multiple computing systems that are communicatively coupled with one another and configured to share computing and/or networking resources.

The term "platform" at least in some examples refers to an environment in which instructions, program code, software elements, and the like can be executed or otherwise operate, and examples of such an environment include an architecture (e.g., a motherboard, a computing system, and/or the like), one or more hardware elements (e.g., embedded systems, and the like), a cluster of compute nodes, a set of distributed compute nodes or network, an operating system, a virtual machine (VM), a virtualization container, a software framework, a client application (e.g., web browser or the like) and associated application programming interfaces, a cloud computing service (e.g., platform as a service (PaaS)), or other underlying software executed with instructions, program code, software elements, and the like.

The term "architecture" at least in some examples refers to a computer architecture or a network architecture. The term "computer architecture" at least in some examples refers to a physical and logical design or arrangement of software and/or hardware elements in a computing system or platform including technology standards for interacts therebetween. The term "network architecture" at least in some examples refers to a physical and logical design or arrangement of software and/or hardware elements in a network including communication protocols, interfaces, and media transmission.

The term "appliance," "computer appliance," and the like, at least in some examples refers to a computer device or computer system with program code (e.g., software or firmware) that is specifically designed to provide a specific computing resource. The term "virtual appliance" at least in some examples refers to a virtual machine image to be implemented by a hypervisor-equipped device that virtualizes or emulates a computer appliance or otherwise is dedicated to provide a specific computing resource. The term "security appliance", "firewall", and the like at least in some examples refers to a computer appliance designed to protect computer networks from unwanted traffic and/or malicious attacks. The term "policy appliance" at least in some examples refers to technical control and logging mechanisms to enforce or reconcile policy rules (information use rules) and to ensure accountability in information systems.

The term "gateway" at least in some examples refers to a network appliance that allows data to flow from one network to another network, or a computing system or application configured to perform such tasks. Examples of gateways include IP gateways, Internet-to-Orbit (I20) gateways, IoT gateways, cloud storage gateways, and/or the like.

The term "user equipment" or "UE" at least in some examples refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, and/or the like. Furthermore, the term "user equipment" or "UE" may include any type of wireless/wired device or any computing device including a wireless communications interface. Examples of UEs, client devices, and/or the like, include desktop computers, workstations, laptop computers, mobile data terminals, smartphones, tablet computers, wearable devices, machine-to-machine (M2M) devices, machine-type communication (MTC) devices, Internet of Things (IoT) devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, helmet-mounted display devices, augmented reality (AR) devices, virtual reality (VR) devices, mixed reality (MR) devices, and/or other like systems or devices.

The term "station" or "STA" at least in some examples refers to a logical entity that is a singly addressable instance of a medium access control (MAC) and physical layer (PHY) interface to the wireless medium (WM). The term "wireless medium" or WM" at least in some examples refers to the medium used to implement the transfer of protocol data units (PDUs) between peer physical layer (PHY) entities of a wireless local area network (LAN). The term "end station" or "end station" at least in some examples refers to a functional unit in an IEEE 802® network that acts as a source of, and/or destination for, link layer data traffic carried on or over a network.

The term "bridge" at least in some examples refers to a functional unit that interconnects two or more networks (e.g., one or more IEEE 802® networks and/or some other network(s) such as any of those discussed herein) that use the same data link layer (DLL) protocols above the MAC sublayer, but can use different MAC protocols. In some examples, forwarding and filtering decisions are made at a bridge on the basis of layer 2 (L2) information. Additionally or alternatively, the term "bridge" at least in some examples refers to a system that includes bridge component functionality (e.g., MAC, VLAN, and/or other bridge component functionality) and supports a claim of conformance to clause 5 of [IEEE802.1Q] for system behavior.

The term "network element" at least in some examples refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, network access node (NAN), base station, access point (AP), RAN device, RAN node, gateway, server, network appliance, network function (NF), virtualized NF (VNF), and/or the like.

The term "network access node" or "NAN" at least in some examples refers to a network element in a radio access network (RAN) responsible for the transmission and reception of radio signals in one or more cells or coverage areas to or from a UE or station. A "network access node" or "NAN" can have an integrated antenna or may be connected to an antenna array by feeder cables. Additionally or alternatively, a "network access node" or "NAN" may include specialized digital signal processing, network function hardware, and/or compute hardware to operate as a compute node. In some examples, a "network access node" or "NAN" may be split into multiple functional blocks operating in software for flexibility, cost, and performance. In some examples, a "network access node" or "NAN" may be a base station (e.g., an evolved Node B (eNB) or a next generation Node B (gNB)), an access point and/or wireless network access point, router, switch, hub, radio unit or remote radio head, Transmission Reception Point (TRxP), a gateway device (e.g., Residential Gateway, Wireline 5G Access Network, Wireline 5G Cable Access Network, Wireline BBF Access Network, and the like), network appliance, and/or some other network access hardware.

The term "access point" or "AP" at least in some examples refers to an entity that contains one station (STA) and provides access to the distribution services, via the wireless medium (WM) for associated STAs. An AP comprises a STA and a distribution system access function (DSAF).

The term "Residential Gateway" or "RG" at least in some examples refers to a device providing, for example, voice, data, broadcast video, video on demand, to other devices in customer premises. The term "Wireline 5G Access Network" or "W-SGAN" at least in some examples refers to a wireline AN that connects to a 5GC via N2 and N3 reference points. The W-SGAN can be either a W-SGBAN or W-SGCAN. The term "Wireline 5G Cable Access Network" or "W-SGCAN" at least in some examples refers to an Access Network defined in/by CableLabs. The term "Wireline BBF Access Network" or "W-5GBAN" at least in some examples refers to an Access Network defined in/by the Broadband Forum (BBF). The term "Wireline Access Gateway Function" or "W-AGF" at least in some examples refers to a Network function in W-5GAN that provides connectivity to a 3GPP 5G Core network (5GC) to 5G-RG and/or FN-RG. The term "5G-RG" at least in some examples refers to an RG capable of connecting to a 5GC playing the role of a user equipment with regard to the 5GC; it supports secure element and exchanges N1 signaling with 5GC. The 5G-RG can be either a 5G-BRG or 5G-CRG.

The term "edge computing" at least in some examples refers to a distributed computing framework that provides processing activities and resources (e.g., compute, storage, acceleration resources) at or towards the "edge" of a network. In some examples, edge computing implementations involve offering resources in cloud-like services, functions, applications, and subsystems, from one or multiple locations accessible via wireless networks.

The term "central office" or "CO" at least in some examples refers to an aggregation point for telecommunications infrastructure within an accessible or defined geographical area, often where telecommunication service providers have traditionally located switching equipment for one or multiple types of access networks.

The term "cloud computing" or "cloud" at least in some examples refers to a paradigm for enabling network access to a scalable and elastic pool of shareable computing resources with self-service provisioning and administration on-demand and without active management by users. Cloud computing provides cloud computing services and/or cloud services, which are one or more capabilities offered via cloud computing that are invoked using a defined interface (e.g., an API and/or the like). The term "cloud service provider" or "CSP" at least in some examples refers to an organization which operates typically large-scale "cloud" resources comprised of centralized, regional, and edge data centers (e.g., as used in the context of the public cloud). In other examples, a CSP may also be referred to as a "Cloud Service Operator" or "CSO". References to "cloud computing" generally refer to computing resources and services offered by a CSP or a CSO, at remote locations with at least some increased latency, distance, or constraints relative to edge computing. The term "data center" at least in some examples refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

The term "compute resource" or simply "resource" at least in some examples refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, and/or the like), operating systems, virtual machines (VMs), software/applications, computer files, and/or the like. A "hardware resource" at least in some examples refers to compute, storage, and/or network resources provided by physical hardware element(s). A "virtualized resource" at least in some examples refers to compute, storage, and/or network resources provided by virtualization infrastructure to an application, device, system, etc. The term "network resource" or "communication resource" at least in some examples refers to resources that are accessible by computer devices/systems via a communications network. The term "system resources" at least in some examples refers to any kind of shared entities to provide services, and may include computing and/or network resources. System resources may be considered as a set of coherent functions, network data objects or services, accessible through a server where such system resources reside on a single host or multiple hosts and are clearly identifiable.

The term "network function" or "NF" at least in some examples refers to a functional block within a network infrastructure that has one or more external interfaces and a defined functional behavior. The term "network service" or "NS" at least in some examples refers to a composition of Network Function(s) and/or Network Service(s), defined by its functional and behavioral specification(s).The term "network function virtualization" or "NFV" at least in some examples refers to the principle of separating network functions from the hardware they run on by using virtualization techniques and/or virtualization technologies. The term "virtualized network function" or "VNF" at least in some examples refers to an implementation of an NF that can be deployed on a Network Function Virtualization Infrastructure (NFVI). The term "Network Functions Virtualization Infrastructure Manager" or "NFVI" at least in some examples refers to a totality of all hardware and software components that build up the environment in which VNFs are deployed. The term "management function" at least in some examples refers to a logical entity playing the roles of a service consumer and/or a service producer. The term "management service" at least in some examples refers to a set of offered management capabilities. The term "Virtualized Infrastructure Manager" or "VIM" at least in some examples refers to a functional block that is responsible for controlling and managing the NFVI compute, storage and network resources, usually within one operator's infrastructure domain.

The term "slice" at least in some examples refers to a set of characteristics and behaviors that separate one instance, traffic, data flow, application, application instance, link or connection, RAT, device, system, entity, element, etc. from another instance, traffic, data flow, application, application instance, link or connection, RAT, device, system, entity, element, etc., or separate one type of instance, etc., from another instance, and/or the like. The term "network slice" at least in some examples refers to a logical network that provides specific network capabilities and network characteristics and/or supports various service properties for network slice service consumers. Additionally or alternatively, the term "network slice" at least in some examples refers to a logical network topology connecting a number of endpoints using a set of shared or dedicated network resources that are used to satisfy specific service level objectives (SLOs) and/or service level agreements (SLAs). The term "network slicing" at least in some examples refers to methods, processes, techniques, and technologies used to create one or multiple unique logical and virtualized networks over a common multi-domain infrastructure. The term "access network slice", "radio access network slice", or "RAN slice" at least in some examples refers to a part of a network slice that provides resources in a RAN to fulfill one or more application and/or service requirements (e.g., SLAs, and/or the like). The term "network slice instance" at least in some examples refers to a set of Network Function instances and the required resources (e.g. compute, storage and networking resources) which form a deployed network slice. Additionally or alternatively, the term "network slice instance" at least in some examples refers to a representation of a service view of a network slice. The term "network instance" at least in some examples refers to information identifying a domain.

The term "service consumer" at least in some examples refers to an entity that consumes one or more services. The term "service producer" at least in some examples refers to an entity that offers, serves, or otherwise provides one or more services. The term "service provider" at least in some examples refers to an organization or entity that provides one or more services to at least one service consumer. For purposes of the present disclosure, the terms "service provider" and "service producer" may be used interchangeably even though these terms may refer to difference concepts. Examples of service providers include cloud service provider (CSP), network service provider (NSP), application service provider (ASP) (e.g., Application software service provider in a service-oriented architecture (ASSP)), internet service provider (ISP), telecommunications service provider (TSP), online service provider (OSP), payment service provider (PSP), managed service provider (MSP), storage service providers (SSPs), SAML service provider, and/or the like. At least in some examples, SLAs may specify, for example, particular aspects of the service to be provided including quality, availability, responsibilities, metrics by which service is measured, as well as remedies or penalties should agreed-on service levels not be achieved. The term "SAML service provider" at least in some examples refers to a system and/or entity that receives and accepts authentication assertions in conjunction with a single sign-on (SSO) profile of the Security Assertion Markup Language (SAML) and/or some other security mechanism(s).

The term "virtualization container", "execution container", or "container" at least in some examples refers to a partition of a compute node that provides an isolated virtualized computation environment. The term "OS container" at least in some examples refers to a virtualization container utilizing a shared Operating System (OS) kernel of its host, where the host providing the shared OS kernel can be a physical compute node or another virtualization container. Additionally or alternatively, the term "container" at least in some examples refers to a standard unit of software (or a package) including code and its relevant dependencies, and/or an abstraction at the application layer that packages code and dependencies together. Additionally or alternatively, the term "container" or "container image" at least in some examples refers to a lightweight, standalone, executable software package that includes everything needed to run an application such as, for example, code, runtime environment, system tools, system libraries, and settings.

The term "virtual machine" or "VM" at least in some examples refers to a virtualized computation environment that behaves in a same or similar manner as a physical computer and/or a server. The term "hypervisor" at least in some examples refers to a software element that partitions the underlying physical resources of a compute node, creates VMs, manages resources for VMs, and isolates individual VMs from each other.

The term "edge compute node" or "edge compute device" at least in some examples refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Additionally or alternatively, the term "edge compute node" at least in some examples refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "cluster" at least in some examples refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "Internet of Things" or "IoT" at least in some examples refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smarthome, smart building and/or smart city technologies), and the like. IoT devices are usually low-power devices without heavy compute or storage capabilities. The term "Edge IoT devices" at least in some examples refers to any kind of IoT devices deployed at a network's edge.

The term "protocol" at least in some examples refers to a predefined procedure or method of performing one or more operations. Additionally or alternatively, the term "protocol" at least in some examples refers to a common means for unrelated objects to communicate with each other (sometimes also called interfaces). Additionally or alternatively, the term "protocol" at least in some examples refers to a set of rules and formats that determines the communication behavior of layer entities in the performance of the layer functions.

The term "communication protocol" at least in some examples refers to a set of standardized rules or instructions implemented by a communication device and/or system to communicate with other devices and/or systems, including instructions for packetizing/depacketizing data, modulating/demodulating signals, implementation of protocols stacks, and/or the like. In various implementations, a "protocol" and/or a "communication protocol" may be represented using a protocol stack, a finite state machine (FSM), and/or any other suitable data structure. The term "standard protocol" at least in some examples refers to a protocol whose specification is published and known to the public and is controlled by a standards body. The term "protocol stack" or "network stack" at least in some examples refers to an implementation of a protocol suite or protocol family. In various implementations, a protocol stack includes a set of protocol layers, where the lowest protocol deals with low-level interaction with hardware and/or communications interfaces and each higher layer adds additional capabilities.

The term "application layer" at least in some examples refers to an abstraction layer that specifies shared communications protocols and interfaces used by hosts in a communications network. Additionally or alternatively, the term "application layer" at least in some examples refers to an abstraction layer that interacts with software applications that implement a communicating component, and may include identifying communication partners, determining resource availability, and synchronizing communication. Examples of application layer protocols include HTTP, HTTPs, File Transfer Protocol (FTP), Dynamic Host Configuration Protocol (DHCP), Internet Message Access Protocol (IMAP), Lightweight Directory Access Protocol (LDAP), MQTT, Remote Authentication Dial-In User Service (RADIUS), Diameter protocol, Extensible Authentication Protocol (EAP), RDMA over Converged Ethernet version 2 (RoCEv2), Real-time Transport Protocol (RTP), RTP Control Protocol (RTCP), Real Time Streaming Protocol (RTSP), Skinny Client Control Protocol (SCCP), Session Initiation Protocol (SIP), Session Description Protocol (SDP), Simple Mail Transfer Protocol (SMTP), Simple Network Management Protocol (SNMP), Simple Service Discovery Protocol (SSDP), Small Computer System Interface (SCSI), Internet SCSI (iSCSI), iSCSI Extensions for RDMA (iSER), Transport Layer Security (TLS), voice over IP (VoIP), Virtual Private Network (VPN), Extensible Messaging and Presence Protocol (XMPP), and/or the like.

The term "session layer" at least in some examples refers to an abstraction layer that controls dialogues and/or connections between entities or elements, and may include establishing, managing and terminating the connections between the entities or elements.

The term "transport layer" at least in some examples refers to a protocol layer that provides end-to-end (e2e) communication services such as, for example, connection-oriented communication, reliability, flow control, and multiplexing. Examples of transport layer protocols include datagram congestion control protocol (DCCP), fibre channel protocol (FBC), Generic Routing Encapsulation (GRE), GPRS Tunneling (GTP), Micro Transport Protocol (μTP), Multipath TCP (MPTCP), MultiPath QUIC (MPQUIC), Multipath UDP (MPUDP), Quick UDP Internet Connections (QUIC), Remote Direct Memory Access (RDMA), Resource Reservation Protocol (RSVP), Stream Control Transmission Protocol (SCTP), transmission control protocol (TCP), user datagram protocol (UDP), and/or the like.

The term "network layer" at least in some examples refers to a protocol layer that includes means for transferring network packets from a source to a destination via one or more networks. Additionally or alternatively, the term "network layer" at least in some examples refers to a protocol layer that is responsible for packet forwarding and/or routing through intermediary nodes. Additionally or alternatively, the term "network layer" or "internet layer" at least in some examples refers to a protocol layer that includes interworking methods, protocols, and specifications that are used to transport network packets across a network. As examples, the network layer protocols include internet protocol (IP), IP security (IPsec), Internet Control Message Protocol (ICMP), Internet Group Management Protocol (IGMP), Open Shortest Path First protocol (OSPF), Routing Information Protocol (RIP), RDMA over Converged Ethernet version 2 (RoCEv2), Subnetwork Access Protocol (SNAP), and/or some other internet or network protocol layer.

The term "link layer" or "data link layer" at least in some examples refers to a protocol layer that transfers data between nodes on a network segment across a physical layer. Examples of link layer protocols include logical link control (LLC), medium access control (MAC), Ethernet, RDMA over Converged Ethernet version 1 (RoCEv1), and/or the like.

The term "medium access control", "MAC", "MAC layer", or "MAC protocol" at least in some examples refers to a protocol that governs access to the transmission medium in a network, to enable the exchange of data between stations in a network. Additionally or alternatively, the term "medium access control", "MAC", "MAC layer", or "MAC protocol" at least in some examples refers to a data link sublayer that is responsible for transferring data to and from the physical layer. Additionally or alternatively, the term "medium access control layer", "MAC layer", or "MAC" at least in some examples refers to a protocol layer or sublayer that performs functions to provide frame-based, connectionless-mode (e.g., datagram style) data transfer between stations or devices. Additionally or alternatively, the term "medium access control layer", "MAC layer", or "MAC" at least in some examples refers to a protocol layer or sublayer that performs mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per cell in case of CA); priority handling between UEs by means of dynamic scheduling; priority handling between logical channels of one UE by means of logical channel prioritization; priority handling between overlapping resources of one UE; and/or padding (see e.g., [IEEE802], [IEEE802.3], [IEEE802111], 3GPP TS 38.321 v17.0.0 (2022-04-14) and 3GPP TS 36.321 v17.0.0 (2022-04-19) (collectively referred to as "[MAC]")). The term "express Media Access Control" or "eMAC" at least in some examples refers to an instance of a MAC sublayer (see e.g., [IEEE802.3], Annex 4A) that is the client of a MAC merge sublayer service interface that handles express traffic (see e.g., [IEEE802.3], clause 99).

The term "physical layer", "PHY layer", or "PHY" at least in some examples refers to a protocol layer or sublayer that includes capabilities to transmit and receive modulated signals for communicating in a communications network (see e.g., [IEEE802], [IEEE802.3], [IEEE80211], 3GPP TS 38.201 v17.0.0 (2022-01-05) and 3GPP TS 36.201 v17.0.0 (2022-03-31)).

The term "radio technology" at least in some examples refers to technology for wireless transmission and/or reception of electromagnetic radiation for information transfer. The term "radio access technology" or "RAT" at least in some examples refers to the technology used for the underlying physical connection to a radio based communication network. The term "RAT type" at least in some examples may identify a transmission technology and/or communication protocol used in an access network, for example, new radio (NR), Long Term Evolution (LTE), narrowband IoT (NB-IOT), untrusted non-3GPP, trusted non-3GPP, trusted Institute of Electrical and Electronics Engineers (IEEE) 802 (e.g., *IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications*, IEEE Std 802.11-2020, pp. 1-4379 (26 Feb. 2021) ("[IEEE80211]"), *IEEE Standard for Local and Metropolitan Area Networks: Overview and Architecture*, IEEE Std 802-2014, pp. 1-74 (30 Jun. 2014) ("[IEEE802]"), *IEEE Standard for Local and Metropolitan Area Network—Bridges and Bridged Networks*, IEEE Std 802.1Q-2018, pp. 1-1993 (6 Jul. 2018) ("[IEEE802.1Q]"), the contents of which is hereby incorporated by reference in its entirety), non-3GPP access, MuLTEfire, WiMAX, wireline, wireline-cable, wireline broadband forum (wireline-BBF), and the like. Examples of RATs and/or wireless communications protocols include Advanced Mobile Phone System (AMPS) technologies such as Digital AMPS (D-AMPS), Total Access Communication System (TACS) (and variants thereof such as Extended TACS (ETACS), and/or the like); Global System for Mobile Communications (GSM) technologies such as Circuit Switched Data (CSD), High-Speed CSD (HSCSD), General Packet Radio Service (GPRS), and Enhanced Data Rates for GSM Evolution (EDGE); Third Generation Partnership Project (3GPP) technologies including, for example, Universal Mobile Telecommunications System (UMTS) (and variants thereof such as UMTS Terrestrial Radio Access (UTRA), Wideband Code Division Multiple Access (W-CDMA), Freedom of Multimedia Access (FOMA), Time Division-Code Division Multiple Access (TD-CDMA), Time Division-Synchronous Code Division Multiple Access (TD-SCDMA), and/or the like), Generic Access Network (GAN)/Unlicensed Mobile Access (UMA), High Speed Packet Access (HSPA) (and variants thereof such as HSPA Plus (HSPA+), and/or the like), Long Term Evolution (LTE) (and variants thereof such as LTE-Advanced (LTE-A), Evolved UTRA (E-UTRA), LTE Extra, LTE-A Pro, LTE LAA, MuLTEfire, and/or the like), Fifth Generation (5G) or New Radio (NR), etc.; ETSI technologies such as High Performance Radio Metropolitan Area Network (HiperMAN) and the like; IEEE technologies such as [IEEE802] and/or WiFi (e.g., [IEEE80211] and variants thereof), Worldwide Interoperability for Microwave Access (WiMAX) (see e.g., *IEEE Standard for Air Interface for Broadband Wireless Access Systems, IEEE Std* 802.16-2017, pp. 1-2726 (2 Mar. 2018) ("[WiMAX]") and variants thereof), Mobile Broadband Wireless Access (MBWA)/iBurst (e.g., IEEE 802.20 and variants thereof), etc.; Integrated Digital Enhanced Network (iDEN) (and variants thereof such as Wideband Integrated Digital Enhanced Network (WiDEN); millimeter wave (mmWave) technologies/standards (e.g., wireless systems operating at 10-300 GHz and above such as 3GPP 5G, Wireless Gigabit Alliance (WiGig) standards (e.g., IEEE 802.11ad, IEEE 802.11ay, and the like); short-range and/or wireless personal area network (WPAN) technologies/standards such as Bluetooth (and variants thereof such as Bluetooth 5.3, Bluetooth Low Energy (BLE), and/or the like), IEEE 802.15 technologies/standards (e.g., IEEE Standard for Low-Rate Wireless Networks, IEEE Std 802.15.4-2020, pp. 1-800 (23 Jul. 2020) ("[IEEE802154]"), ZigBee, Thread, IPv6 over Low power WPAN (6LoWPAN), WirelessHART, MiWi, ISA100.11a, IEEE Standard for Local and metropolitan area networks—Part 15.6: Wireless Body Area Networks, IEEE Std 802.15.6-2012, pp. 1-271 (29 Feb. 2012), WiFi-direct, ANT/ANT+, Z-Wave, 3GPP Proximity Services (ProSe), Universal Plug and Play (UPnP), low power Wide Area Networks (LPWANs), Long Range Wide Area Network (LoRA or LoRaWAN™), and the like; optical and/or visible light communication (VLC) technologies/standards such as IEEE Standard for Local and metropolitan area networks—Part 15.7: Short-Range Optical Wireless Communications, IEEE Std 802.15.7-2018, pp. 1-407 (23 April 2019), and the like; V2X communication including 3GPP cellular V2X (C-V2X), *IEEE Guide for Wireless Access in Vehicular Environments (WAVE) Architecture*, IEEE STANDARDS ASSOCIATION, IEEE 1609.0-2019 (10 Apr. 2019) ("[IEEE160901]"), *V2X Communications Message Set Dictionary*, SAE INT'L (23 Jul. 2020) ("[J2735_2020071]"), *Wireless Access in Vehicular Environments (WAVE) (IEEE Standard for Information technology—Local and metropolitan area networks—Specific requirements—Part 11: Wireless LAN Medium Access Control (MAC) and Physical Layer (PHY) Specifications Amendment 6: Wireless Access in Vehicular Environments*, IEEE Std 802.11p-2010, pp. 1-51 (15 Jul. 2010) ("[IEEE80211p]"), which is now part of [IEEE80211]), IEEE 802.11bd (e.g., for vehicular ad-hoc environments), Dedicated Short Range Communications (DSRC), Intelligent-Transport-Systems (ITS) (including the European ITS-G5, ITS-G5B, ITS-G5C, ITS-G5, and the like); Sigfox; Mobitex; 3GPP2 technologies such as cdmaOne (2G), Code Division Multiple Access 2000 (CDMA 2000), and Evolution-Data Optimized or Evolution-Data Only (EV-DO); Push-to-talk (PTT), Mobile Telephone System (MTS) (and variants thereof such as Improved MTS (IMTS), Advanced MTS (AMTS), and/or the like); Personal Digital Cellular (PDC); Personal Handy-phone System (PHS), Cellular Digital Packet Data (CDPD); Cellular Digital Packet Data (CDPD); DataTAC; Digital Enhanced Cordless Telecommunications (DECT) (and variants thereof such as DECT Ultra Low Energy (DECT ULE), DECT-2020, DECT-5G, and/or the like); Ultra High Frequency (UHF) communication; Very High Frequency (VHF) communication; and/or any other suitable RAT or protocol. In addition to the aforementioned RATs/standards, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "channel" at least in some examples refers to any transmission medium, either tangible or intangible, which is used to communicate data or a data stream. Additionally or alternatively, the term "channel" at least in some examples refers to a frequency spectrum occupied by a signal, which may be specified by center frequency and bandwidth parameters. In some examples, the term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some examples refers to a connection between two devices through a RAT for the purpose of transmitting and receiving information.

The term "local area network" or "LAN" at least in some examples refers to a network of devices, whether indoors or outdoors, covering a limited area or a relatively small geographic area (e.g., within a building or a campus). The term "wireless local area network", "wireless LAN", or "WLAN" at least in some examples refers to a LAN that involves wireless communications. The term "virtual local area network" or "VLAN" at least in some examples refers to a subset of the LANs of an IEEE 802.1 Bridged Network to which a VLAN Identifier (VLAN ID) is assigned. The term "wide area network" or "WAN" at least in some examples refers to a network of devices that extends over a relatively large geographic area (e.g., a telecommunications network). Additionally or alternatively, the term "wide area network" or "WAN" at least in some examples refers to a computer network spanning regions, countries, or even an entire planet. The term "metropolitan area network" or "MAN" at least in some examples refers to a network of devices extending over a large geographical area such as an urban area, often providing integrated communication services such as data, voice, and video. The term "regional area network" or "RAN" at least in some examples refers to a network of devices that generally covers a service area that is larger than metropolitan area networks (MANs), typically in sparsely populated area. The term "IEEE 802® network" at least in some examples refers to a network including one or more interconnected networks each using a MAC protocol specified in an IEEE 802 standard. The term "backbone network", "backbone", "core network", or "core" at least in some examples refers to a computer network which interconnects networks, providing a path for the exchange of information between different subnetworks such as LANs or WANs. In some examples, the term "backbone network" may be synonymous with the term "core network."

The term "interconnection" at least in some examples refers to a data communication path between stations in one or more networks (e.g., IEEE 802 networks and/or some other network types such as any of those discussed herein. The term "interworking" at least in some examples refers to the use of interconnected stations in a network for the exchange of data by means of protocols operating over the underlying data transmission paths.

The term "flow" at least in some examples refers to a sequence of data and/or data units (e.g., datagrams, data units, packets, and/or the like) from a source entity/element to a destination entity/element. Additionally or alternatively, the term "flow" at least in some examples refers to a stream of packets used to transport data of a certain priority from a source to a sink. Additionally or alternatively, the terms "flow" or "traffic flow" at least in some examples refer to an artificial and/or logical equivalent to a call, connection, or link. Additionally or alternatively, the terms "flow" or "traffic flow" at least in some examples refer to a sequence of packets sent from a particular source to a particular unicast, anycast, or multicast destination that the source desires to label as a flow; from an upper-layer viewpoint, a flow may include of all packets in a specific transport connection or a media stream, however, a flow is not necessarily 1:1 mapped to a transport connection. Additionally or alternatively, the terms "flow" or "traffic flow" at least in some examples refer to a set of data and/or data units (e.g., datagrams, packets, or the like) passing an observation point in a network during a certain time interval. Additionally or alternatively, the term "flow" at least in some examples refers to a user plane data link that is attached to an association. Examples are circuit switched phone call, voice over IP call, reception of an SMS, sending of a contact card, PDP context for internet access, demultiplexing a TV channel from a channel multiplex, calculation of position coordinates from geopositioning satellite signals, etc. For purposes of the present disclosure, the terms "traffic flow", "data flow", "dataflow", "packet flow", "network flow", and/or "flow" may be used interchangeably even though these terms at least in some examples refers to different concepts. The term "dataflow" or "data flow" at least in some examples refers to the movement of data through a system including software elements, hardware elements, or a combination of both software and hardware elements. Additionally or alternatively, the term "dataflow" or "data flow" at least in some examples refers to a path taken by a set of data from an origination or source to destination that includes all nodes through which the set of data travels.

The term "stream" at least in some examples refers to a sequence of data elements made available over time. At least in some examples, functions that operate on a stream, which may produce another stream, are referred to as "filters," and can be connected in pipelines, analogously to function composition; filters may operate on one item of a stream at a time, or may base an item of output on multiple items of input, such as a moving average. Additionally or alternatively, the term "stream" or "streaming" at least in some examples refers to a manner of processing in which an object is not represented by a complete logical data structure of nodes occupying memory proportional to a size of that object, but are processed "on the fly" as a sequence of events. Additionally or alternatively, the term "filter" or "filtering" at least in some examples refers to a function in a bridge or other network element that is used to determine if a received MAC frame is to be forwarded or discarded on any given outbound port. Additionally or alternatively, the term "stream" at least in some examples refers to a unidirectional flow of data (e.g., audio and/or video) from a "talker" to one or more "listeners".

The term "distributed computing" at least in some examples refers to computation resources that are geographically distributed within the vicinity of one or more localized networks' terminations. The term "distributed computations" at least in some examples refers to a model in which components located on networked computers communicate and coordinate their actions by passing messages interacting with each other in order to achieve a common goal.

The term "service" at least in some examples refers to the provision of a discrete function within a system and/or environment. Additionally or alternatively, the term "service" at least in some examples refers to a functionality or a set of functionalities that can be reused. The term "microservice" at least in some examples refers to one or more processes that communicate over a network to fulfil a goal using technology-agnostic protocols (e.g., HTTP or the like). Additionally or alternatively, the term "microservice" at least in some examples refers to services that are relatively small in size, messaging-enabled, bounded by contexts, autonomously developed, independently deployable, decentralized, and/or built and released with automated processes. Additionally or alternatively, the term "microservice" at least in some examples refers to a self-contained piece of functionality with clear interfaces, and may implement a layered architecture through its own internal components. Additionally or alternatively, the term "microservice architecture" at least in some examples refers to a variant of the service-oriented architecture (SOA) structural style wherein applications are arranged as a collection of loosely-coupled services (e.g., fine-grained services) and may use lightweight protocols. The term "network service" at least in some examples refers to a composition of Network Function(s) and/or Network Service(s), defined by its functional and behavioral specification.

The term "session" at least in some examples refers to a temporary and interactive information interchange between two or more communicating devices, two or more application instances, between a computer and user, and/or between any two or more entities or elements. Additionally or alternatively, the term "session" at least in some examples refers to a connectivity service or other service that provides or enables the exchange of data between two entities or elements. The term "network session" at least in some examples refers to a session between two or more communicating devices over a network. The term "web session" at least in some examples refers to session between two or more communicating devices over the Internet or some other network. The term "session identifier," "session ID," or "session token" at least in some examples refers to a piece of data that is used in network communications to identify a session and/or a series of message exchanges. An example session ID includes a L2TPv3 session ID, which indicates the type of upstream frame according to DOCSIS MAC protocol specifications.

The term "quality" at least in some examples refers to a property, character, attribute, or feature of something as being affirmative or negative, and/or a degree of excellence of something. Additionally or alternatively, the term "quality" at least in some examples, in the context of data processing, refers to a state of qualitative and/or quantitative aspects of data, processes, and/or some other aspects of data processing systems. The term "Quality of Service" or "QoS" at least in some examples refers to a description or measurement of the overall performance of a service (e.g., telephony and/or cellular service, network service, wireless communication/connectivity service, cloud computing service, and/or the like). In some cases, the QoS may be described or measured from the perspective of the users of that service, and as such, QoS may be the collective effect of service performance that determine the degree of satisfaction of a user of that service. In other cases, QoS at least in some examples refers to traffic prioritization and resource reservation control mechanisms rather than the achieved perception of service quality. In these cases, QoS is the ability to provide different priorities to different applications, users, or flows, or to guarantee a certain level of performance to a flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein. Additionally or alternatively, the term "Quality of Service" or "QoS' at least in some examples refers to mechanisms that provide traffic-forwarding treatment based on flow-specific traffic classification. In some implementations, the term "Quality of Service" or "QoS" can be used interchangeably with the term "Class of Service" or "CoS". The term "Class of Service" or "CoS' at least in some examples refers to mechanisms that provide traffic-forwarding treatment based on non-flow-specific traffic classification. In some implementations, the term "Class of Service" or "CoS" can be used interchangeably with the term "Quality of Service" or "QoS". The term "QoS flow" at least in some examples refers to the finest granularity for QoS forwarding treatment in a network. The term "5G QoS flow' at least in some examples refers to the finest granularity for QoS forwarding treatment in a 5G System (5GS). Traffic mapped to the same QoS flow (or 5G QoS flow) receive the same forwarding treatment. The term "QoS Identifier" at least in some examples refers to a scalar that is used as a reference to a specific QoS forwarding behavior (e.g., packet loss rate, packet delay budget, and/or the like) to be provided to a QoS flow. This may be implemented in an access network by referencing node specific parameters that control the QoS forwarding treatment (e.g., scheduling weights, admission thresholds, queue management thresholds, link layer protocol configuration, and/or the like).

The term "queue" at least in some examples refers to a collection of entities (e.g., data, objects, events, and/or the like) are stored and held to be processed later. that are maintained in a sequence and can be modified by the addition of entities at one end of the sequence and the removal of entities from the other end of the sequence; the end of the sequence at which elements are added may be referred to as the "back", "tail", or "rear" of the queue, and the end at which elements are removed may be referred to as the "head" or "front" of the queue. Additionally, a queue may perform the function of a buffer, and the terms "queue" and "buffer" may be used interchangeably throughout the present disclosure. The term "enqueue" at least in some examples refers to one or more operations of adding an element to the rear of a queue. The term "dequeue" at least in some examples refers to one or more operations of removing an element from the front of a queue.

The term "reliability" at least in some examples refers to the ability of a computer-related component (e.g., software, hardware, or network element/entity) to consistently perform a desired function and/or operate according to a specification. Reliability in the context of network communications (e.g., "network reliability") at least in some examples refers to the ability of a network to carry out communication. The term "network reliability" at least in some examples refers to a probability or measure of delivering a specified amount of data from a source to a destination (or sink).

The term "packet capture" or "PCAP" at least in some examples refers to a networking practice involving the interception of data packets travelling over a network and/or through one or more network nodes. Additionally or alternatively, the term "packet capture" or "PCAP" at least in some examples refers to a process of intercepting and logging traffic. Packet capture can be used to help to analyze networks, manage network traffic, and/or identify network performance issues. The term "packet capture" or "PCAP" can sometimes be synonymous with the terms "packet sniffing", "protocol analysis", "network analysis", "network capture", "wireless analysis", "WiFi analysis", and the like. The term "packet capture file" or "PCAP file" at least in some examples refers to a data file, API, and/or other data structure(s) including data, parameters, and other like information for capturing packets and/or network traffic, analyzing the network characteristics, controlling the network traffic, determining network status, and/or detecting and/or resolving network problems.

The term "traffic shaping" at least in some examples refers to a bandwidth management technique that manages data transmission to comply with a desired traffic profile or class of service. Traffic shaping ensures sufficient network bandwidth for time-sensitive, critical applications using policy rules, data classification, queuing, QoS, and other techniques. The term "throttling" at least in some examples refers to the regulation of flows into or out of a network, or into or out of a specific device or element. The term "access traffic steering" or "traffic steering" at least in some examples refers to a procedure that selects an access network for a new data flow and transfers the traffic of one or more data flows over the selected access network. Access traffic steering is applicable between one 3GPP access and one non-3GPP access. The term "access traffic switching" or "traffic switching" at least in some examples refers to a procedure that moves some or all traffic of an ongoing data flow from at least one access network to at least one other access network in a way that maintains the continuity of the data flow. The term "access traffic splitting" or "traffic splitting" at least in some examples refers to a procedure that splits the traffic of at least one data flow across multiple access networks. When traffic splitting is applied to a data flow, some traffic of the data flow is transferred via at least one access channel, link, or path, and some other traffic of the same data flow is transferred via another access channel, link, or path.

The term "network address" at least in some examples refers to an identifier for a node or host in a computer network, and may be a unique identifier across a network and/or may be unique to a locally administered portion of the network. Examples of network addresses include a Closed Access Group Identifier (CAG-ID), Bluetooth hardware device address (BD ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, Radio Network Temporary Identifier (RNTI) (including any RNTI discussed in clause 8.1 of 3GPP TS 38.300 v17.0.0 (2022-04-13) ("[TS38300]")), International Mobile Equipment Identity (IMEI), IMEI Type Allocation Code (IMEA/TAC), International Mobile Subscriber Identity (IMSI), IMSI software version (IMSISV), permanent equipment identifier (PEI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QoS Flow ID (QFI) and/or 5G QoS Identifier (5QI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, UE Access Category and Identity, and/or other cellular network related identifiers), an email address, Enterprise Application Server (EAS) ID, an endpoint address, an Electronic Product Code (EPC) as defined by the EPCglobal Tag Data Standard, a Fully Qualified Domain Name (FQDN), an internet protocol (IP) address in an IP network (e.g., IP version 4 (Ipv4), IP version 6 (IPv6), and/or the like), an internet packet exchange (IPX) address, Local Area Network (LAN) ID, a media access control (MAC) address, personal area network (PAN) ID, a port number (e.g., Transmission Control Protocol (TCP) port number, User Datagram Protocol (UDP) port number), QUIC connection ID, RFID tag, service set identifier (SSID) and variants thereof, telephone numbers in a public switched telephone network (PTSN), a socket address, VLAN tag and/or VLAN ID, universally unique identifier (UUID) (e.g., as specified in ISO/IEC 11578:1996), a Universal Resource Locator (URL) and/or Universal Resource Identifier (URI), VLAN ID, an X.21 address, an X.25 address, Zigbee® ID, Zigbee® Device Network ID, Multiprotocol Label Switching (MPLS) label, StreamID, and/or any other suitable network address and components thereof. The term "application identifier", "application ID", or "app ID" at least in some examples refers to an identifier that can be mapped to a specific application or application instance; in the context of 3GPP 5G/NR systems, an "application identifier" at least in some examples refers to an identifier that can be mapped to a specific application traffic detection rule. The term "endpoint address" at least in some examples refers to an address used to determine the host/authority part of a target URI, where the target URI is used to access an NF service (e.g., to invoke service operations) of an NF service producer or for notifications to an NF service consumer.

The term "port" at least in some examples refers to a communication endpoint, a virtual data connection between two or more entities, and/or a virtual point where network connections start and end. Additionally or alternatively, a "port" at least in some examples is associated with a specific process or service. Additionally or alternatively, a "port" at least in some examples refers to a service access point (SAP) and an interface stack supporting that SAP.

The term "application" at least in some examples refers to a computer program designed to carry out a specific task other than one relating to the operation of the computer itself. Additionally or alternatively, term "application" at least in some examples refers to a complete and deployable package, environment to achieve a certain function in an operational environment. The term "algorithm" at least in some examples refers to an unambiguous specification of how to solve a problem or a class of problems by performing calculations, input/output operations, data processing, automated reasoning tasks, and/or the like. The term "analytics" at least in some examples refers to the discovery, interpretation, and communication of meaningful patterns in data.

The term "application programming interface" or "API" at least in some examples refers to a set of subroutine definitions, communication protocols, and tools for building software. Additionally or alternatively, the term "application programming interface" or "API" at least in some examples refers to a set of clearly defined methods of communication among various components. In some examples, an API may be defined or otherwise used for a web-based system, operating system, database system, computer hardware, software library, and/or the like. The term "service access point" or "SAP" at least in some examples refers to a point at which a service is offered.

The term "physical rate" or "PHY rate" at least in some examples refers to a speed at which one or more bits are actually sent over a transmission medium. Additionally or alternatively, the term "physical rate" or "PHY rate" at least in some examples refers to a speed at which data can move across a wireless link between a transmitter and a receiver. The term "data rate" at least in some examples refers to throughput and/or data transmitted in units of time usually in bits per second (bps).

The term "delay" at least in some examples refers to a time interval between two events. Additionally or alternatively, the term "delay" at least in some examples refers to a time interval between the propagation of a signal and its reception. The term "packet delay" at least in some examples refers to the time it takes to transfer any packet from one point to another. Additionally or alternatively, the term "packet delay" or "per packet delay" at least in some examples refers to the difference between a packet reception time and packet transmission time. Additionally or alternatively, the "packet delay" or "per packet delay" can be measured by subtracting the packet sending time from the packet receiving time where the transmitter and receiver are at least somewhat synchronized. The term "processing delay" at least in some examples refers to an amount of time taken to process a packet in a network node. The term "transmission delay" at least in some examples refers to an amount of time needed (or necessary) to push a packet (or all bits of a packet) into a transmission medium. The term "propagation delay" at least in some examples refers to amount of time it takes a signal's header to travel from a sender to a receiver. The term "network delay" at least in some examples refers to the delay of an a data unit within a network (e.g., an IP packet within an IP network). The term "queuing delay" at least in some examples refers to an amount of time a job waits in a queue until that job can be executed. Additionally or alternatively, the term "queuing delay" at least in some examples refers to an amount of time a packet waits in a queue until it can be processed and/or transmitted. The term "delay bound" at least in some examples refers to a predetermined or configured amount of acceptable delay. The term "per-packet delay bound" at least in some examples refers to a predetermined or configured amount of acceptable packet delay where packets that are not processed and/or transmitted within the delay bound are considered to be delivery failures and are discarded or dropped. The term "packet drop rate" at least in some examples refers to a share of packets that were not sent to the target due to high traffic load or traffic management and should be seen as a part of the packet loss rate. The term "packet loss rate" at least in some examples refers to a share of packets that could not be received by the target, including packets dropped, packets lost in transmission and packets received in wrong format. The term "latency" at least in some examples refers to the amount of time it takes to transfer a first/initial data unit in a data burst from one point to another. The term "throughput" or "network throughput" at least in some examples refers to a rate of production or the rate at which something is processed. Additionally or alternatively, the term "throughput" or "network throughput" at least in some examples refers to a rate of successful message (date) delivery over a communication channel. The term "goodput" at least in some examples refers to a number of useful information bits delivered by the network to a certain destination per unit of time.

The term "data processing" or "processing" at least in some examples refers to any operation or set of operations which is performed on data or on sets of data, whether or not by automated means, such as collection, recording, writing, organization, structuring, storing, adaptation, alteration, retrieval, consultation, use, disclosure by transmission, dissemination or otherwise making available, alignment or combination, restriction, erasure and/or destruction. The term "packet processor" at least in some examples refers to software and/or hardware element(s) that transform a stream of input packets into output packets (or transforms a stream of input data into output data); examples of the transformations include adding, removing, and modifying fields in a packet header, trailer, and/or payload. The term "data pipeline" or "pipeline" at least in some examples refers to a set of data processing elements (or data processors) connected in series and/or in parallel, where the output of one data processing element is the input of one or more other data processing elements in the pipeline; the elements of a pipeline may be executed in parallel or in time-sliced fashion and/or some amount of buffer storage can be inserted between elements.

The term "filter" at least in some examples refers to computer program, subroutine, or other software element capable of processing a stream, data flow, or other collection of data, and producing another stream. In some implementations, multiple filters can be strung together or otherwise connected to form a pipeline.

The terms "instantiate" and/or "instantiation" at least in some examples refers to the creation of an instance. Additionally or alternatively, the term "instance" at least in some examples refers to a concrete occurrence of an object, which may occur, for example, during execution of program code. The term "reference" at least in some examples refers to data useable to locate other data and may be implemented a variety of ways (e.g., a pointer, an index, a handle, a key, an identifier, a hyperlink, and/or the like). The term "service instance" at least in some examples refers to a set of service access points (SAPs) such that a "Data.Request" primitive presented to one SAP can result in a "Data.Indication" primitive occurring at one or more of the other SAPs in that set.

The term "software agent" at least in some examples refers to a computer program that acts for a user or other program in a relationship of agency. The term "use case" at least in some examples refers to a description of a system from a user's perspective. Use cases sometimes treat a system as a black box, and the interactions with the system, including system responses, are perceived as from outside the system. Use cases typically avoid technical jargon, preferring instead the language of the end user or domain expert. The term "user" at least in some examples refers to an abstract representation of any entity issuing commands, requests, and/or data to a compute node or system, and/or otherwise consumes or uses services.

The term "datagram" at least in some examples at least in some examples refers to a basic transfer unit associated with a packet-switched network; a datagram may be structured to have header and payload sections. The term "datagram" at least in some examples may be synonymous with any of the following terms, even though they may refer to different aspects: "data unit", a "protocol data unit" or "PDU", a "service data unit" or "SDU", "frame", "packet", a "network packet", "segment", "block", "cell", "chunk", and/or the like. The term "information element" or "IE" at least in some examples refers to a structural element containing one or more fields. Additionally or alternatively, the term "information element" or "IE" at least in some examples refers to a field or set of fields defined in a standard or specification that is used to convey data and/or protocol information. The term "field" at least in some examples refers to individual contents of an information element, or a data element that contains content. The term "data element" or "DE" at least in some examples refers to a data type that contains one single data. The term "data frame" or "DF" at least in some examples refers to a data type that contains more than one data element in a predefined order. The term "tagged frame" at least in some examples refers to a frame that contains a tag header immediately following the source MAC address field of the frame.

The term "translation" at least in some examples refers to the process of converting or otherwise changing data from a first form, shape, configuration, structure, arrangement, embodiment, description, or the like into a second form, shape, configuration, structure, arrangement, embodiment, description, or the like; at least in some examples there may be two different types of translation: transcoding and transformation. The term "transcoding" at least in some examples refers to taking information/data in one format (e.g., a packed binary format) and translating the same information/data into another format in the same sequence. Additionally or alternatively, the term "transcoding" at least in some examples refers to taking the same information, in the same sequence, and packaging the information (e.g., bits or bytes) differently. The term "transformation" at least in some examples refers to changing data from one format and writing it in another format, keeping the same order, sequence, and/or nesting of data items. Additionally or alternatively, the term "transformation" at least in some examples involves the process of converting data from a first format or structure into a second format or structure, and involves reshaping the data into the second format to conform with a schema or other like specification. Transformation may include rearranging data items or data objects, which may involve changing the order, sequence, and/or nesting of the data items/objects. Additionally or alternatively, the term "transformation" at least in some examples refers to changing the schema of a data object to another schema.

The term "cryptographic mechanism" at least in some examples refers to any cryptographic protocol and/or cryptographic algorithm. Additionally or alternatively, the term "cryptographic protocol" at least in some examples refers to a sequence of steps precisely specifying the actions required of two or more entities to achieve specific security objectives (e.g., cryptographic protocol for key agreement). Additionally or alternatively, the term "cryptographic algorithm" at least in some examples refers to an algorithm specifying the steps followed by a single entity to achieve specific security objectives (e.g., cryptographic algorithm for symmetric key encryption). The term "cryptographic hash function", "hash function", or "hash") at least in some examples refers to a mathematical algorithm that maps data of arbitrary size (sometimes referred to as a "message") to a bit array of a fixed size (sometimes referred to as a "hash value", "hash", or "message digest"). A cryptographic hash function is usually a one-way function, which is a function that is practically infeasible to invert.

The term "hash table" at least in some examples refers to a data structure that maps keys to values, wherein a hash function is used to compute an index (also called a hash code) into an array of buckets or slots from which a desired value can be found, and during lookup, the key is hashed and the resulting hash indicates where the corresponding value is stored. In some examples, any suitable hashing scheme can be used to construct or build a hash table such as, for example, a perfect hashing scheme, coalesced hashing, Cuckoo hashing, hopscotch hashing, robin hood hashing, jHash, and/or the like.

The term "lookup table" or "LUT" at least in some examples refers to a data structure that replaces runtime computation with a relatively simpler indexing operation. Additionally or alternatively, the term "lookup table" or "LUT" at least in some examples refers to a data structure (e.g., array or the like) that maps input values to output values. In some examples, an LUT is arranged as a set of key-value pairs, where the keys are the data items being searched (e.g., looked up) and the values are either the actual data or pointers to where the data are located. In other examples, an LUT is arranged as a set of data items only where the location in the table and the key are synonymous. In some examples, suitable function can be approximated or estimated to calculate the location of data items in an LUT. Hash tables are somewhat different than LUTs in that, to retrieve a value v with a key k, a hash table would store the value v in the slot h(k) where h is a hash function (e.g., key k is used to compute the slot), whereas in LUTs the value v may be stored in slot k. The term "lookup operation" or "LUT operation" at least in some examples refers to an operation, process, procedure, method, function, algorithm, and/or other means of retrieving a output values from an LUT for a set of input values.

The term "basic service set" or "BSS" at least in some examples refers to a set of STAs that have successfully synchronized using a join service primitives and one STA that has used the START primitive. Alternatively, a set of STAs that have used a start primitive specifying matching mesh profiles where the match of the mesh profiles has been verified via the scanning procedure. Membership in a BSS does not imply that wireless communication with all other members of the BSS is possible.

The term "clear channel assessment (CCA) function" at least in some examples refers to a logical function in the physical layer (PHY) that determines the current state of use of a wireless medium.

The term "coordination function" at least in some examples refers to a logical function that determines when a STA is permitted to transmit PDUs via a WM.

The term "distributed coordination function" or "DCF" at least in some examples refers to a class of coordination function(s) where the same coordination function logic is active in every STA in a basic service set (BSS) whenever the network is in operation.

The term "distribution service" at least in some examples refers to a service that, by using association information, delivers medium access control (MAC) service tuples within a distribution system (DS).

The term "distribution system" or DS" at least in some examples refers to a system used to interconnect a set of basic service sets (BSSs) and integrated local area networks (LANs) to create an extended service set (ES S).

The term "accuracy" at least in some examples refers to the mean of the time or frequency error between a clock under test and a reference clock over an ensemble of measurements (see e.g., [IEEE15881]).

The term "clock" at least in some examples refers to a physical device that is capable of providing a measurement of the passage of time since a defined epoch.

The term "direct communication" at least in some examples refers to a communication of [IEEE802.1AS] information between two PTP instances with no intervening PTP instance.

The term "end station" at least in some examples refers to a device attached to a local area network (LAN) or metropolitan area network (MAN) that acts as a source of, and/or destination for, traffic carried on the LAN or MAN.

The term "event message" at least in some examples refers to a message that is timestamped on egress from a PTP instance and ingress to a PTP instance.

The term "fractional frequency offset" at least in some examples refers to a fractional offset, y, between a measured clock and a reference clock as defined by:

$$y = \frac{f_m - f_r}{f_r},$$

where $f_m$ is the frequency of the measured clock and $f_r$ is the frequency of the reference clock, and wherein the measurement units of $f_m$ and $f_r$ are the same.

The term "frequency offset" at least in some examples refers to the offset between a measured frequency and a reference frequency as defined by fm−fr, where fm is the frequency of the measured clock and fr is the frequency of the reference clock. The measurement units of fm and fr are the same.

The term "general message" at least in some examples refers to a message that is not timestamped.

The term "gPTP communication path" at least in some examples refers to a segment of a generalized precision time protocol (gPTP) domain that enables direct communication between two PTP instances.

The term "grandmaster-capable PTP instance", "GM-capable PTP instance", or GM-capable instance" at least in some examples refers to a PTP instance that is capable of being a grandmaster PTP instance.

The term "grandmaster clock" or "GM clock" at least in some examples refers to In the context of a single PTP domain, the synchronized time of a PTP instance that is the source of time to which all other PTP instances in the domain are synchronized.

The term "grandmaster PTP instance", "GM PTP instance", or "GM instance" at least in some examples refers to a PTP instance containing the Grandmaster Clock.

The term "local clock" at least in some examples refers to a free-running clock, embedded in a respective entity (e.g., PTP instance, CSN node, and/or the like), that provides a common time to that entity relative to an arbitrary epoch.

The term "message timestamp point" at least in some examples refers to a point within an event message serving as a reference point for when a timestamp is taken The term "message type" at least in some examples refers the name of a respective message, e.g., Sync, Announce, Timing Measurement Frame.

The term "precision" at least in some examples refers to a measure of the deviation from the mean of the time or frequency error between the clock under test and a reference clock (see IEEE Std 1588-2019).

The term "primary reference" at least in some examples refers to source of time and/or frequency that is traceable to international standards.

The term "PTP end instance" at least in some examples refers to a PTP instance that has exactly one PTP port.

The term "PTP instance" at least in some examples refers to an instance of the IEEE 802.1AS protocol, operating in a single time-aware system within exactly one domain. A PTP instance implements the portions of IEEE Std 802.1AS indicated as applicable to either a PTP relay instance or a PTP End Instance. Additionally or alternatively, the term "PTP instance" refers to an IEEE 1588 PTP instance that conforms to the requirements of IEEE Std 802.1AS.

The term "PTP link" at least in some examples refers to within a domain, a network segment between two PTP ports using the P2P delay mechanism of IEEE Std 802.1AS [IEEE802.1AS]. The P2P delay mechanism is designed to measure the propagation time over such a link. Additionally or alternatively, a "PTP link" between PTP ports of PTP instances is also a gPTP Communication Path.

The term "PTP relay instance" at least in some examples refers to a PTP instance that is capable of communicating synchronized time received on one PTP port to other PTP ports, using the IEEE 802.1AS protocol. In some implementations, a PTP relay instance could, for example, be contained in a bridge, a router, or a multi-port end station.

The term "recognized timing standard" at least in some examples refers to recognized standard time source that is a source external to IEEE 1588 precision time protocol (PTP) and provides time that is traceable to the international standards laboratories maintaining clocks that form the basis for the International Atomic Time (TAI) and Coordinated Universal Time (UTC) timescales. Examples of these sources are National Institute of Standards and Technology (NIST) timeservers and global navigation satellite systems (GNSSs).

The term "reference plane" at least in some examples refers to boundary between a PTP port of a PTP instance and the network physical medium. Timestamp events occur as frames cross this interface.

The term "residence time" at least in some examples refers to a duration of the time interval between the receipt of a time-synchronization event message by a PTP instance and the sending of the next subsequent time-synchronization event message on another PTP port of that PTP instance. Residence time can be different for different PTP ports. Additionally or alternatively, the term "residence time" at least in some examples applies only to the case where syncLocked is TRUE. If a PTP port of a PTP instance sends a time-synchronization event message without having received a time synchronization event message, e.g., if syncLocked is FALSE or if sync receipt timeout occurs, the duration of the interval between the most recently received time-synchronization event message and the sent time synchronization event message is mathematically equivalent to residence time; however, this interval is not normally called a residence time.

The term "stability" in the context of a clock or clock signal, at least in some examples refers to a measure of the variations over time of the frequency error (of the clock or clock signal). The frequency error typically varies with time due to aging and various environmental effects, e.g., temperature.

The term "synchronized time" at least in some examples refers to the time of an event relative to the Grandmaster Clock. If there is a change in the Grandmaster PTP instance or its time base, the synchronized time can experience a phase and/or frequency step.

The term "synchronized clocks" at least in some examples refers to, absent relativistic effects, two clocks are synchronized to a specified uncertainty if they have the same epoch and their measurements of the time of a single event at an arbitrary time differ by no more than that uncertainty.

The term "syntonized clocks" at least in some examples refers to, absent relativistic effects, two clocks are syntonized to a specified uncertainty if the duration of a second is the same on both, which means the time as measured by each advances at the same rate within the specified uncertainty. The two clocks might or might not share the same epoch.

The term "time-aware" at least in some examples describes the use of time that is synchronized with other stations using a protocol (e.g., [IEEE802.1AS1])

The term "time-aware system" at least in some examples refers to a device that contains one or more PTP instances and/or PTP services (e.g., Common Mean Link Delay Service). In some implementations, a time-aware system can contain more than one PTP instance in the same domain and/or different domains.

The term "time-sensitive stream" at least in some examples refers to a stream of data frames that are required to be delivered with a bounded latency.

The term "timestamp measurement plane" at least in some examples refers to a plane at which timestamps are captured. If the timestamp measurement plane is different from the reference plane, the timestamp is corrected for ingressLatency and/or egressLatency.

The term "reconfiguration" at least in some examples refers to any intentional modification of the system structure or of the device-level content, including updates of any type.

The term "disturbance" at least in some examples refers to any malfunction or stall of a process/machine, which is followed by production loss or by an unacceptable degradation of production quality.

The term "transmission selection algorithms" at least in some examples refers to a set of algorithms for traffic selection, which include, for example, Strict Priority, the Credit-based shaper and Enhanced Transmission Selection.

The term "time-sensitive stream" at least in some examples refers to a stream of traffic, transmitted from a single source station, destined for one or more destination stations, where the traffic is sensitive to timely delivery, and in particular, requires transmission latency to be bounded.

The term "frequency stability" at least in some examples refers to the variation of output frequency of a crystal oscillator due to external conditions such as temperature variation, voltage variation, output load variation, and frequency aging. Frequency stability may be expressed in parts per million (ppm) or parts per billion (ppb), which can be represented in the form of frequency (e.g., Hertz (Hz)).

The term "express traffic" at least in some examples refers to a set of frames transmitted through an express Media Access Control (eMAC) sublayer (see e.g., [IEEE802.31], clause 99). The term "expedited traffic" at least in some examples refers to traffic that requires preferential treatment as a consequence of jitter, latency, or throughput constraints or as a consequence of management policy.

The term "audio/video traffic" or "AV traffic" at least in some examples refers to traffic associated with audio and/or video applications that is sensitive to transmission latency and latency variation, and, for some applications, packet loss.

The term "traffic class" at least in some examples refers to a classification used to expedite transmission of frames generated by critical or time-sensitive services. At least in some examples, traffic classes are numbered from zero through N−1, where N is the number of outbound queues associated with a given bridge port, and $1 \leq N \leq 8$, and each traffic class has a one-to-one correspondence with a specific outbound queue for that port, wherein traffic class 0 corresponds to non-expedited traffic and non-zero traffic classes correspond to expedited classes of traffic. At least in some examples, a fixed mapping determines, for a given priority associated with a frame and a given number of traffic classes, what traffic class will be assigned to the frame.

The term "stream reservation protocol domain boundary port" or "SRP domain boundary port" at least in some examples refers to a port of a station that is a member of an SRP domain for a given stream reservation (SR) class and that is connected via an individual LAN to a port of a station that either is within a different SRP domain for that SR class or is not part of any SRP domain.

The term "stream reservation class domain core port" or "SRP domain core port" at least in some examples refers to a port of a station that is a member of an SRP domain for a given stream reservation (SR) class and that is connected, via an individual Local Area Network (LAN) that is part of the active topology, to a Port of a station that is a member of the same SRP domain for that SR class.

The term "stream reservation class" or "SR class" at least in some examples refers to a traffic class whose bandwidth can be reserved for audio/video (AV) traffic. At least in some examples, a priority value is associated with each SR class and/or SR classes are denoted by consecutive letters of the alphabet, starting with A and continuing for up to seven classes.

The term "talker" at least in some examples refers to an end station that is the source or producer of a stream. The term "listener" at least in some examples refers to an end station that is the destination, receiver, or consumer of a stream.

The term "gate-close event" at least in some examples refers to an event that occurs when a transmission gate associated with a queue transitions from an open state to a closed state, disconnecting the transmission selection function of the forwarding process from the queue and preventing it from selecting frames from that queue.

The term "gate-open event" at least in some examples refers to an event that occurs when the transmission gate associated with a queue transitions from a closed state to an open state, connecting the transmission selection function of the forwarding process to a queue and allowing it to select frames from that queue.

The term "gating cycle" at least in some examples refers to the period of time over which the sequence of operations in a gate control list repeats.

The term "transmission gate" or "gate" at least in some examples refers to a gate that connects or disconnects the transmission selection function of a forwarding process from a queue, allowing or preventing it from selecting frames from that queue. At least in some examples, a gate has two states, including an open state and a closed state.

The term "Centralized Network Configuration" or "CNC" at least in some examples refers to a centralized component that configures network resources on behalf of TSN applications (users).

The term "Centralized User Configuration" or "CUC" at least in some examples refers to a centralized entity that discovers end stations, retrieves end station capabilities and user requirements, and configures TSN features in end stations. The protocols that the CUC uses for communication with end stations are specific to the user application, not specified in this standard. A CUC exchanges information with a CNC in order to configure TSN features on behalf of its end stations.

The term "traffic specification" or "TSpec" at least in some examples refers to a specification that characterizes the bandwidth that a stream can consume.

The terms "master" and "slave" at least in some examples refers to a model of asymmetric communication or control where one device, process, element, or entity (the "master") controls one or more other device, process, element, or entity (the "slaves"). The terms "master" and "slave" are used in this disclosure only for their technical meaning. The term "master" or "grandmaster" may be substituted with any of the following terms "main", "source", "primary", "initiator", "requestor", "transmitter", "host", "maestro", "controller", "provider", "producer", "client", "source", "mix", "parent", "chief", "manager", "reference" (e.g., as in "reference clock" or the like), and/or the like. Additionally, the term "slave" may be substituted with any of the following terms "receiver", "secondary", "subordinate", "replica", "target", "responder", "device", "performer", "agent", "standby", "consumer", "peripheral", "follower", "server", "child", "helper", "worker", "node", and/or the like.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, and/or the like).

Furthermore, various standards (e.g., 3GPP, ETSI, and/or the like) may define various message formats, PDUs, containers, frames, and/or the like, as comprising a sequence of optional or mandatory data elements (DEs), data frames (DFs), information elements (IEs), and/or the like. However, it should be understood that the requirements of any particular standard should not limit the examples discussed herein, and as such, any combination of containers, frames, DFs, DEs, IEs, values, actions, and/or features are possible in various examples, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. A network interface controller (NIC) capable of time-sensitive networking, the NIC comprising:
host interface circuitry (HIC) to communicatively couple the NIC to a host platform of a computing system; and
gate control circuitry (GCC) connected to the HIC, wherein the GCC is to:
fetch, via a direct channel to a host memory of the host platform, a set of entries of a gate control list (GCL) to be stored in a GCL buffer on the NIC, wherein the GCL is stored in the host memory of the host platform;
read, from the GCL buffer, a subset of entries of the set of entries;
control, during a gating cycle, individual gates of a set of gates to open according to the read subset of entries, wherein each gate of the set of gates is connected to a corresponding traffic class (TC) queue of a set of TC queues, each TC queue in the set of TC queues stores data to be transmitted based on a corresponding TC, and when the individual gates open, at least some of the data in the individual gates is to be packetized for transmission over a communication link; and
fetch, during the control of the individual gates, another set of entries in the GCL to be stored in a GCL buffer.

2. The NIC of claim 1, wherein the GCC is to:
parse content of the read subset of entries to identify a subset of TC queues of the set of TC queues to be opened for the gating cycle; and
fetch data from the host memory via the HIC to be placed in the identified subset of TC queues.

3. The NIC of claim 2, wherein each TC queue in the set of TC queues corresponds to a transmission (Tx) queue in the host memory, and the GCC is to:
fetch the data from the host memory when a current time lapses a prefetch timer threshold with respect to a cycle start time of the gating cycle.

4. The NIC of claim 1, wherein the GCC is to:
fetch the other set of entries in the GCL when a prefill buffer level threshold has been met or exceeded.

5. The NIC of claim 1, wherein the GCC is to:
start control of the individual gates when a cycle start time occurs.

6. The NIC of claim 1, wherein the GCL includes a first bank of entries and a second bank of entries, and the GCC is to create the GCL, including:
write entries of the GCL directly into the host memory at a first base address of the first bank;
enable a first bank own bit corresponding to the first bank after the entries are written into the first bank;
write, during the control of the individual gates, the entries of the GCL into the host memory at a second base address of the second bank, wherein the subset of entries are fetched from the second bank during a next gating cycle; and
enable a second bank own bit corresponding to the second bank after the entries are written into the second bank.

7. The NIC of claim 6, wherein the set of registers includes a first bank base address register, a second bank base address register, a cycle start time register that includes the cycle start time, a cycle time register, and a list length register, and the GCC is to:
initialize the first bank base address register to include the first base address;
initialize the second bank base address register to include the second base address;
initialize the cycle start time register to include the cycle start time of the gating cycle;
initialize the cycle time register to include a duration of the gating cycle; and
initialize the list length register to include a number of entries of a currently enabled one of the first bank or the second bank.

8. The NIC of claim 7, wherein the set of registers includes a bank own bit register, wherein the bank own bit register includes the first bank own bit and the second bank own bit.

9. The NIC of claim 1, wherein the GCL buffer is implemented using on-board memory circuitry of the NIC.

10. The NIC of claim 1, wherein the GCC includes:
Medium Access Control (MAC) scheduler circuitry of the NIC;
indirect addressing circuitry of the NIC;
a gate control engine (GCE) of the NIC;
a remote time-sensitive network (TSN) configuration service; or
a combination of any two or more of the MAC scheduler circuitry, the indirect addressing circuitry, the GCE, and the remote TSN configuration service.

11. A method of operating gate control logic for time-sensitive networking, the method comprising:
fetching, through a direct channel to a host memory of a host platform, a set of entries of a gate control list (GCL) to be stored in a buffer, wherein the GCL is stored in the host memory of the host platform;
reading, from the buffer, a subset of entries of the set of entries;
controlling, during a gating cycle, individual gates of a set of gates to open according to the read subset of entries, wherein each gate of the set of gates is connected to a corresponding traffic class (TC) queue of a set of TC queues, each TC queue in the set of TC queues stores data to be transmitted based on a corresponding TC, and controlling the individual gates to open causes at least some of the data in the individual gates to be packetized for transmission over a communication link; and fetching, during the controlling, another set of entries in the GCL for storage in the buffer.

12. The method of claim 11, wherein the method includes:
parsing content of the read subset of entries to identify a subset of TC queues of the set of TC queues to be opened for the gating cycle; and
fetching data from the host memory via the host interface circuitry (HIC) to be placed in the identified subset of TC queues.

13. The method of claim 12, wherein each TC queue in the set of TC queues corresponds to a transmission (Tx) queue in the host memory, and the method includes:
fetching the data from the host memory when a current time lapses a prefetch timer threshold with respect to a cycle start time of the gating cycle.

14. The method of claim 11, wherein the method includes:
fetching the other set of entries in the GCL when a prefill buffer level threshold has been met or exceeded.

15. The method of claim 11, wherein the method includes:
starting the controlling of the individual gates when a cycle start time occurs.

16. The method of claim 11, wherein the GCL includes a first bank of entries and a second bank of entries, and the method includes creating the GCL, including:
writing entries of the GCL directly into the host memory at a first base address of the first bank;
enabling a first bank own bit corresponding to the first bank after the entries are written into the first bank;
writing, during the control of the individual gates, the entries of the GCL into the host memory at a second base address of the second bank, wherein the subset of entries are fetched from the second bank during a next gating cycle; and
enabling a second bank own bit corresponding to the second bank after the entries are written into the second bank.

17. The method of claim 11, wherein the set of registers includes a first bank base address register, a second bank base address register, a cycle start time register that includes the cycle start time, a cycle time register, and a list length register, and the method includes:
initializing the first bank base address register to include the first base address;
initializing the second bank base address register to include the second base address;
initializing the cycle start time register to include the cycle start time of the gating cycle;
initializing the cycle time register to include a duration of the gating cycle; and
initializing the list length register to include a number of entries of a currently enabled one of the first bank or the second bank.

18. The method of claim 17, wherein the set of registers includes a bank own bit register, wherein the bank own bit register includes the first bank own bit and the second bank own bit.

19. One or more non-transitory computer-readable media (NTCRM) comprising instructions, wherein execution of the instructions by a gate control engine (GCE) in a time-sensitive network (TSN) is to cause the GCE to:
fetch, via a direct channel to a host memory of a host platform, a set of entries of a gate control list (GCL), wherein the GCL is stored in the host memory of the host platform;
store the fetched set of entries in a buffer;
read, from the buffer, a subset of entries of the set of entries;
control, during a gating cycle, opening of individual gates of a set of gates according to the read subset of entries, wherein each gate of the set of gates is connected to a corresponding traffic class (TC) queue of a set of TC queues, each TC queue in the set of TC queues stores data to be transmitted based on a corresponding TC, and when the individual gates are opened, at least some of the data in the individual gates is to be packetized for transmission over a communication link; and
fetch, during the control of the individual gates, another set of entries in the GCL to be stored in the buffer.

20. The one or more NTCRM of claim 19, wherein execution of the instructions is to cause the GCE to:
parse content of the read subset of entries to identify a subset of TC queues of the set of TC queues to be opened for the gating cycle; and
fetch data from the host memory via the host interface circuitry (HIC) to be placed in the identified subset of TC queues.

21. The one or more NTCRM of claim 20, wherein each TC queue in the set of TC queues corresponds to a transmission (Tx) queue in the host memory, and execution of the instructions is to cause the GCE to:
fetch the data from the host memory when a current time lapses a prefetch timer threshold with respect to a cycle start time of the gating cycle.

22. The one or more NTCRM of claim 19, wherein execution of the instructions is to cause the GCE to:
fetch the other set of entries in the GCL when a prefill buffer level threshold has been met or exceeded.

23. The one or more NTCRM of claim 19, wherein execution of the instructions is to cause the GCE to:
start control of the individual gates when a cycle start time occurs.

24. The one or more NTCRM of claim 19, wherein the GCL includes a first bank of entries and a second bank of entries, and execution of the instructions is to cause the GCE to:
write entries of the GCL directly into the host memory at a first base address of the first bank;
enable a first bank own bit corresponding to the first bank after the entries are written into the first bank;
write, during the control of the individual gates, the entries of the GCL into the host memory at a second base address of the second bank, wherein the subset of entries are fetched from the second bank during a next gating cycle; and
enable a second bank own bit corresponding to the second bank after the entries are written into the second bank.

* * * * *